(12) United States Patent
Fein et al.

(10) Patent No.: US 9,077,647 B2
(45) Date of Patent: *Jul. 7, 2015

(54) CORRELATING USER REACTIONS WITH AUGMENTATIONS DISPLAYED THROUGH AUGMENTED VIEWS

(71) Applicant: Elwha LLC, Bellevue, WA (US)

(72) Inventors: Gene Fein, Westlake, CA (US); Royce A. Levien, Lexington, MA (US); Richard T. Lord, Tacoma, WA (US); Robert W. Lord, Seattle, WA (US); Mark A. Malamud, Seattle, WA (US); John D. Rinaldo, Jr., Bellevue, WA (US); Clarence T. Tegreene, Mercer Island, WA (US)

( * ) Notice: Subject to any disclaimer, the term of this patent is extended or adjusted under 35 U.S.C. 154(b) by 305 days.

This patent is subject to a terminal disclaimer.

(21) Appl. No.: 13/729,278

(22) Filed: Dec. 28, 2012

(65) Prior Publication Data

US 2014/0101555 A1 Apr. 10, 2014

Related U.S. Application Data

(63) Continuation-in-part of application No. 13/723,610, filed on Dec. 21, 2012, which is a continuation of application No. 13/721,340, filed on Dec. 20, 2012, which is a continuation-in-part of application No.

(Continued)

(51) Int. Cl.
| | |
|---|---|
| *H04L 12/24* | (2006.01) |
| *G06T 19/00* | (2011.01) |
| *G06T 7/00* | (2006.01) |
| *G06F 3/048* | (2013.01) |

(52) U.S. Cl.
CPC .............. *H04L 41/22* (2013.01); *G06T 19/006* (2013.01); *G06F 3/048* (2013.01)

(58) Field of Classification Search
None
See application file for complete search history.

(56) References Cited

U.S. PATENT DOCUMENTS

| 6,625,299 | B1 * | 9/2003 | Meisner et al. ............... 382/103 |
| 6,774,898 | B1 | 8/2004 | Katayama et al. |
| 6,891,563 | B2 | 5/2005 | Schofield et al. |
| 7,119,829 | B2 | 10/2006 | Leonard et al. |

(Continued)

FOREIGN PATENT DOCUMENTS

| EP | 1117074 A2 | 7/2001 |
| KR | 10-2012-0066552 A | 6/2012 |
| WO | WO 2012/108721 A2 | 8/2012 |

OTHER PUBLICATIONS

PCT International Search Report; International App. No. PCT/US2014/016022; Jun. 6, 2014; pp. 1-3.

(Continued)

*Primary Examiner* — David Zarka
*Assistant Examiner* — Jason Pringle-Parker

(57) ABSTRACT

Computationally implemented methods and systems include receiving first data that at least identifies one or more augmentations that were remotely displayed in one or more remotely displayed augmented views of one or more actual scenes, receiving second data indicating one or more user reactions of one or more users in response to the remote display of the one or more remotely displayed augmented views; and correlating the one or more user reactions with the one or more augmentations that were remotely displayed through the one or more remotely displayed augmented views. In addition to the foregoing, other aspects are described in the claims, drawings, and text.

37 Claims, 32 Drawing Sheets

Related U.S. Application Data

13/711,095, filed on Dec. 11, 2012, which is a continuation of application No. 13/709,465, filed on Dec. 10, 2012, which is a continuation-in-part of application No. 13/690,003, filed on Nov. 30, 2012, which is a continuation of application No. 13/689,372, filed on Nov. 29, 2012, which is a continuation-in-part of application No. 13/673,070, filed on Nov. 9, 2012, which is a continuation of application No. 13/672,575, filed on Nov. 8, 2012, which is a continuation-in-part of application No. 13/648,012, filed on Oct. 9, 2012, now Pat. No. 8,941,689, which is a continuation of application No. 13/646,147, filed on Oct. 5, 2012, now Pat. No. 8,928,695.

(56) References Cited

U.S. PATENT DOCUMENTS

| | | | |
|---|---|---|---|
| 7,690,975 | B2 | 4/2010 | Watanabe et al. |
| 8,116,526 | B2 | 2/2012 | Sroka et al. |
| 8,184,070 | B1 | 5/2012 | Taubman |
| 8,188,880 | B1 | 5/2012 | Chi et al. |
| 8,203,605 | B1 | 6/2012 | Starner |
| 8,402,356 | B2 | 3/2013 | Martinez et al. |
| 8,751,948 | B2 | 6/2014 | Wetzer et al. |
| 2001/0030654 | A1 | 10/2001 | Iki |
| 2002/0044152 | A1 | 4/2002 | Abbott, III et al. |
| 2002/0144259 | A1 | 10/2002 | Gutta et al. |
| 2003/0210832 | A1 | 11/2003 | Benton |
| 2004/0113885 | A1 | 6/2004 | Genc et al. |
| 2005/0206583 | A1 | 9/2005 | Lemelson et al. |
| 2008/0071559 | A1 | 3/2008 | Arrasvuori |
| 2008/0270947 | A1* | 10/2008 | Elber et al. ............... 715/852 |
| 2009/0049004 | A1 | 2/2009 | Nurminen et al. |
| 2009/0167787 | A1 | 7/2009 | Bathiche et al. |
| 2009/0182499 | A1 | 7/2009 | Bravo |
| 2009/0237328 | A1 | 9/2009 | Gyorfi et al. |
| 2009/0300535 | A1 | 12/2009 | Skourup et al. |
| 2009/0322671 | A1 | 12/2009 | Scott et al. |
| 2010/0104185 | A1 | 4/2010 | Johnson et al. |
| 2010/0164990 | A1 | 7/2010 | Van Doorn et al. |
| 2010/0208033 | A1 | 8/2010 | Edge et al. |
| 2010/0214284 | A1 | 8/2010 | Rieffel et al. |
| 2010/0226535 | A1 | 9/2010 | Kimchi et al. |
| 2010/0238161 | A1 | 9/2010 | Varga et al. |
| 2010/0295921 | A1 | 11/2010 | Guthrie et al. |
| 2010/0328344 | A1 | 12/2010 | Mattila et al. |
| 2011/0055049 | A1 | 3/2011 | Harper et al. |
| 2011/0074658 | A1 | 3/2011 | Sato |
| 2011/0134108 | A1 | 6/2011 | Hertenstein |
| 2011/0141254 | A1 | 6/2011 | Roebke et al. |
| 2011/0164163 | A1 | 7/2011 | Bilbrey et al. |
| 2011/0214082 | A1* | 9/2011 | Osterhout et al. ............ 715/773 |
| 2011/0227820 | A1 | 9/2011 | Haddick et al. |
| 2011/0231781 | A1 | 9/2011 | Betzler et al. |
| 2011/0238751 | A1 | 9/2011 | Belimpasakis et al. |
| 2011/0242134 | A1 | 10/2011 | Miller et al. |
| 2011/0292220 | A1 | 12/2011 | Georgis et al. |
| 2012/0025975 | A1 | 2/2012 | Richey et al. |
| 2012/0062596 | A1 | 3/2012 | Bedi et al. |
| 2012/0105473 | A1 | 5/2012 | Bar-Zeev et al. |
| 2012/0105475 | A1 | 5/2012 | Tseng |
| 2012/0113092 | A1 | 5/2012 | Bar-Zeev et al. |
| 2012/0113140 | A1 | 5/2012 | Hilliges et al. |
| 2012/0113274 | A1 | 5/2012 | Adhikari et al. |
| 2012/0116920 | A1 | 5/2012 | Adhikari et al. |
| 2012/0120101 | A1 | 5/2012 | Adhikari et al. |
| 2012/0120113 | A1 | 5/2012 | Hueso |
| 2012/0133650 | A1 | 5/2012 | Lee |
| 2012/0147328 | A1* | 6/2012 | Yahav ............... 351/210 |
| 2012/0154638 | A1 | 6/2012 | Chou |
| 2012/0166435 | A1 | 6/2012 | Graham et al. |
| 2012/0176410 | A1 | 7/2012 | Meier et al. |
| 2012/0194549 | A1 | 8/2012 | Osterhout et al. |
| 2012/0198339 | A1 | 8/2012 | Williams et al. |
| 2012/0206323 | A1 | 8/2012 | Osterhout et al. |
| 2012/0223966 | A1 | 9/2012 | Lim |
| 2012/0244907 | A1 | 9/2012 | Athsani et al. |
| 2012/0246027 | A1 | 9/2012 | Martin |
| 2012/0249416 | A1 | 10/2012 | Maciocci et al. |
| 2012/0249588 | A1 | 10/2012 | Tison et al. |
| 2012/0249591 | A1 | 10/2012 | Maciocci et al. |
| 2012/0268491 | A1 | 10/2012 | Sugden et al. |
| 2012/0269494 | A1 | 10/2012 | Satyanarayana et al. |
| 2012/0293548 | A1 | 11/2012 | Perez et al. |
| 2012/0299962 | A1 | 11/2012 | White et al. |
| 2012/0306920 | A1 | 12/2012 | Bathiche et al. |
| 2012/0327119 | A1 | 12/2012 | Woo et al. |
| 2012/0329432 | A1 | 12/2012 | Gupta et al. |
| 2013/0044128 | A1 | 2/2013 | Liu et al. |
| 2013/0050258 | A1 | 2/2013 | Liu et al. |
| 2013/0054622 | A1 | 2/2013 | Karmarkar et al. |
| 2013/0057577 | A1 | 3/2013 | Jeong |
| 2013/0076788 | A1 | 3/2013 | Ben Zvi |
| 2013/0083003 | A1 | 4/2013 | Perez et al. |
| 2013/0083009 | A1 | 4/2013 | Geisner et al. |
| 2013/0085345 | A1 | 4/2013 | Geisner et al. |
| 2013/0125027 | A1* | 5/2013 | Abovitz ............... 715/757 |
| 2013/0147836 | A1 | 6/2013 | Small et al. |
| 2013/0162632 | A1 | 6/2013 | Varga et al. |
| 2013/0194164 | A1 | 8/2013 | Sugden et al. |
| 2013/0218721 | A1 | 8/2013 | Borhan et al. |
| 2013/0278631 | A1 | 10/2013 | Border et al. |
| 2013/0342571 | A1 | 12/2013 | Kinnebrew et al. |
| 2014/0002357 | A1 | 1/2014 | Pombo et al. |
| 2014/0092130 | A1 | 4/2014 | Anderson et al. |

OTHER PUBLICATIONS

Doobybrain; "GE's Augmented Reality Demo"; YouTube; uploaded Feb. 4, 2009; pp. 1-2; located at: http://www.youtube.com/watch?v=00FGtH5nkxM.

Inbar, Ori; "Top 10 Augmented Reality Demos That Will Revolutionize Video Games"; Games Alfresco; posted on Mar. 3, 2008, printed on Sep. 27, 2012; pp. 1-19; located at: http://gamesalfresco.com/2008/03/03/top-10-augmented-reality-demos-that-will-revolutionize-video-games/.

"Qualcomm Augmented Reality Sample Apps"; Qualcomm; bearing a date of May 18, 2011, printed on Sep. 27, 2012; pp. 1-2; Qualcomm Incorporated; located at: http://www.qualcomm.com/media/videos/qualcomm-augmented-reality-sample-apps?search=augmented%20reality&channel=11.

Shinymedia; "DEMO: World's First Augmented Reality Glasses-Vuzix Wrap 920 AR"; YouTube; uploaded Oct. 27, 2010; pp. 1-2; located at: http://www.youtube.com/watch?v=xfiZQW0k2Ro.

Taoistflyer; "Google Glasses (How It Works)"; YouTube; uploaded Apr. 7, 2012; pp. 1-2; located at: http://www.youtube.com/watch?v=Nc4ox89bofk&feature=related.

Total Immersion Home Page; bearing a date of 2012, printed on Sep. 27, 2012; pp. 1-2; Total Immersion; located at: http://www.t-immersion.com/.

Toucharcade; "Augmented Reality Demo"; YouTube; uploaded Mar. 26, 2009; pp. 1-2; located at: http://www.youtube.com/watch?v=QoZRHLmUKtM.

Vuzix—View the Future Today Home Page; bearing a date of Sep. 18, 2012, printed on Sep. 27, 2012; p. 1; Vuzix; located at: http://www.vuzix.com/home/.

Broll et al.; "An Infrastructure for Realizing Custom-Tailored Augmented Reality User Interfaces"; IEEE Transactions on Visualization and Computer Graphics; Nov./Dec. 2005; pp. 722-733; vol. 11, No. 6; IEEE Computer Society.

Irawati et al.; "VARU Framework: Enabling Rapid Prototyping of VR, AR and Ubiquitous Applications"; IEEE Virtual Reality Conference, Reno, NV; Mar. 8-12, 2008; pp. 201-208.

PCT International Search Report; International App. No. PCT/US2014/025639; Jul. 17, 2014; pp. 1-4.

PCT International Search Report; International App. No. PCT/US2014/025604; Jul. 11, 2014; pp. 1-3.

PCT International Search Report; International App. No. PCT/US2014/025669; Jul. 9, 2014; pp. 1-3.

PCT International Search Report; International App. No. PCT/US2014/025579; Jul. 29, 2014; pp. 1-4.

* cited by examiner

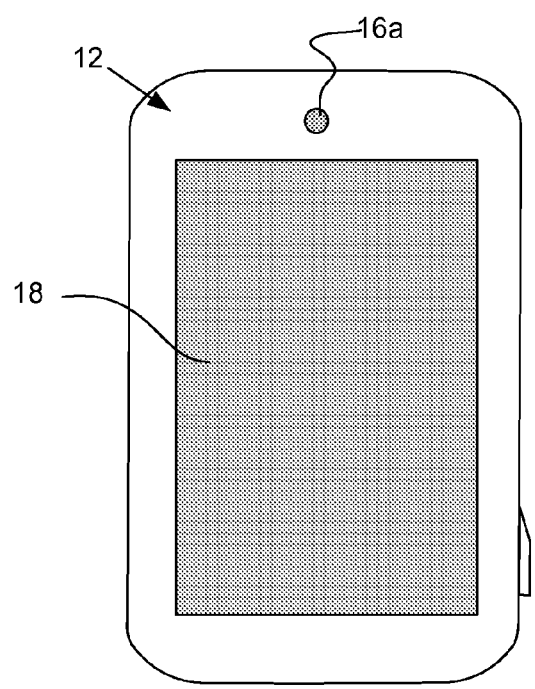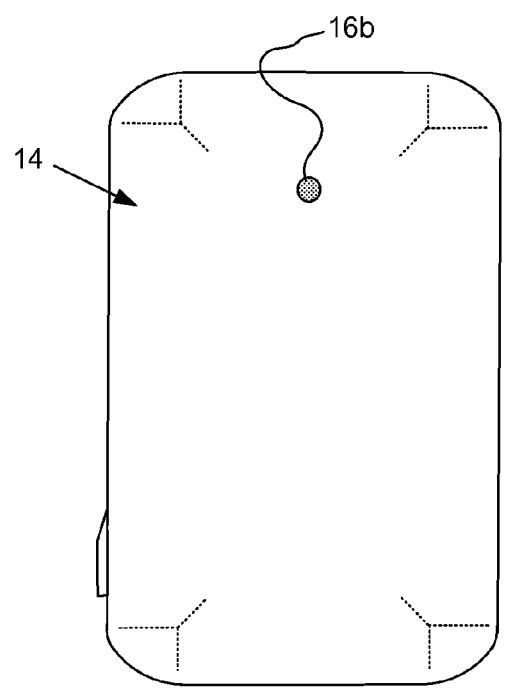
FIG. 1A
FIG. 1B

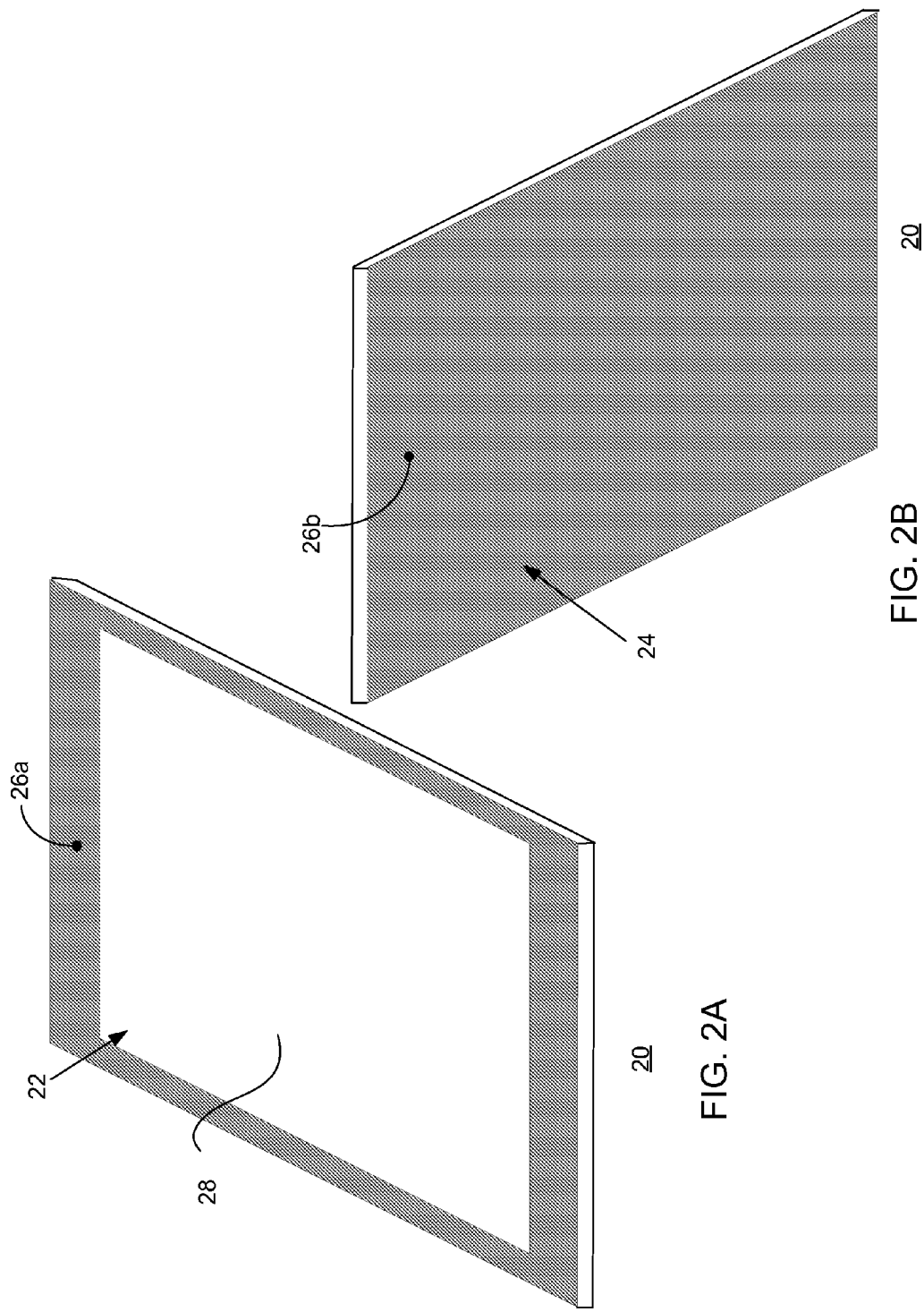

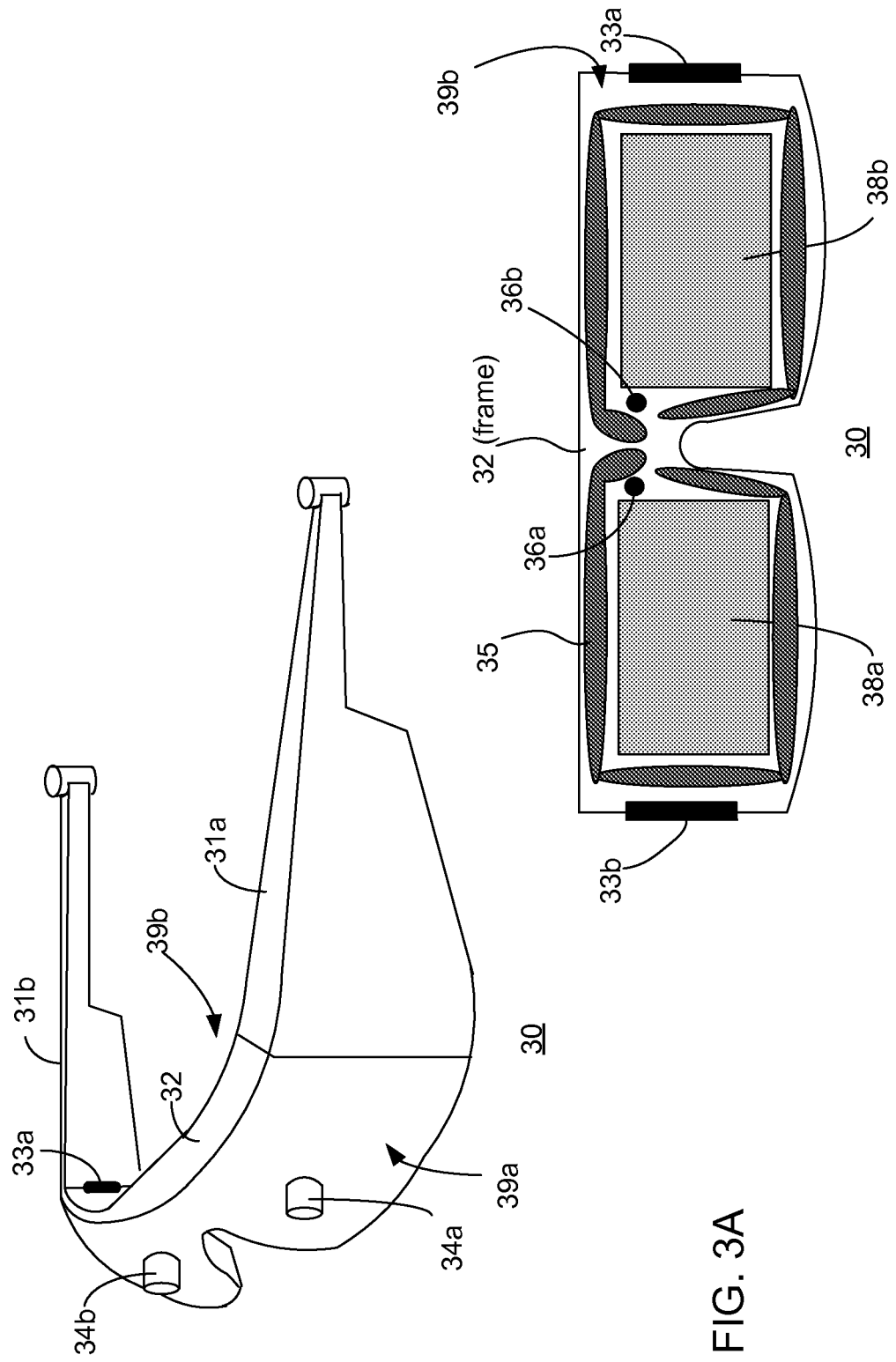

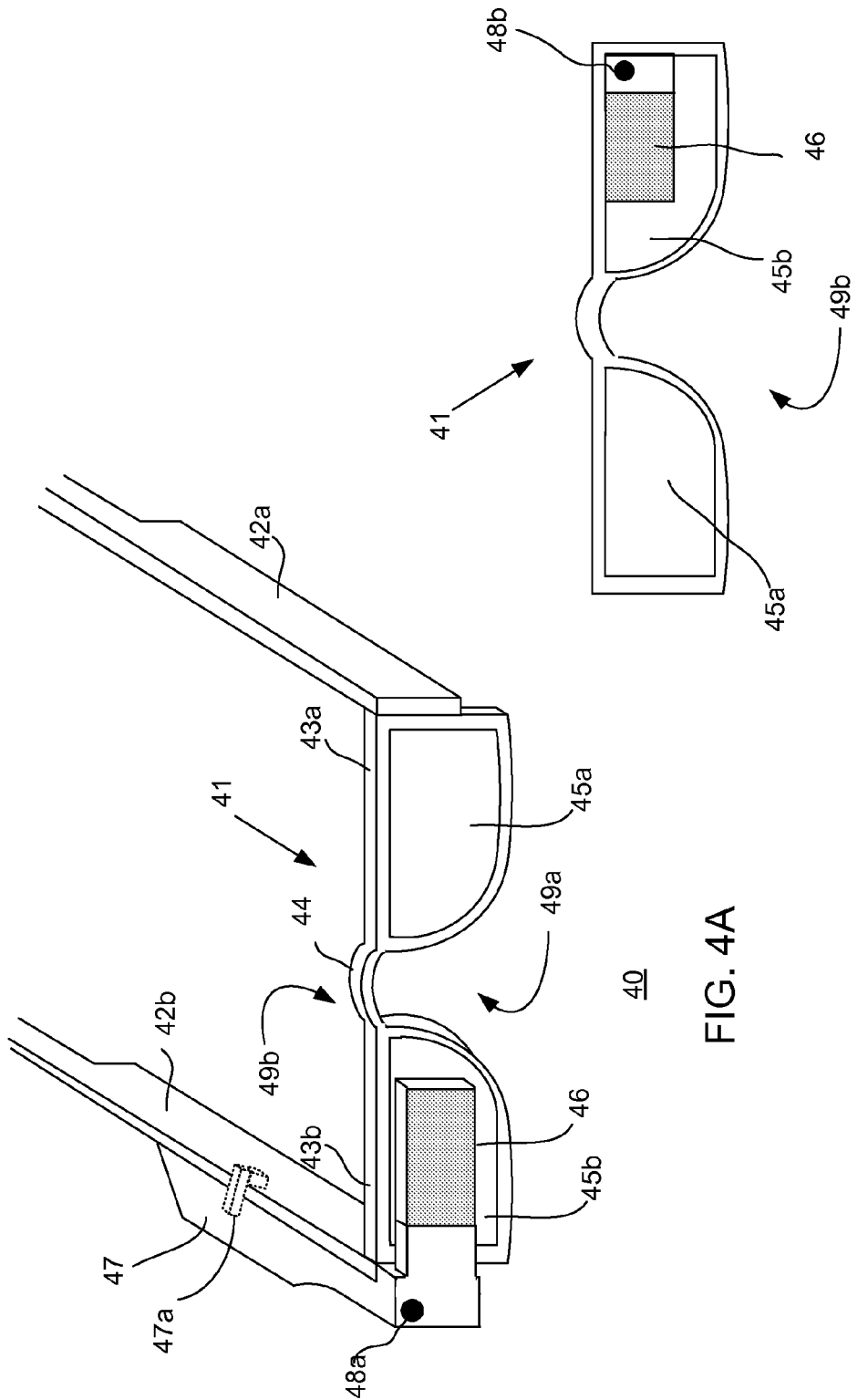

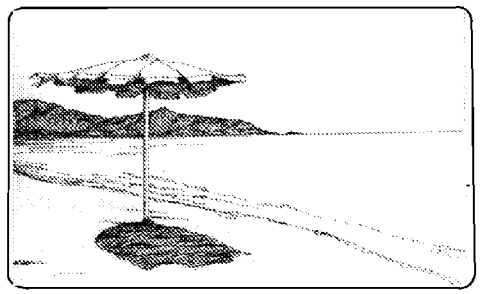
Actual View 60a
FIG. 6A
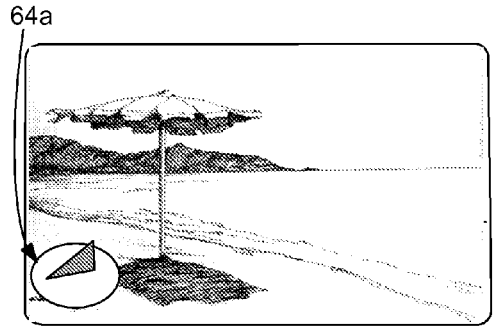
Aug View 60b
FIG. 6B
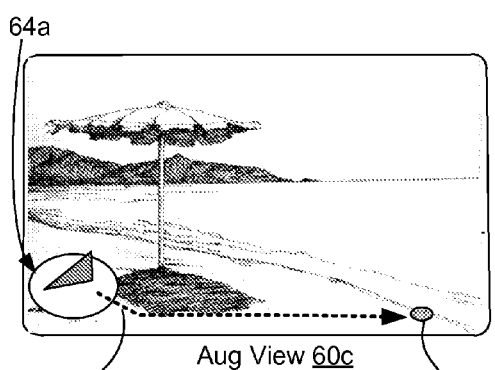
Aug View 60c
Dwell path 66a    FIG. 6C    Eye focus 65a
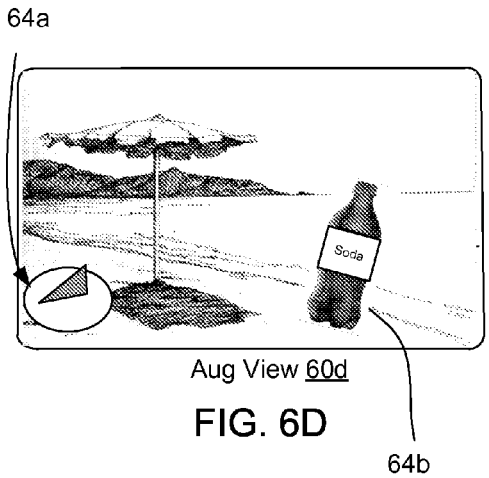
Aug View 60d
FIG. 6D
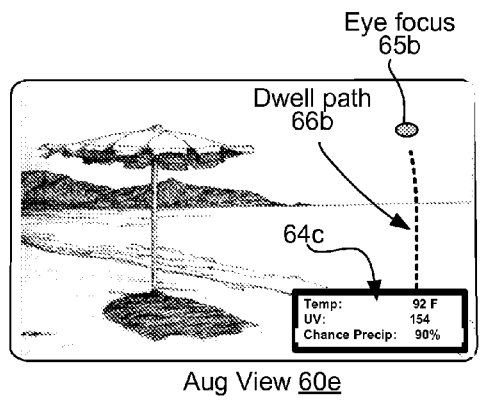
Aug View 60e
FIG. 6E
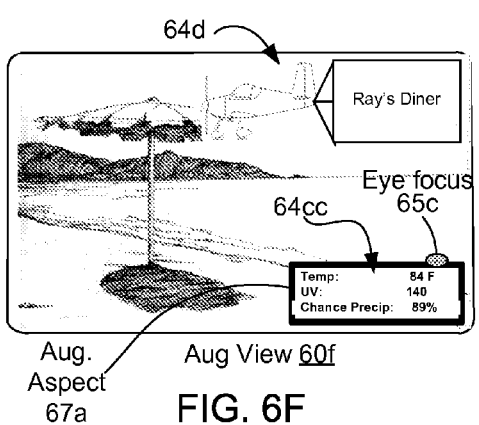
Aug. Aspect 67a    Aug View 60f
FIG. 6F

CORRELATING USER REACTIONS WITH AUGMENTATIONS DISPLAYED THROUGH AUGMENTED VIEWS

If an Application Data Sheet (ADS) has been filed on the filing date of this application, it is incorporated by reference herein. Any applications claimed on the ADS for priority under 35 U.S.C. §§119, 120, 121, or 365(c), and any and all parent, grandparent, great-grandparent, etc. applications of such applications, are also incorporated by reference, including any priority claims made in those applications and any material incorporated by reference, to the extent such subject matter is not inconsistent herewith.

CROSS-REFERENCE TO RELATED APPLICATIONS

The present application is related to and/or claims the benefit of the earliest available effective filing date(s) from the following listed application(s) (the "Priority Applications"), if any, listed below (e.g., claims earliest available priority dates for other than provisional patent applications or claims benefits under 35 USC §119(e) for provisional patent applications, for any and all parent, grandparent, great-grandparent, etc. applications of the Priority Application(s)). In addition, the present application is related to the "Related Applications," if any, listed below.

PRIORITY APPLICATIONS

For purposes of the USPTO extra-statutory requirements, the present application constitutes a continuation-in-part of U.S. patent application Ser. No. 13/723,610, entitled CORRELATING USER REACTION WITH AT LEAST AN ASPECT ASSOCIATED WITH AN AUGMENTATION OF AN AUGMENTED VIEW, naming GENE FEIN; ROYCE A. LEVIEN; RICHARD T. LORD; ROBERT W. LORD; MARK A. MALAMUD; JOHN D. RINALDO, JR.; CLARENCE T. TEGREENE as inventors, filed 21, Dec., 2012, which is currently co-pending or is an application of which a currently co-pending application is entitled to the benefit of the filing date, and which is a continuation of U.S. patent application Ser. No. 13/721,340, entitled CORRELATING USER REACTION WITH AT LEAST AN ASPECT ASSOCIATED WITH AN AUGMENTATION OF AN AUGMENTED VIEW, naming GENE FEIN; ROYCE A. LEVIEN; RICHARD T. LORD; ROBERT W. LORD; MARK A. MALAMUD; JOHN D. RINALDO, JR.; CLARENCE T. TEGREENE as inventors, filed 20, Dec., 2012.

For purposes of the USPTO extra-statutory requirements, the present application constitutes a continuation-in-part of U.S. patent application Ser. No. 13/711,095, entitled SYSTEMS AND METHODS FOR OBTAINING AND USING AUGMENTATION DATA AND FOR SHARING USAGE DATA, naming GENE FEIN; ROYCE A. LEVIEN; RICHARD T. LORD; ROBERT W. LORD; MARK A. MALAMUD; JOHN D. RINALDO, JR.; CLARENCE T. TEGREENE as inventors, filed 11, Dec., 2012, which is currently co-pending or is an application of which a currently co-pending application is entitled to the benefit of the filing date, and which is a continuation of U.S. patent application Ser. No. 13/709,465, entitled SYSTEMS AND METHODS FOR OBTAINING AND USING AUGMENTATION DATA AND FOR SHARING USAGE DATA, naming GENE FEIN; ROYCE A. LEVIEN; RICHARD T. LORD; ROBERT W. LORD; MARK A. MALAMUD; JOHN D. RINALDO, JR.; CLARENCE T. TEGREENE as inventors, filed 10, Dec., 2012.

For purposes of the USPTO extra-statutory requirements, the present application constitutes a continuation-in-part of U.S. patent application Ser. No. 13/690,003, entitled SYSTEMS AND METHODS FOR SHARING AUGMENTATION DATA, naming GENE FEIN; ROYCE A. LEVIEN; RICHARD T. LORD; ROBERT W. LORD; MARK A. MALAMUD; JOHN D. RINALDO, JR.; CLARENCE T. TEGREENE as inventors, filed 30, Nov., 2012, which is currently co-pending or is an application of which a currently co-pending application is entitled to the benefit of the filing date, and which is a continuation of U.S. patent application Ser. No. 13/689,372, entitled SYSTEMS AND METHODS FOR SHARING AUGMENTATION DATA, naming GENE FEIN; ROYCE A. LEVIEN; RICHARD T. LORD; ROBERT W. LORD; MARK A. MALAMUD; JOHN D. RINALDO, JR.; CLARENCE T. TEGREENE as inventors, filed 29, Nov., 2012.

For purposes of the USPTO extra-statutory requirements, the present application constitutes a continuation-in-part of U.S. patent application Ser. No. 13/673,070, entitled PRESENTING AN AUGMENTED VIEW IN RESPONSE TO ACQUISITION OF DATA INFERRING USER ACTIVITY, naming GENE FEIN; ROYCE A. LEVIEN; RICHARD T. LORD; ROBERT W. LORD; MARK A. MALAMUD; JOHN D. RINALDO, JR.; CLARENCE T. TEGREENE as inventors, filed 9, Nov., 2012, which is currently co-pending or is an application of which a currently co-pending application is entitled to the benefit of the filing date, and which is a continuation of U.S. patent application Ser. No. 13/672,575, entitled PRESENTING AN AUGMENTED VIEW IN RESPONSE TO ACQUISITION OF DATA INFERRING USER ACTIVITY, naming GENE FEIN; ROYCE A. LEVIEN; RICHARD T. LORD; ROBERT W. LORD; MARK A. MALAMUD; JOHN D. RINALDO, JR.; CLARENCE T. TEGREENE as inventors, filed 8, Nov., 2012.

For purposes of the USPTO extra-statutory requirements, the present application constitutes a continuation-in-part of U.S. patent application Ser. No. 13/648,012, entitled FORMATTING OF ONE OR MORE PERSISTENT AUGMENTATIONS IN AN AUGMENTED VIEW IN RESPONSE TO MULTIPLE INPUT FACTORS, naming GENE FEIN; ROYCE A. LEVIEN; RICHARD T. LORD; ROBERT W. LORD; MARK A. MALAMUD; JOHN D. RINALDO, JR.; CLARENCE T. TEGREENE as inventors, filed 9, Oct., 2012, which is currently co-pending or is an application of which a currently co-pending application is entitled to the benefit of the filing date, and which is a continuation of U.S. patent application Ser. No. 13/646,147, entitled FORMATTING OF ONE OR MORE PERSISTENT AUGMENTATIONS IN AN AUGMENTED VIEW IN RESPONSE TO MULTIPLE INPUT FACTORS, naming GENE FEIN; ROYCE A. LEVIEN; RICHARD T. LORD; ROBERT W. LORD; MARK A. MALAMUD; JOHN D. RINALDO, JR.; CLARENCE T. TEGREENE as inventors, filed 5, Oct., 2012.

RELATED APPLICATIONS

None

The United States Patent Office (USPTO) has published a notice to the effect that the USPTO's computer programs require that patent applicants reference both a serial number and indicate whether an application is a continuation, continuation-in-part, or divisional of a parent application. Stephen G. Kunin, Benefit of Prior-Filed Application, USPTO Official Gazette Mar. 18, 2003. The USPTO further has provided forms for the Application Data Sheet which allow automatic loading of bibliographic data but which require identification of each application as a continuation, continuation-in-part, or divisional of a parent application. The present Applicant Entity (hereinafter "Applicant") has provided above a specific reference to the application(s) from which priority is being claimed as recited by statute. Applicant understands that the statute is unambiguous in its specific reference language and does not require either a serial number or any characterization, such as "continuation" or "continuation-in-part," for claiming priority to U.S. patent applications. Notwithstanding the foregoing, Applicant understands that the USPTO's computer programs have certain data entry requirements, and hence Applicant has provided designation(s) of a relationship between the present application and its parent application(s) as set forth above and in any ADS filed in this application, but expressly points out that such designation(s) are not to be construed in any way as any type of commentary and/or admission as to whether or not the present application contains any new matter in addition to the matter of its parent application(s).

If the listings of applications provided above are inconsistent with the listings provided via an ADS, it is the intent of the Applicant to claim priority to each application that appears in the Priority Applications section of the ADS and to each application that appears in the Priority Applications section of this application.

All subject matter of the Priority Applications and the Related Applications and of any and all parent, grandparent, great-grandparent, etc. applications of the Priority Applications and the Related Applications, including any priority claims, is incorporated herein by reference to the extent such subject matter is not inconsistent herewith.

SUMMARY

In one or more various aspects, a method includes but is not limited to receiving first data that at least identifies one or more augmentations that were remotely displayed in one or more remotely displayed augmented views of one or more actual scenes, receiving second data indicating one or more user reactions of one or more users in response to the remote display of the one or more remotely displayed augmented views; and correlating the one or more user reactions with the one or more augmentations that were remotely displayed through the one or more remotely displayed augmented views. In some implementations, at least one of the detecting or correlating being performed by a machine, article of manufacture, or composition of matter. In addition to the foregoing, other method aspects are described in the claims, drawings, and text forming a part of the disclosure set forth herein.

In one or more various aspects, one or more related systems may be implemented in machines, compositions of matter, or manufactures of systems, limited to patentable subject matter under 35 U.S.C. 101. The one or more related systems may include, but are not limited to, circuitry and/or programming for effecting the herein-referenced method aspects. The circuitry and/or programming may be virtually any combination of hardware, software, and/or firmware configured to effect the herein-referenced method aspects depending upon the design choices of the system designer, and limited to patentable subject matter under 35 USC 101.

In one or more various aspects, a system includes, but is not limited to, means for receiving first data that at least identifies one or more augmentations that were remotely displayed in one or more remotely displayed augmented views of one or more actual scenes, means for receiving second data indicating one or more user reactions of one or more users in response to the remote display of the one or more remotely displayed augmented views, and means for correlating the one or more user reactions with the one or more augmentations that were remotely displayed through the one or more remotely displayed augmented views. In addition to the foregoing, other system aspects are described in the claims, drawings, and text forming a part of the disclosure set forth herein.

In one or more various aspects, a system includes, but is not limited to, circuitry for receiving first data that at least identifies one or more augmentations that were remotely displayed in one or more remotely displayed augmented views of one or more actual scenes, circuitry for receiving second data indicating one or more user reactions of one or more users in response to the remote display of the one or more remotely displayed augmented views, and circuitry for correlating the one or more user reactions with the one or more augmentations that were remotely displayed through the one or more remotely displayed augmented views. In addition to the foregoing, other system aspects are described in the claims, drawings, and text forming a part of the disclosure set forth herein.

In one or more various aspects, a computer program product, comprising a signal bearing non-transitory storage medium, bearing one or more instructions including, but not limited to, receiving first data that at least identifies one or more augmentations that were remotely displayed in one or more remotely displayed augmented views of one or more actual scenes, receiving second data indicating one or more user reactions of one or more users in response to the remote display of the one or more remotely displayed augmented views, and correlating the one or more user reactions with the one or more augmentations that were remotely displayed through the one or more remotely displayed augmented views. In addition to the foregoing, other computer program product aspects are described in the claims, drawings, and text forming a part of the disclosure set forth herein.

In addition to the foregoing, various other method and/or system and/or program product aspects are set forth and described in the teachings such as text (e.g., claims and/or detailed description) and/or drawings of the present disclosure.

The foregoing is a summary and thus may contain simplifications, generalizations, inclusions, and/or omissions of detail; consequently, those skilled in the art will appreciate that the summary is illustrative only and is NOT intended to be in any way limiting. Other aspects, features, and advantages of the devices and/or processes and/or other subject matter described herein will become apparent by reference to the detailed description, the corresponding drawings, and/or in the teachings set forth herein.

BRIEF DESCRIPTION OF THE FIGURES

For a more complete understanding of embodiments, reference now is made to the following descriptions taken in connection with the accompanying drawings. The use of the same symbols in different drawings typically indicates similar or identical items, unless context dictates otherwise. The illustrative embodiments described in the detailed description, drawings, and claims are not meant to be limiting. Other embodiments may be utilized, and other changes may be made, without departing from the spirit or scope of the subject matter presented here.

FIGS. 1A and 1B show the front and back views of an augmented reality (AR) device that is in the form of a smartphone 10.

FIGS. 2A and 2B show the front and back views of an augmented reality (AR) device that is in the form of a tablet computer 20.

FIGS. 3A and 3B show different views of an augmented reality (AR) device that is in the form of a goggle 30.

FIGS. 4A and 4B show different views of an augmented reality (AR) device that is in the form of a goggle 40.

FIGS. 6A, 6B, 6C, 6D, 6E, 6F, 6G, 6H, 6I, 6K, and 6M show exemplary actual and augmented views of various scenes from the real environment.

DETAILED DESCRIPTION

Figure 5A:
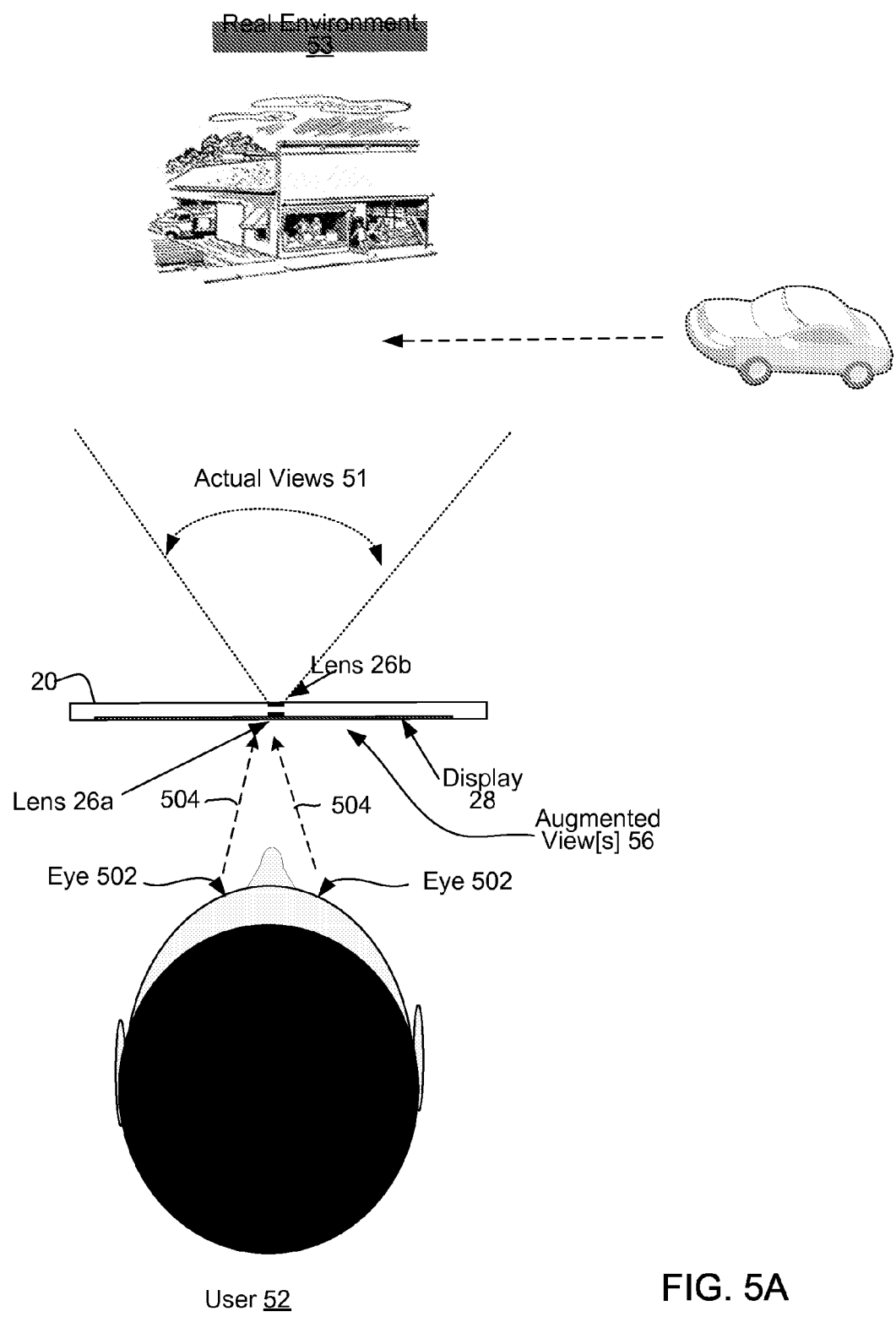
FIG. 5A shows a user 52 using an AR device in a form of the tablet computer 20 of FIGS. 2A and 2B in order to view two different scenes in the real environment 53 at two different points or increments in time.

In the following detailed description, reference is made to the accompanying drawings, which form a part hereof. In the drawings, similar symbols typically identify similar or identical components or items, unless context dictates otherwise. The illustrative embodiments described in the detailed description, drawings, and claims are not meant to be limiting. Other embodiments may be utilized, and other changes may be made, without departing from the spirit or scope of the subject matter presented here.

Throughout this application, examples and lists are given, with parentheses, the abbreviation "e.g.," or both. Unless explicitly otherwise stated, these examples and lists are merely exemplary and are non-exhaustive. In most cases, it would be prohibitive to list every example and every combination. Thus, smaller, illustrative lists and examples are used, with focus on imparting understanding of the claim terms rather than limiting the scope of such terms.

The evolution of personal computing technology over the past 40 years has been simply breathtaking, evolving from clunky large personal desktop computing devices with poor resolution television monitors and limited functionality to sleek and powerful mobile computing devices such as tablet computers and smartphones. As the personal computing technology continues to evolve a number of promising and exciting new technologies have emerged that are rapidly being developed for widespread personal use. One of the most promising new technologies is Augmented Reality (or simply "AR").

Wikipedia™ defines Augmented Reality as "a live, direct or indirect, view of a physical, real-world environment whose elements are augmented by computer-generated sensory input such as sound, video, graphics or GPS data." In order to facilitate understanding of the various concepts, processes, and systems to be discussed herein, certain basic terms and phrases will now be introduced and elucidated. For example, in the following the terms "augmentation," "augmented view," "actual view," "scene from a real environment," or variations thereof, are repeatedly recited. For purposes of the following, the phrase "scene from a real environment" will be in reference to an actual or true (visual) scene from an actual physical environment (as opposed to, for example, a virtual environment) in the proximate vicinity of an AR system and/or the user of the AR system (herein "AR device user"). For purposes of the following description, the phrase "actual view" is in reference to a true or unmodified (or substantially true or unmodified) view of a scene from the real environment. The phrase "augmented view," in contrast, is in reference to a view of an actual scene from the real environment that has been augmented (e.g., modified) and that may be presented (e.g., displayed or transmitted) through an AR system. An "augmentation" is any modification, revision, or addition that may be included in an augmented view of a scene from the real environment and that may not be present in the actual view of the scene from the real environment.

There are at least two types of computing devices that can be used to implement AR technology: "specifically-designed" AR systems and "nonspecifically-designed" AR systems. Nonspecifically-designed AR systems are general purpose computing systems or devices that can be configured to implement AR functionalities by executing, for example, AR software applications. Examples of such devices include, for example, personal mobile computing/communication devices such as tablet computers and smartphones. In contrast, specifically-designed AR systems are systems or devices that have been specifically designed to implement AR functionalities. Specifically-designed AR systems may come in a variety of forms but are most commonly in the form of a head-mounted display (HMD) such as in the form of eyeglasses, goggles, helmet, and so forth. These devices are sometimes referred to as "wearable computing devices." Typically these wearable computing devices will include one or more features that allows the user to wear the device on his/or her head (e.g., a coupling device for coupling the AR device to a user's head). Such features include, for example, a strap, a pair of earpieces or temple pieces (e.g., the parts of goggles or glasses that are attached to the frame of, for example, a glasses and that extend out to the ears of the user holding the eyeglasses frame to the face of the user—see example 42a or 42b of FIG. 4A, or in the case of a helmet the helmet structure itself). Alternatively, a wearable computing device may be made wearable by having a feature (e.g., one or more clips or hooks) that allows it to be attached or clipped onto the frame of a pair of glasses or goggles thus allowing the AR device to be coupled to the user's head. An example of such a feature may be found in the form of a clip 47a as illustrated in FIG. 4A.

All of these devices (e.g., specifically-designed AR systems and nonspecifically-designed AR systems) will usually have certain common components including one or more cameras (e.g., digital, web, and/or HD cameras), one or more displays (e.g., LCD displays or see-through displays), and logic for processing data generated by the one or more cameras and/or for generating and merging computer generated data or images with actual views or images of scenes from real world environment to generate augmented views of the scenes of the real world environment. Although most if not all current AR systems will contain these same basic components (e.g., camera, display, etc.), they can, however, take on a wide range of form factors as briefly described above (e.g., tablet computer, goggles, glasses, helmets, and so forth).

FIGS. 1A and 1B, 2A and 2B, 3A and 3B, and 4A and 4B illustrate some of the form factors that current AR devices can take on. For example, FIG. 1A depicts the front-side 12 (e.g., the side of a personal computing/communication device that a display is located or disposed on), respectively, of a non-specifically-designed AR system that is in the form of a smartphone 10 and that can be configured or designed to implement one or more AR functionalities. FIG. 1B shows the backside 14 (e.g., the side of a personal computing/communication device that is opposite of the front-side 12 personal computing/communication device) of the exemplary smartphone 10 of FIG. 1A. The exemplary smartphone 10 may include a display 18, such as a touchscreen or liquid crystal display (LCD), on the front-side 12 of the smartphone 10. The smartphone 10 of FIGS. 1A and 1B is also depicted as having lens 16a for an inward-facing camera on the front-side 12 and lens 16b for a forward-facing camera on the back-side 14 of the smartphone 10. When employed to provide one or more augmented views of one or more scenes of real world environments, the display 18 may be used in order to display the augmented views. In some cases, the inward-facing camera associated with lens 16a may be used in order to track the gaze, focus, dwell path, and/or dwell time of one or more eyes of a user. The forward-facing camera that is associated with lens 16b, on the other hand, may be used to capture (e.g., sense and/or record) actual scenes of real world environments in order to generate augmented views of those actual scenes. The generated augmented views may then be displayed through display 18.

FIGS. 2A and 2B illustrates the front-side 22 (e.g., the side of a personal computing/communication device that a display is located or disposed on) and the backside 24 (e.g., the side of the computing/communication device that is opposite of the front-side of the computing/communication device), respectively, of a nonspecifically-designed AR system that is in the form of a tablet computer 20 and that can be configured or designed to implement one or more AR functionalities. In FIGS. 2A and 2B, the tablet computer 20 is depicted as having a display 28, such as a touchscreen, on the front-side 22 of the tablet computer 20. The tablet computer 20 is also depicted as having lens 26a for an inward-facing camera on the front-side 22 and lens 26b for a forward-facing camera on the back-side 24 of the tablet computer 20.

In some cases, the inward-facing camera associated with lens 26a may be used in order to track the gaze, focus, dwell path, and/or dwell time of one or more eyes of a user. The forward-facing camera associated with lens 26b on the backside 24 of the tablet computer 20 may be used to capture (e.g., sense and/or record) actual scenes of real world environments in order to generate augmented views of those actual scenes. Note that in some cases, a single camera may be coupled to both lens 26a and lens 26b, thus the single camera can act as both a forward-facing and rear-facing camera. The generated augmented views may then be displayed through display 28. References to "real environment" or "real world environment" herein may be in reference to true or actual physical environments rather than to a virtual environment or virtual world.

FIGS. 3A and 3B illustrate a specifically-designed AR system in the form of video goggles 30 that can implement one or more AR functionalities. In particular, FIG. 3A illustrates a perspective view of the video goggle 30, which includes, among other things, a frame piece 32, a left temple 31a, and a right temple 31b. Disposed on the front-side 39a of the frame piece 32 are two forwarding looking lenses 34a and 34b for a pair of corresponding forward-looking cameras for capturing (e.g., recording, scanning, sensing, etc.) actual scenes of real world environments in order to generate augmented views of those actual scenes. FIG. 3B illustrates a view of the backside 39b of the frame piece 32 of the exemplary video goggles 30 of FIG. 3A. The backside 39b of the frame piece 32 is depicted as including a left display 38a and a right display 38b, a rim 35 surrounding the left display 38a and the right display 38b, a left lens 36a for a left inward-facing camera and a right lens 36b for a right inward-facing camera, and a left hinge 33b and a right hinge 33a. The rim 35 that may surround the left display 38a and the right display 38b may be a soft, semi-soft, or hard rim that in some cases may act as a cushion, as well as a barrier to prevent excess light from entering a user's field of view (thus allowing the user to better view the left and right displays 38a and 38b).

The forward-looking cameras associated with the forward-looking lens 34a and 34b may be used to capture (e.g., sense and/or record) actual scenes of real world environments in order to generate augmented views of those actual scenes. These augmented views that are generated may then be displayed through displays 38a and 38b. Note that in alternative implementations, the video goggle 30 may only employ a single forward-looking lens for a single forward-looking camera rather than employing two forward-looking lenses 34a and 34b for two forward-looking cameras as illustrated in FIG. 3A. In such implementations, the single forward-looking lens may be disposed at the mid-point or bridge part of the frame piece 32 above where a user's nose would be positioned. The output associated with the corresponding single forward-looking camera would then be displayed through both displays 38a and 38b.

The video goggles 30 may also include inward-looking lenses 36a and 36b as depicted in FIG. 3B for two inward-looking cameras (not shown) on the backside 39b of the frame piece 32 and disposed between the displays 38a and 38b and rim 35. The inward-looking cameras may be employed in order to track the movements as well as the gaze, focus, dwell path, and/or dwell time of one or more eyes of a user. Note that alternatively, the video goggles 30 may include fewer or more inward-looking cameras and inward-looking lenses. Further, there is no requirement that a corresponding camera is needed for each inward-looking lens as it may be possible to employ, for example, a single camera for viewing through multiple lenses.

The frame piece 32, the left temple 31a, and the right temple 31b may house various electronics that are designed for, for example, processing data provided by the various cameras (e.g., forward-looking as well as backward looking cameras), and for generating augmented views of scenes from real world environment that may be displayed through displays 38a and 38b. The types of electronics that may be included with the video goggles 30 may include, for example, the same or similar types of electronics (e.g., microprocessors, controllers, network interface card, memory, etc.) that are often found in mobile computing/communication devices such as the smartphone 10 or the tablet computer 20 described earlier. The left temple 31a and the right temple 31b are features that allow the AR system to be worn on a user's head.

Turning now to FIGS. 4A and 4B, which illustrate a specifically-designed AR system that is in the form of electronic glasses 40 that can implement one or more AR functionalities. In particular, FIG. 4A illustrates a perspective view of the electronic glasses 40, which includes, among other things, a frame piece 41 (which further includes a left rim piece 43a, a right rim piece 43b, and a bridge 44), a left temple 42a, a right temple 42b, a left lens 45a, a right lens 45b, a see-through display 46, and electronics housing 47 (note that in some cases, the electronics housing 47 may include an optional clip 47a for coupling the electronics housing 47 to the right temple 42b. The frame piece 41 having a front-side 49a and a back-side 49b opposite of the front-side 49a. Disposed at the end of the electronics housing 47 is a forward-looking lens 48a for a corresponding forward-looking camera for capturing (e.g., recording, scanning, sensing, etc.) actual scenes of real world environments in order to generate augmented views of those actual scenes. In some alternative implementations, the forward-looking lens 48a may be alternatively located at bridge 44 of the frame piece 41 or at some other location. Note that the left lens 45a and the right lens 45b are optional and are not necessary for implementing AR functionalities.

In FIG. 4A, the see-through display 46 is depicted as covering only a portion of the right lens 45b and being depicted as being attached to the end of the electronics housing 47. Thus, the see-through display 46 may be used to display and overlay computer generated data and/or images onto portions of views of actual scenes of the real world environment that a user might see through right lens 45b. Note again that since the see-through display 46 covers only a portion of the right lens 45b, only a portion of the view that a user may see through the right lens 45b may be augmented (e.g., modified). In some other alternative implementations, the see-through display 46 may alternatively cover the entire right lens 45b so that the entire view of the user through the right lens 45b may be augmented if needed. Although the electronic glasses 40 in FIGS. 4A and 4B is depicted as having only one see-through display 46 over the right lens 45b, in alternative implementations, a second see-through display may be disposed over the left lens 45a. The left temple 42a and the right temple 42b are features that allow the AR system to be worn on a user's head.

FIG. 4B depicts a view of the backside 49b of the frame piece 41 of the electronic glasses 40 depicted in FIG. 4A. In FIG. 4B, the see-through display 46 can be seen through the clear right lens 45b. Further illustrated in FIG. 4B is an inward-looking lens 48b that can be seen through the clear right lens 45b and which is for a corresponding inward-looking camera. As illustrated the inward-looking lens 48b is disposed on the electronics housing 47 near the see-through display 46. The inward-looking cameras may be employed in order to track the movements as well as the gaze, focus, dwell path, and/or dwell time of the right eye of a user. The placement of the inward-looking lens 48b is a design choice and may be located elsewhere so long as it has a view to the right eye of a user. In alternative implementations, a second inward-looking lens for a second inward-looking camera may be included in order to track and monitor the movements as well as the gaze, focus, dwell path, and/or dwell times of the left eye of the user. In the exemplary electronic glasses 40 illustrated in FIG. 4A, all of the major components are depicted as being located on the right-side of the electronic glasses 40. Alternatively, these components (e.g., electronic housing 47, see-through display 46, and so forth) may alternatively or additionally be located on the left-side of the electronic glasses 40.

The electronics housing 47 may house various electronics including electronics that are designed for, for example, processing data provided by the various cameras (e.g., forward-looking as well as inward looking cameras), and for generating augmented views of scenes from real world environment that may be displayed through see-through display 46. The types of electronics that may be included with the electronic glasses 40 may include, for example, the types of electronics (e.g., microprocessors, controllers, network interface card, memory, camera, battery, etc.) that are often found in mobile computing/communication devices such as the smartphone 10 or the tablet computer 20 described earlier.

In some cases, the electronic housing 47 (and its contents including one or more cameras) and the see-through display 46 may be a separate unit that can be clipped onto a prescription or non-prescription eyeglasses. In such an embodiment, the electronic housing 47 may include one or more features (e.g. one or more clips, magnets, straps, and so forth) that allows the housing to be worn by a user by allowing the electronic housing 47 to be attached to a pair of eye-glasses or goggles. Note that although not depicted herein, AR devices may come in other types of forms other than those illustrated in FIGS. 1A, 1B, 2A, 2B, 3A, 3B, 4A, and 4B including, for example, a helmet, a mask, and so forth.

Each of the form factors of AR devices illustrated in FIGS. 1A, 1B, 2A, 2B, 3A, 3B, 4A, and 4B support the ability to detect and monitor various user eye characteristics (e.g., eye movements, pupil characteristics, focus, dwell path, and so forth) of users by employing one or more inward-looking cameras. In addition, some form factors (e.g., the smartphone 10 or the tablet computer 20 illustrated in FIGS. 1A, 1B, 2A, and 2B) also supports systems with inward-facing cameras that can detect and monitor facial expressions of users (e.g., inward-facing camera that can be positioned to capture visual images of all or most of a user's facial features). In some cases, AR devices may also include and/or support other types of sensors (other than cameras) that can detect and monitor other types of user characteristics (e.g., physiological characteristics) when users are using such devices to view, for example, augmented views (as well as actual views).

There are many types of augmentations that can be provided through AR systems including, for example, augmentations in the form of text that may be added to an augmented view, an augmentation in the form of 2 or 3-dimensional visual item (which may or may not be an animation item that can move) that may be added to an augmented view, and/or an augmentation that simply modifies, emphasizes, deletes, or de-emphasizes an existing real world item (e.g., intensity of light, color of a car, removal of undesirable elements in the corresponding real field of view such as rubbish on the ground, etc.) in the augmented view.

One type of augmentation that many currently available AR systems can include into an augmented view of an actual scene of the real environment are vision-based augmentations that depend, for their existence in the augmented view, on the presence of a visual cue (e.g., an "anchor" visual item) in the actual view of a scene from the real environment. That is, in many currently available AR systems, an augmentation will only be included into an augmented view only when a visual cue is detected in the actual view of a scene from the real environment. In some cases, the visual cue (i.e., anchor visual item) that may be the basis for the inclusion of the augmentation in the augmented view may be a visual marker (e.g., a recognizable symbol or pattern such as the face of a dollar bill) that may have been purposefully placed in an actual scene of the real environment in order to prompt an AR system to insert a particular augmentation into the augmented view of the actual scene of the real environment. In other cases, the visual cue may be a recognizable or identifiable visual pattern (e.g., a human face) that may be recognized using image feature analysis (e.g., image tracking such as Parallel Tracking).

There are, of course, other types of augmentations that currently available systems can provide or have been proposed that depend, for their existence in an augmented view, on factors other than visual cues in the actual views of scenes of the real environment. For example, in some current AR systems, an augmentation can be provided that may depend, for its existence in the augmented view, on the location and/or orientation of the AR system that is presenting (e.g., displaying and/or transmitting) the augmented view. In other cases, an AR system may be configured or designed to insert one or more augmentations into an augmented view based on the location of the AR system and/or which direction is the AR system "facing" (e.g., east, west, north, up, down, etc.).

It is contemplated that as the AR technology evolves, one of the challenges that developers and users of AR technology may face is determining the optimal time to display an augmentation and what is the optimal format for presenting such an augmentation. That is, it is likely that in some cases and with respect to at least some types of augmentations it may be highly desirable for such augmentations to be presented only when certain conditions arise. And upon being presenting, having certain selective formats and/or be placed at certain locations of an augmented view. Of course, the specific forms (e.g., specific formats, specific placements in the augmented view, and so forth) that may be applied to augmentations that may depend on the goals of such augmentations. For example, it may be highly desirable to make some augmentations have, at least under some circumstances, certain formats and be placed at certain locations in augmented views that will maximize their visibility or "noticeability." It is also just as likely that with respect to other types of augmentations it may be highly desirable for these augmentations to have, at least under certain circumstances, certain formats and be placed at certain locations in augmented views that will minimize or reduce their visibility or noticeability. The determination of the optimal presenting (e.g., when to optimally present), formatting, and/or placement of augmentations in augmented views may benefit not just users but may benefit third parties (e.g., advertisers, retailers, educational entities, and so forth) that may supply the augmentations.

In accordance with various embodiments, computationally implemented methods, systems, circuitry, articles of manufacture, and computer program products are described herein that are designed to, among other things, acquire a first data from one or more AR devices that at least identifies one or more augmentations that were remotely displayed by the one or more AR devices, the one or more augmentations having been displayed in one or more remotely displayed augmented views of one or more actual scenes; acquire a second data from the one or more AR devices that indicates one or more user reactions of one or more users in response to the remote display of the one or more remotely displayed augmented views; and associating (e.g., correlating) the one or more user reactions with the one or more augmentations that were remotely displayed through the one or more remotely displayed augmented views. In some embodiments, the results of the associating or correlating may be used in order to provide optimal augmentations and/or augmentation formats. In various embodiments, the computationally implemented methods, systems, circuitry, articles of manufacture, and computer program products may be implemented on a network system such as a network server or a plurality of network devices (e.g., network servers).

In some implementations, the computationally implemented methods, systems, circuitry, articles of manufacture, and computer program products may be designed to, among other things, receiving first data that at least identifies one or more augmentations that were remotely displayed in one or more remotely displayed augmented views of one or more actual scenes, receiving second data indicating one or more user reactions of one or more users in response to the remote display of the one or more remotely displayed augmented views; and correlating the one or more user reactions with the one or more augmentations that were remotely displayed through the one or more remotely displayed augmented views. In some embodiments, the computationally implemented methods, systems, circuitry, articles of manufacture, and computer program products may be further designed to developing one or more second augmentations for displaying through one or more augmented views, the one or more second augmentations being based, at least in part, the correlating. In the same or different embodiments, the computationally implemented methods, systems, circuitry, articles of manufacture, and computer program products may additionally or alternatively be designed to transmitting one or more second augmentations for displaying through one or more augmented views, the one or more second augmentations being based, at least in part, the correlating.

Figure 7A:
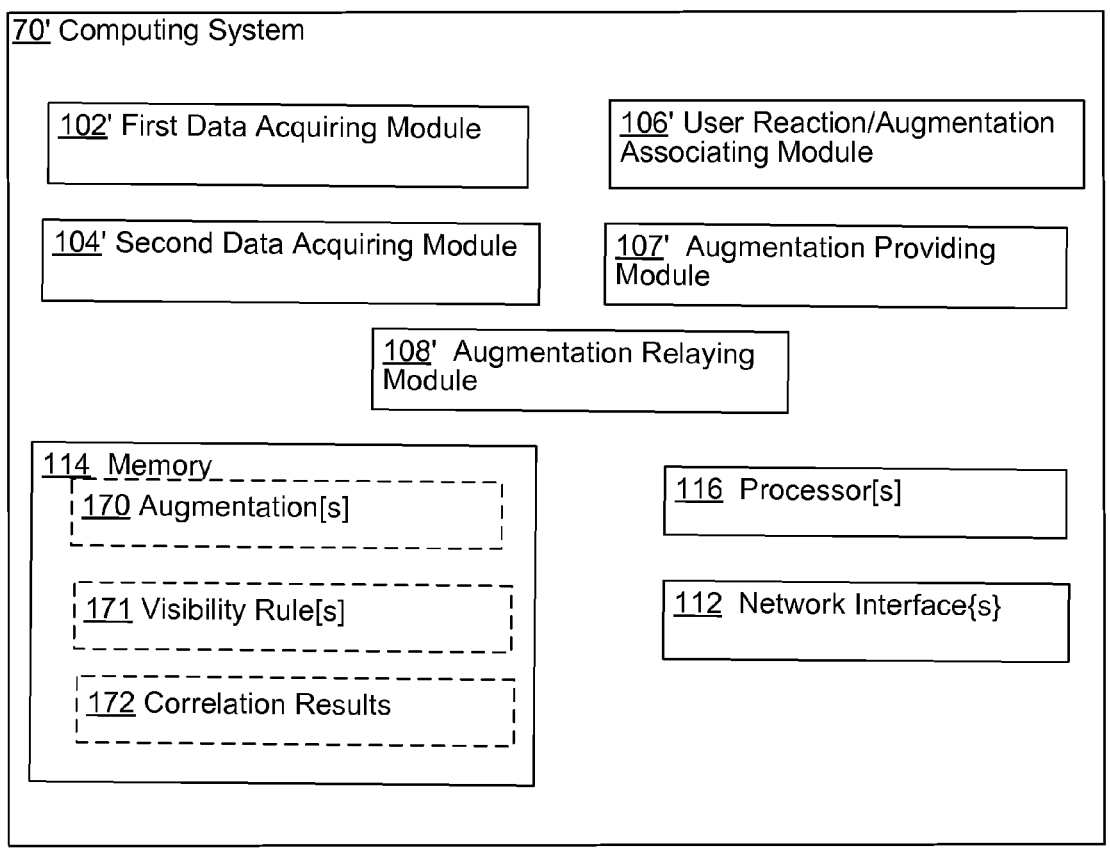
FIG. 7A shows a block diagram of particular implementation of a computing system 70'.
Figure 7B:
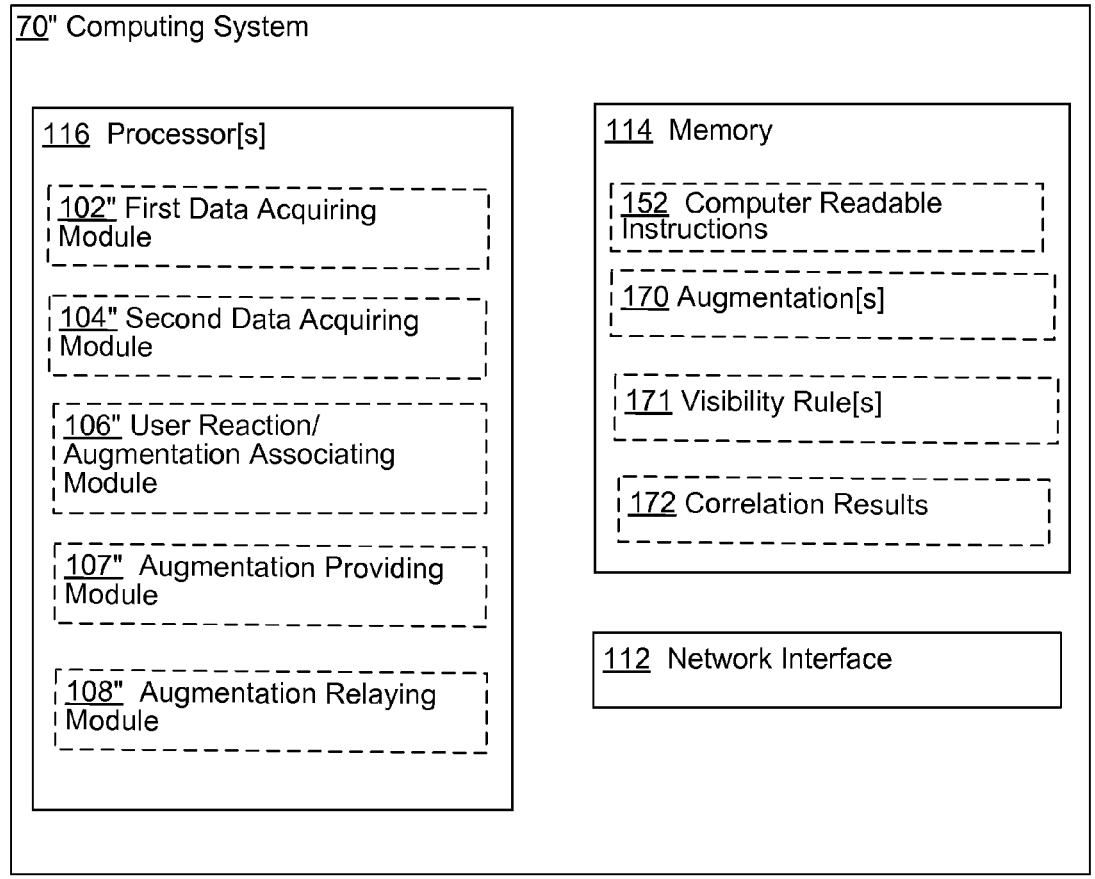
FIG. 7B shows a block diagram of yet another implementation of a computing system 70".

In various embodiments, the methods, systems, circuitry, articles of manufacture, and computer program products in accordance with various embodiments may be implemented by the computing system 70* of FIG. 7A or 7B. Note that for purposes of the following, "*" represents a wildcard. Thus, references in the following to the computing system 70* of FIG. 7A or 7B may be in reference to the computing system 70' of FIG. 7A or to the computing system 70" of FIG. 7B. Note further that the computing system 70* of FIG. 7A or 7B may be a network device such as a network server, or a plurality of network devices (e.g., network servers) that are in communicatively interconnected with each other (e.g., cloud computing colloquially known as "the cloud").

Figure 5B:
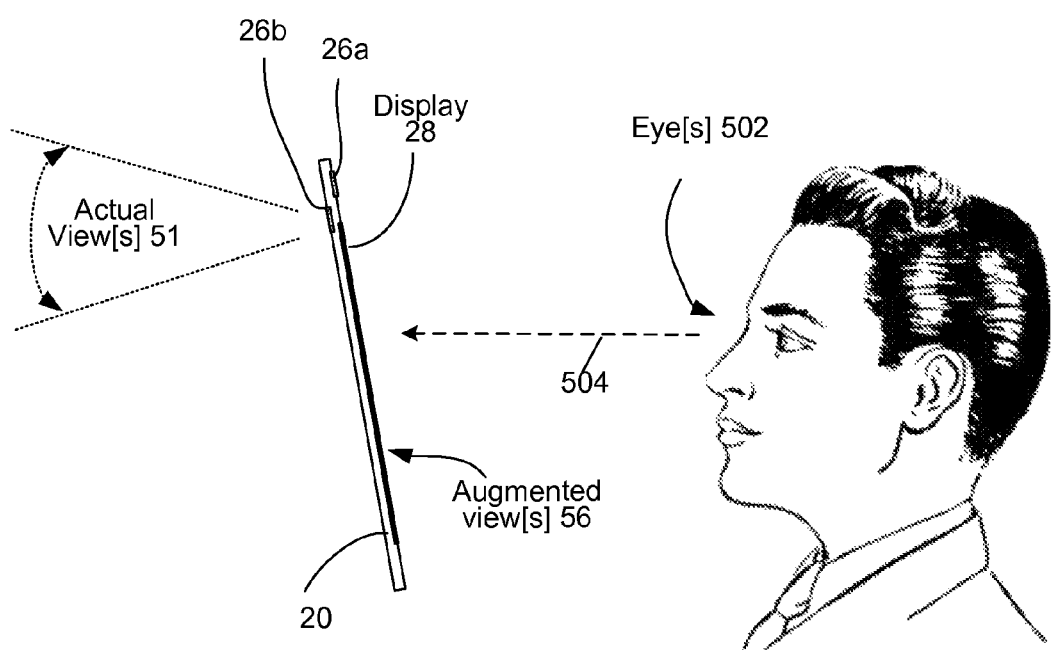
FIG. 5B shows a side view of the user 52 of FIG. 5A using the tablet computer 20 of FIG. 5A.
Figure 5C:
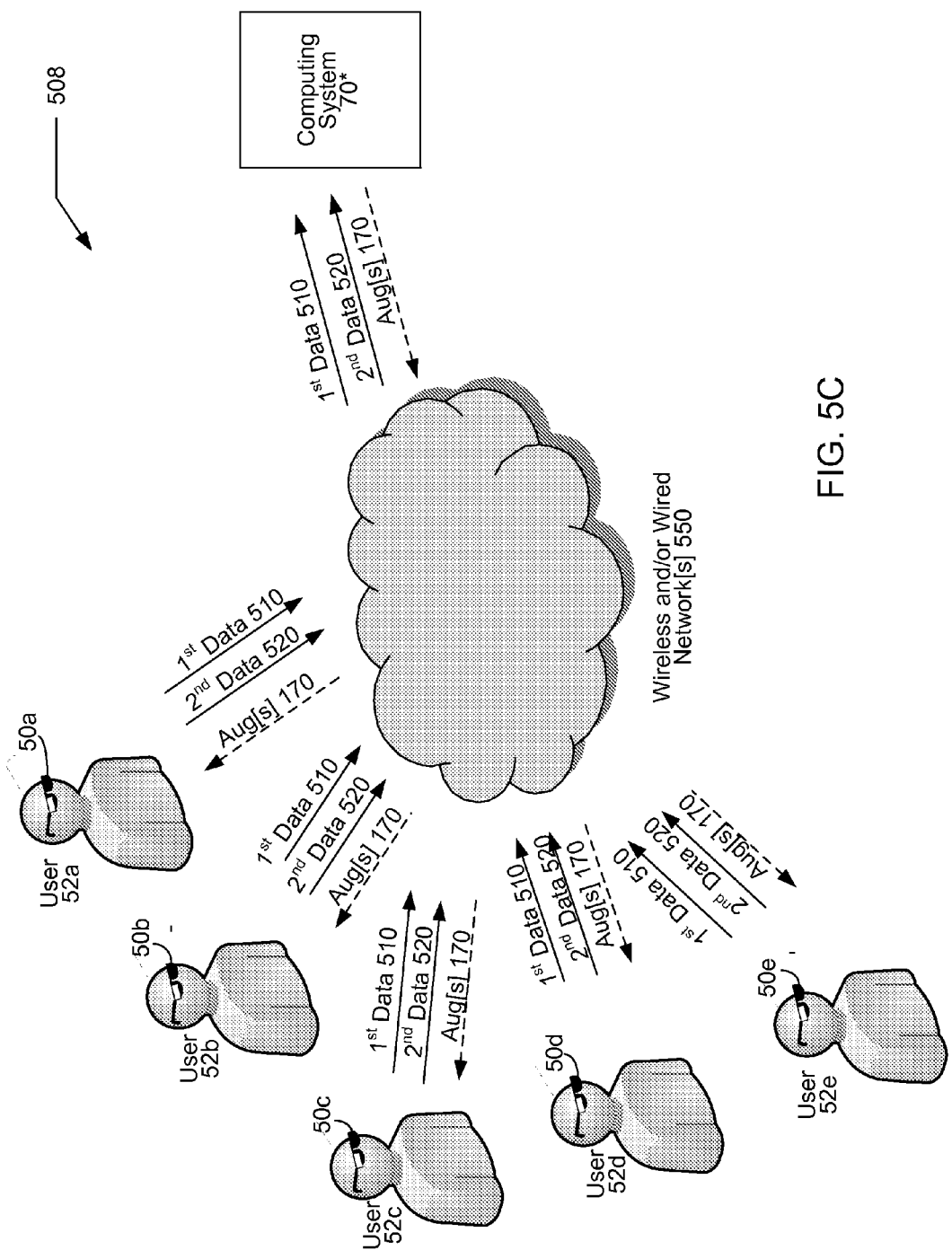
FIG. 5C shows an exemplary environment in which a computing system 70* collects data from a plurality of Augmented Reality (AR) devices 50a, 50b, 50c, 50d, and 50e.

In order to further facilitate understanding of the various operations, processes, and systems to be described herein, certain concepts and terms will now be introduced with references to FIGS. 5A, 5B and 5C. In particular, FIG. 5A is a top-down view of a user 52 (herein simply "user 52") using an AR device that is in the form of a tablet computer 20 (as illustrated in FIGS. 2A and 2B) at different points or increments in time. Note that although the AR device illustrated here is in the form of a tablet computer 20, the concepts to be introduced here as well as in FIG. 5B will apply to other AR devices having other form factors (e.g., a smartphone, a video goggle, electronic glasses, and so forth).

Referring back to FIG. 5A which shows a user 52 viewing actual views 51 of actual scenes from the real (physical) environment 53 surrounding the AR device (e.g., tablet computer 20). The actual views 51 of the actual scenes of the real environment 53 may be captured by a camera through lens 26b at different points in time. That is, an actual scene from the real environment 53 is not only location specific but is also time specific. In this example, the actual views 51 captured by the camera of the tablet computer 20 is the view of a store front. Note that a car is illustrated as being present in the real environment 53 and is depicted as moving towards the line of sight (e.g., actual view 51—field of view) of the tablet computer 20. Thus, although the field of view for the camera of the tablet computer 20 is directed to the same location over length of time, the actual views 51 of the location will change over time (e.g., the actual views 51 will change as, for example, the car (or pedestrians) comes into and/or leaves the field of view of the tablet computer 20.

After capturing the actual views 51 through lens 26b, the tablet computer 20 may display through a display 28 one or more augmented views 56 (each of which include one or more augmentations). The user 52 may view the one or more augmented views 56 that are visually presented through the display 28 using his or her eyes 502. The inward-facing camera through lens 26a may track the eyes 502 of the user 52 as the user 52 views the one or more augmented views 56. In particular, the tablet computer 20 through its inward-facing camera may track one or more characteristics of the eyes 502 of the user 52, including, for example, eye focus 504, dwell path, dwell time, pupil size and shape, and so forth. In various embodiments, a dwell path is the focus path of one or more eyes 502 of a user 52 as the user 52 views, for example, actual and/or augmented views that may be displayed through an AR device (e.g., tablet computer 20). The dwell path may be defined or identified by tracking the path that focus point of the one or more eyes 502 takes along, for example, an augmented view 56 (or non-augmented or actual view) displayed through the AR device (e.g., tablet computer 20). In other words, a dwell path of a user can be best defined by the tracked movement of eye focal points relative to the augmented or non-augmented view that the user is viewing. In contrast, dwell time is the amount of time that a user visually dwells on a, for example, visual object.

Referring now to 5B, which illustrates a side-view of the user 52 using the AR device (e.g., tablet computer 20) as illustrated in FIG. 5A. The display 28 for the tablet computer 20 may visually present one or more augmented views 56 based, at least in part, on one or more captured actual views 51. The inward-facing camera of the tablet computer 20 and through lens 26a may track the one or more eyes 502 of the user 52 including, for example, the eye focus 504 of the user 52 as well as the dwell path and/or dwell time of the user 52 in response to the display of one or more augmented views 56.

Referring now to FIG. 5C, which illustrates an exemplary environment 508 in which a computing system 70* (e.g., a server or multiple servers) collects and processes certain types of information acquired from one or more AR devices 50* (e.g., AR device 50a, AR device 50b, AR device 50c, AR device 50d, and/or AR device 50e). In particular, the computing system 70* may be designed to acquire a first data 510 from one or more AR devices 50* that at least identifies one or more augmentations that were remotely displayed by the one or more AR devices 50* in one or more augmented views of one or more actual scenes. The computing system 70* may be further designed to acquire from the one or more AR devices 50* a second data 520 that indicates one or more user reactions (e.g., physiological reactions such as ocular reactions) of one or more users 52* in response to seeing the one or more augmented views that contained the one or more augmentations. In various embodiments, one or both of the first data 510 and the second data 520 may be acquired by soliciting for such data. In alternative embodiments, however, such data may be received without any prompting by the computing system 70*.

In some embodiments, the first data 510 and the second data 520 may be provided by a single AR device (e.g., the AR device 50a, the AR device 50b, the AR device 50c, the AR device 50d, or the AR device 50e). For example, when an AR device 50a provides a first data that identifies one or more augmentations that were displayed by the AR device 50a in one or more augmented views and when the AR device 50a provides a second data that indicates the one or more user reactions of user 50a to the display of the one or more augmented views containing the one or more augmentations. In other cases, the first data 510 and the second data 520 may be provided by a plurality of AR devices (e.g., the AR device 50a, the AR device 50b, the AR device 50c, the AR device 50d, and the AR device 50e). For example, when multiple AR devices 50* (e.g., the AR device 50a, the AR device 50b, the AR device 50c, the AR device 50d, and the AR device 50e) provide first data 510 that at least identifies one or more augmentations that were included in multiple augmented views that were displayed by the multiple AR devices 50* and when the multiple AR devices 50* provides multiple user reactions of multiple users in response to the display of the multiple augmented views.

In various embodiments, the first data 510 and the second data 520 may be acquired via one or more wireless and/or wired networks 550 (e.g., a cellular telephone or data network, a wireless local area network (WLAN), a wireless wide area network or WAN, a public switched telephone network (PTSN), a personal area network (PAN), a metropolitan area network (MAN), and/or other types of networks). The computing system 70* may also be designed to correlate (e.g., associate or link) the one or more user reactions with the one or more augmentations. The results of such correlation may be useful for optimally providing and formatting future augmentations. Note that although the AR devices 50* illustrated in FIG. 5C are all depicted as being in the form of electronic glasses 40 (see FIGS. 4A and 4B), the concepts to be introduced here will be applicable to situations where the AR devices 50* have other form factors (e.g., smartphones, tablet computers, video goggle, and so forth). A more detail discussion related to the example environment 508 illustrated in FIG. 5C will be provided in greater detail below with respect to the operations and processes to be described herein.

Figure 6G:
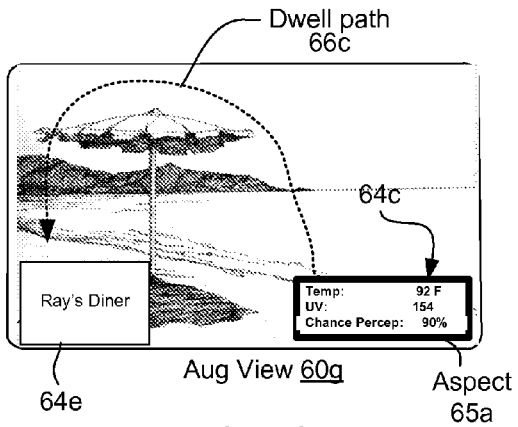

Turning now to FIGS. 6A, 6B, 6C, 6D, 6E, 6F, 6G, 6H, 6I, 6K, and 6M, that illustrate exemplary actual views and augmented views of various scenes from the real environment that may be provided one or more of the AR devices 50* illustrated in FIG. 5C. In particular, the augmented and actual views illustrated in FIGS. 6A, 6B, 6C, 6D, 6E, 6F, 6G, 6H, 6I, 6K, and 6M may be viewed by, for example, the one or more users 52* of FIG. 5C using one or more AR devices 50*. The exemplary actual views and the exemplary augmented views illustrated in these figures are provided in order to facilitate understanding of various concepts that will be described in connection with the various operations and processes to be discussed herein. Referring particularly now to FIG. 6A, which illustrates an actual view 60a of a scene from the real environment. In this case, the actual scene 60a is scene of a "real" beach that may be captured through the field of view of an AR device 50*. Based on the actual view 60a, the AR device 50* may generate an augmented view 60b as illustrated in FIG. 6B. The augmented view 60b includes an augmentation 64a (configured to be in the shape of a sundial) that may have been included in the augmented view 60b based on one or more visibility rules that the AR device 50* may be executing. Visibility rules are directives or instructions that define when or how an augmentation may be presented. For example, in some cases, a visibility rule may require a specific augmentation to be included into an augmented view when a particular "anchor" visual cue is detected as being present in the corresponding actual scene of the real environment that the augmented view is based on. For example, in the example actual view 60a and augmented view 60b illustrated in FIGS. 6A and 6B, the anchor visual cue may be the beach, the blue sky, the ocean, or any combination thereof that are visible in the actual view 60a. Other visibility rules may direct the inclusion of an augmentation into an augmented view based on the location and/or orientation of the AR device 50*.

FIG. 6C illustrates an augmented view 60c of the actual scene (e.g., actual view 60a) depicted in FIG. 6A. Note that augmented view 60c is essentially the same as the augmented view 60b of FIG. 6B except that a dwell path 66a of one or more eyes of a user 52* during and/or immediately following the display of the augmented view 60c has been overlaid on top of the augmented view 60c. Also illustrated in FIG. 6C is the focus point of the one or more eyes of the user 52*, which will now be referred to as eye focus (e.g., eye focus 65a in FIG. 6C)

Based on one or more past user reactions (e.g., dwell path 66a as illustrated in FIG. 6C) of one or more users 52* to the display of the augmented view 60b or 60c (see FIG. 6B or 6C) including the augmentation 64a, an AR device 50* may visually present the augmented view 60d of FIG. 6D. The augmented view 60d includes an augmentation 64b having a particular format (e.g., a shape of a soft drink bottle) and having been placed at a particular location (e.g., right bottom corner of the augmented view 60d and on top of the beach) in the augmented view 60d. The format and/or placement of the augmentation 64b may be based on the detected one or more reactions of one or more users 52* (e.g., eye focus and dwell path, perspiration level of the one or more users 52* based on detected skin characteristics, etc.). Note that in cases where multiple user reactions of multiple users 50* are considered, the basis for the formatting and placement of a particular augmentation in an augmented view may be based on user reactions of the multiple users 52* reacting to the same or similar augmented views (e.g., multiple users 52* reacting to the same augmented beach scene illustrated in FIG. 6D by gazing to the right of the augmentation 64a during and/or immediately following the display of the augmentation 64b).

FIG. 6E illustrates another example augmented view 60e of the beach scene illustrated in FIG. 6A. The example augmented view 60e includes an augmentation 64c that is an informational augmentation indicating environmental information (that shows 90 percent chance of precipitation). Illustrated also in FIG. 6E is the dwell path 66b and the eye focus 65b (e.g., eye focus point) of one or more users 52* during and/or following the display of the augmented view 60e. The example dwell path 66b of the one or more users 52* that is directed skywards in FIG. 6E may have been as result of the one or more users 52* seeing that the augmentation 64c indicating a 90 percent chance of precipitation.

FIG. 6F illustrates another example augmented view 60f that may be generated by an AR device 50*. The augmented view 60f may have been generated based on the detected reaction (e.g., dwell path 66b of FIG. 6E) of one or more users 52* to the display of the augmented view 60e of FIG. 6E (or similar augmented views). Note that augmented view 60f may be a different augmented view from the augmented view 60e of FIG. 6E (e.g., augmented view 60e may have presented on Monday while augmented view 60f may have been presented two days later on Wednesday looking at the same location but with similar conditions). Augmented view 60f includes augmentation 64cc (which includes similar but not the same environmental information as augmentation 64c of FIG. 6E) and augmentation 64d (which may have been formatted and selectively placed in the top right corner of the augmented view 60f based on the reaction of one or more users 52* to the augmented view 60e of FIG. 6E and/or similar augmented views). The augmentation 64d being in the shape of a plane towing a banner. Augmentation 64cc includes an augmentation aspect 67a in the form of a darkened or darkly colored boarder. FIG. 6F also illustrates eye focus 65c of the one or more eyes of a user 52* being on the augmentation aspect 67a.

Referring now to FIG. 6G illustrates another example augmented view 60g of the beach scene illustrated in FIG. 6A. In particular, FIG. 6G illustrates the dwell path 66c of one or more eyes of a user 52* between augmentation 64c and augmentation 64e. The roundabout path of the dwell path 66c may be as result of the precipitation information included in the augmentation 64c. The detected dwell path 66c may, in some embodiments, cause an AR device 50* presenting the augmented view 60g or another AR device 50* viewing the same or similar beach scene to selectively insert any additional augmentations along (or not along) the detected dwell path 66c.

Figure 6H:
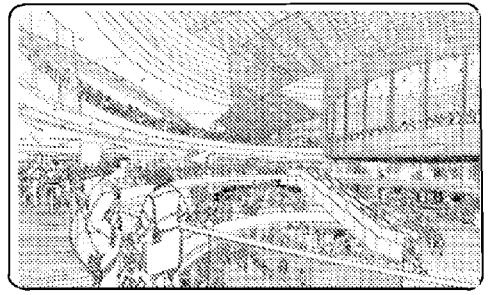
Figure 6I:
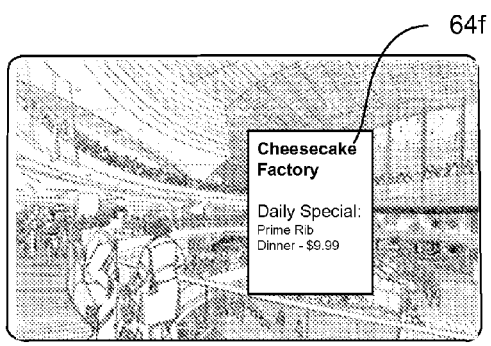

FIG. 6H illustrates an example actual view 60h of an interior scene from a shopping mall as captured by, for example, one of the AR devices 50* illustrated in FIG. 5C. Referring now to FIG. 6I, which illustrates an augmented view 60i of the actual view 60h illustrated in FIG. 6H. Included in the augmented view is an augmentation 64f, which is an informational augmentation that provides menu information of a restaurant that is located in the shopping mall.

Figure 6K:
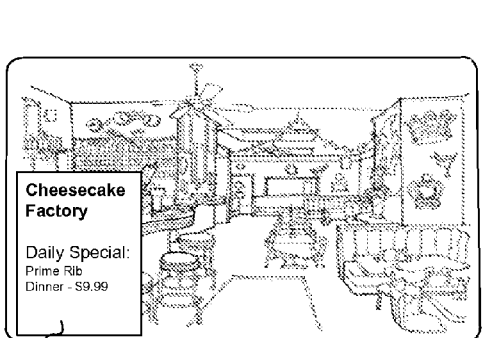

Turning now to FIG. 6K, which illustrates the augmented view 60k of the interior of the restaurant that was referred to above. Included in the augmented view 60k is an augmentation 64g, which contains the same information as the augmentation 64f of FIG. 6I. Note, however, the augmentation 64g has been placed at the left bottom corner of the augmented view 60k rather than in the center of the augmented view 60k as was the case in the augmented view 60i of FIG. 6I. In some cases, the placement of the augmentation 64g at the corner of the augmented view 60k may be based on one or more users 52* reaction to the augmented view 60i of FIG. 6I or to a similar augmented view. That is, it may have been previously determined that one or more users 52* have previously showed very little interest (e.g., very low dwell time or lack of eye focus) in augmentation 64f in the same or similar views because the one or more users 52* may have been, for example, irritated by the placement of the augmentation 64f at the center of the augmented view 60i (or a similar augmented view of a similar actual scene). As a result, the augmentation 64g was selectively placed at the corner of the augmented view 60k in order to not antagonize the user 52* viewing the augmented view 60k.

Figure 6M:
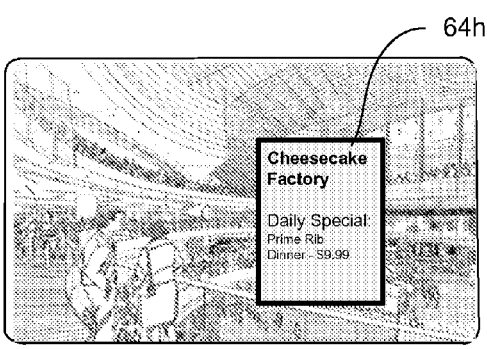

FIG. 6M shows another example augmented view 60m of the interior of a shopping mall as was illustrated in FIG. 6H. The augmented view 60m includes an augmentation 64h that contains similar information as augmentation 64f of FIG. 6I. Note, however, augmentation 64h has a different format (e.g., different coloring and a bolder border) from the format of augmentation 64f. In various embodiments, the augmentation 64h may be as a result of recognizing that users 52* may have previously showed a lack of interest of the original augmentation 64f of FIG. 6I. Note that a more detailed discussion related to FIGS. 6A, 6B, 6C, 6D, 6E, 6F, 6G, 6H, 6I, 6K and 6M will be provided with respect to the operations and processes to be described herein.

Referring now to FIGS. 7A and 7B, illustrating two block diagrams representing two different implementations of device computing system 70* that can execute the operations and processes to be described herein. In particular, and as will be further described herein, FIG. 7A illustrates a computing system 70' that is the "hardwired" or "hard" implementation of a computing system 70' that can implement the operations and processes to be described herein. The computing system 70' may include certain logic modules including, for example, a first data acquiring module 102', a second data acquiring module 104', a user reaction/augmentation associating module 106', an augmentation providing module 107', and an augmentation relaying module 108' that are implemented using purely hardware or circuitry components (e.g., application specific integrated circuit (or ASIC). In contrast, FIG. 7B illustrates a computing system 70" that is the "soft" implementation of the computing system 70' of FIG. 7A in which certain logic modules including a first data acquiring module 102", a second data acquiring module 104", a user reaction/ augmentation associating module 106", an augmentation providing module 107", and/or an augmentation relaying module 108" are implemented using electronic circuitry (e.g., one or more processors including one or more microprocessors, controllers, etc.) executing one or more programming instructions (e.g., software in the form of computer readable instructions 152—see FIG. 7B). In various embodiments, the computing system 70* illustrated in FIGS. 7A and 7B may be a network system (e.g., a network server or a plurality of servers).

The embodiments of the computing system 70* illustrated in FIGS. 7A and 7B are two extreme implementations of the computing system 70* in which all of the logic modules (e.g., the first data acquiring module 102', the second data acquiring module 104', the user reaction/augmentation associating module 106', the augmentation providing module 107', and the augmentation relaying module 108') are implemented using purely hardware solutions (e.g., circuitry such as ASIC) as illustrated in FIG. 7A or in which all of the logic modules (e.g., the first data acquiring module 102", the second data acquiring module 104", the user reaction/augmentation associating module 106", the augmentation providing module 107", and the augmentation relaying module 108") are implemented using software solutions (e.g., programmable instructions in the form of computer readable instructions 152 being executed by hardware such as one or more processors) as illustrated in FIG. 7B. Since, there are many ways of combining hardware, software, and/or firmware in order to implement the various logic modules (e.g., the first data acquiring module 102*, the second data acquiring module 104*, the user reaction/augmentation associating module 106*, the augmentation providing module 107*, and the augmentation relaying module 108*), only the two extreme implementations (e.g., the purely hardware solution as illustrated in FIG. 7A and the software solution of FIG. 7B) are illustrated here. It should be noted here that with respect to the "soft" implementation illustrated in FIG. 7B, hardware in the form of circuitry such as one or more processors 116 are still needed in order to execute the software. Further details related to the two implementations of computing system 70* illustrated in FIGS. 7A and 7B will be provided in greater detail below.

In some instances, one or more components may be referred to herein as "configured to," "configured by," "configurable to," "operable/operative to," "adapted/adaptable," "able to," "conformable/conformed to," "designed to," etc. Those skilled in the art will recognize that such terms (e.g., "configured to") generally encompass active-state components and/or inactive-state components and/or standby-state components, unless context requires otherwise.

Referring particularly now to FIG. 7A, which illustrates a block diagram of a Computing system 70' that includes a first data acquiring module 102', a second data acquiring module 104', an user reaction/augmentation associating module 106', an augmentation providing module 107', and an augmentation relaying module 108', one or more processors 116 (e.g., one or more microprocessors), a memory 114 (that may store one or more augmentations 170, one or more visibility rules 171 (e.g., directives for when and how augmentations are to be presented), and/or one or more correlation results 172), and a network interface 112 (e.g., a network interface card or "NIC"). Although not depicted, the memory 114 may further include other types of application not depicted in FIG. 7A including, for example, communication applications such as an email application and/or an instant messaging (IM) application.

In various embodiments, the first data acquiring module 102' of FIG. 7A is a logic module that may be designed to, among other things, acquire first data that at least identifies one or more augmentations that were remotely displayed in one or more remotely displayed augmented views of one or more actual scenes.

In contrast, the second data acquiring module 104' of FIG. 7A is a logic module that may be configured to acquire second data indicating one or more user reactions of one or more users in response to the remote display of the one or more remotely displayed augmented views. The user reaction/augmentation associating module 106', on the other hand, may be configured to associate the one or more user reactions with the one or more augmentations that were remotely displayed through the one or more remotely displayed augmented views.

Turning now to FIG. 7B, which illustrates a block diagram of another Computing system 70" that can implement the operations and processes to be described herein. As indicated earlier, the Computing system 70" in FIG. 7B is merely the "soft" version of the Computing system 70' of FIG. 7A because the various logic modules: the first data acquiring module 102", the second data acquiring module 104", the user reaction/augmentation associating module 106", the augmentation providing module 107", and the augmentation relaying module 108" are implemented using software and one or more processors 116 (e.g., one or more microprocessors or controllers) executing the software (e.g., computer readable instructions 152) rather than being implemented using purely hardware (e.g., ASIC) as was the case in the Computing system 70' of FIG. 7A. Thus, the first data acquiring module 102", the second data acquiring module 104", the user reaction/augmentation associating module 106", the augmentation providing module 107", and the augmentation relaying module 108" of FIG. 7B may be designed to execute the same functions as the first data acquiring module 102', the second data acquiring module 104', the user reaction/augmentation associating module 106', the augmentation providing module 107', and the augmentation relaying module 108' of FIG. 7A. The Computing system 70", as illustrated in FIG. 7B, has other components (e.g., network interface 112, and so forth) that are the same or similar to the other components included in the Computing system 70' of FIG. 7A. Note that in the embodiment of the Computing system 70\* illustrated in FIG. 7B, the various logic modules (e.g., the first data acquiring module 102", the second data acquiring module 104", and so forth) may be implemented by the one or more processors 116 (or other types of circuitry such as field programmable gate arrays or FPGAs) executing one or more computer readable instructions 152 stored in memory 114.

In various embodiments, the memory 114 of the Computing system 70' of FIG. 7A and the Computing system 70' of FIG. 7B may comprise of one or more of mass storage device, read-only memory (ROM), programmable read-only memory (PROM), erasable programmable read-only memory (EPROM), cache memory such as random access memory (RAM), flash memory, synchronous random access memory (SRAM), dynamic random access memory (DRAM), and/or other types of memory devices.

Figure 8A:
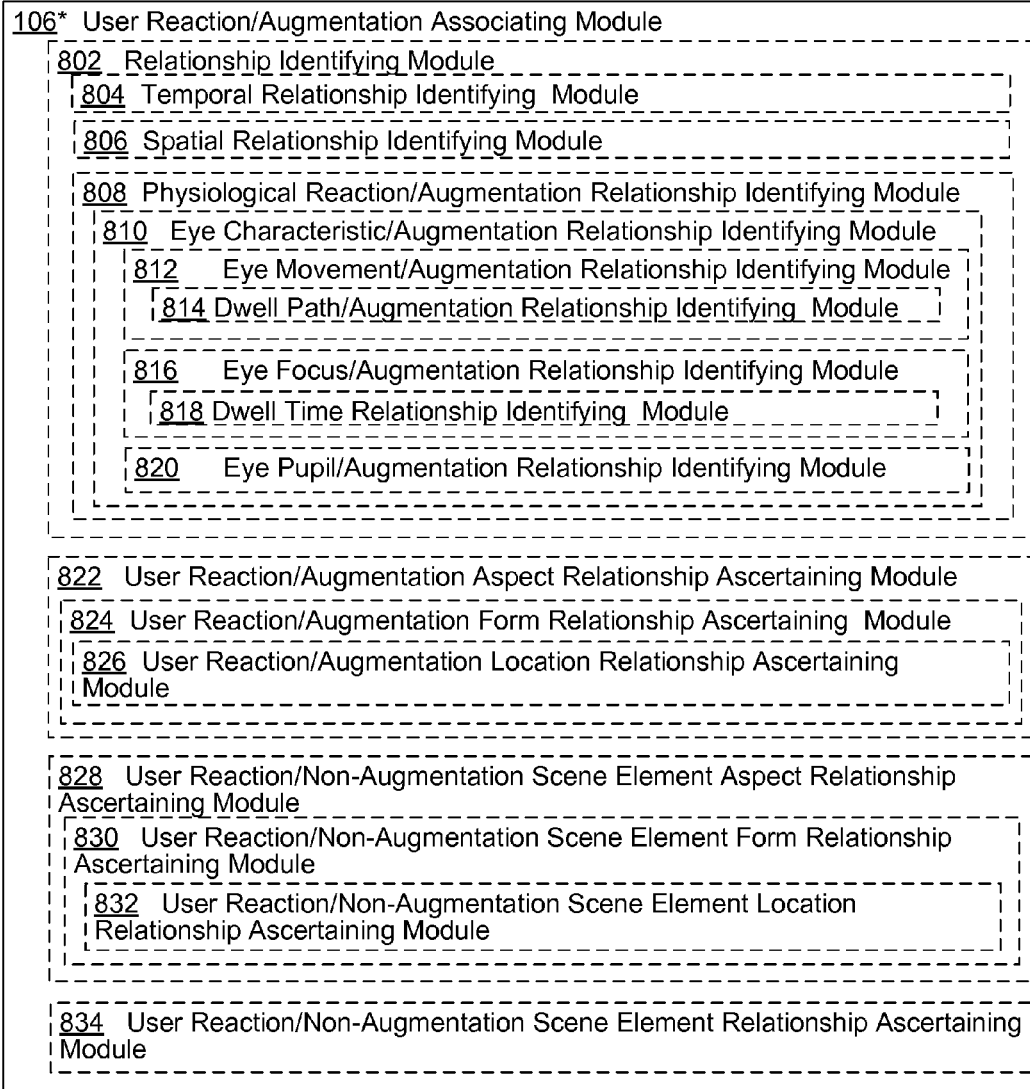
FIG. 8A shows another perspective of the user reaction/augmentation associating module 106* of FIGS. 7A and 7B (e.g., the user reaction/augmentation associating module 106' of FIG. 7A or the user reaction/augmentation associating module 106" of FIG. 7B) in accordance with various implementations.

Turning now to FIG. 8A illustrating a particular implementation of the user reaction/augmentation associating module 106\* (e.g., the user reaction/augmentation associating module 106' or the user reaction/augmentation associating module 106") of FIGS. 7A and 7B. As illustrated, the user reaction/augmentation associating module 106\* may include one or more sub-logic modules in various alternative implementations. For example, in various embodiments, the user reaction/augmentation associating module 106\* may include a relationship identifying module 802, which may further include a temporal relationship identifying module 804, a spatial relationship identifying module 806, and/or a physiological reaction/augmentation relationship identifying module 808 that may further include an eye characteristics/augmentation relationship identifying module 810, which may further include an eye movement/augmentation relationship identifying module 812 (which may further include a dwell path/augmentation relationship identifying module 814), an eye focus/augmentation relationship identifying module 816 (which may further include a dwell time relationship identifying module 818, and/or an eye pupil/augmentation relationship identifying module 820. As further illustrated in FIG. 8A, the user reaction/augmentation associating module 106\* may further include a user reaction/augmentation aspect relationship ascertaining module 822 (which may further include a user reaction/augmentation form relationship ascertaining module 824 that may further include a user reaction/augmentation location relationship ascertaining module 826), a user reaction/non-augmentation scene element aspect relationship ascertaining module 828 (which may further include a user reaction/non-augmentation scene element form relationship ascertaining module 830 that may further include a user reaction/non-augmentation scene element location relationship ascertaining module 832), and/or a user reaction/non-augmentation scene element relationship ascertaining module 834. Specific details related to the user reaction/augmentation associating module 106\* as well as the above-described sub-modules of the user reaction/augmentation associating module 106\* will be provided below with respect to the operations and processes to be described herein.

Figure 8B:
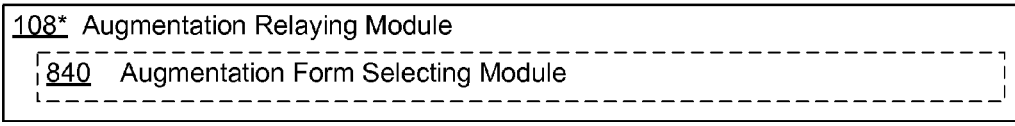
FIG. 8B shows the augmentation relaying module 108* of FIGS. 7A and 7B (e.g., the augmentation relaying module 108' of FIG. 7A or the augmentation relaying module 108" of FIG. 7B) in accordance with various implementations.

FIG. 8B illustrates a particular implementation of the augmentation relaying module 108\* (e.g., the augmentation relaying module 108' or the augmentation relaying module 108") of FIG. 7A or 7B. As illustrated, the augmentation relaying module 108\* may include one or more sub-logic modules in various alternative embodiments. For example, in various embodiments, the augmentation relaying module 108\* may include an augmentation form selecting module 840. Specific details related to the augmentation relaying module 108\* as well as the above-described sub-modules of the augmentation relaying module 108\* will be provided below with respect to the operations and processes to be described herein.

Figure 9:
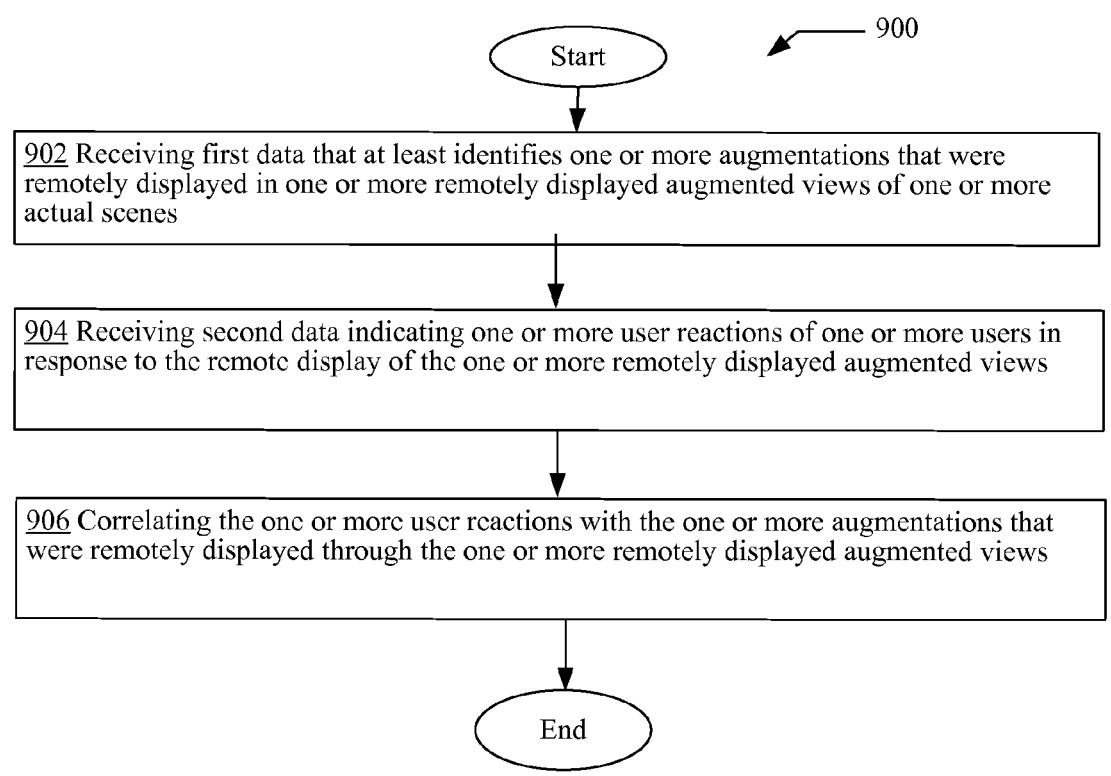
FIG. 9 is a high-level logic flowchart of a process, e.g., operational flow 900, according to some embodiments.

A more detailed discussion related to the computing system 70\* (e.g., the computing system 70' of FIG. 7A or the computing system 70" of FIG. 7B) discussed above will now be provided with respect to the processes and operations to be described herein. FIG. 9 illustrates an operational flow 900 representing example operations for, among other things, acquiring a first and second data including a first data that at least identifies one or more augmentations that were remotely displayed in one or more remotely displayed augmented views of one or more actual scenes displayed by one or more AR devices, and a second data that indicates one or more user reactions of one or more users in response to the one or more users responding to the one or more remotely displayed augmented views, and associating (e.g., correlating or linking) the one or more user reactions with the one or more augmentations that were remotely displayed through the one or more remotely displayed augmented views. In various implementations, the results of the association or correlation of the one or more user reactions with the one or more augmentations may be used in order to, for example, optimally select, format, and/or provide augmentations that may be presented through one or more remote AR devices.

In FIG. 9 and in the following figures that include various examples of operational flows, discussions and explanations will be provided with respect to the computing system 70\*
described above and as illustrated in FIGS. 7A, 7B, 8A, and
8B and/or with respect to other examples (e.g., as provided in
FIGS. 1A, 1B, 2A, 2B, 3A, 3B, 4A, 4B, 5A, 5B, 5C, 6A, 6B,
6C, 6D, 6E, 6F, 6G, 6H, 6I, 6K, and 6M) and contexts.
However, it should be understood that the operational flows
may be executed in a number of other environments and
contexts, and/or in modified versions of FIGS. 1A, 1B, 2A,
2B, 3A, 3B, 4A, 4B, 5A, 5B, 5C, 6A, 6B, 6C, 6D, 6E, 6F, 6G,
6H, 6I, 6K, 6M, 7A, 7B, 8A, and 8B. Also, although the
various operational flows are presented in the sequence(s)
illustrated, it should be understood that the various operations
may be performed in other orders other than those which are
illustrated, or may be performed concurrently.

Further, in FIG. 9 and in the figures to follow thereafter,
various operations may be depicted in a box-within-a-box
manner. Such depictions may indicate that an operation in an
internal box may comprise an optional example embodiment
of the operational step illustrated in one or more external
boxes. However, it should be understood that internal box
operations may be viewed as independent operations separate
from any associated external boxes and may be performed in
any sequence with respect to all other illustrated operations,
or may be performed concurrently. Still further, these operations illustrated in FIG. 9 as well as the other operations to be
described herein are performed by at least one of a machine,
an article of manufacture, or a composition of matter unless
indicated otherwise.

For ease of understanding, the flowcharts are organized
such that the initial flowcharts present implementations via an
example implementation and thereafter the following flowcharts present alternate implementations and/or expansions
of the initial flowchart(s) as either sub-component operations
or additional component operations building on one or more
earlier-presented flowcharts. Those having skill in the art will
appreciate that the style of presentation utilized herein (e.g.,
beginning with a presentation of a flowchart(s) presenting an
example implementation and thereafter providing additions
to and/or further details in subsequent flowcharts) generally
allows for a rapid and easy understanding of the various
process implementations. In addition, those skilled in the art
will further appreciate that the style of presentation used
herein also lends itself well to modular and/or object-oriented
program design paradigms.

More particularly, in FIG. 9 and in the figures to follow
thereafter, various operations may be depicted in a box-within-a-box manner. Such depictions may indicate that an
operation in an internal box may comprise an optional
example embodiment of the operational step illustrated in one
or more external boxes. However, it should be understood that
internal box operations may be viewed as independent operations separate from any associated external boxes and may be
performed in any sequence with respect to all other illustrated
operations, or may be performed concurrently. Still further,
these operations illustrated FIG. 9 as well as the other operations to be described herein may be performed by at least one
of a machine, an article of manufacture, or a composition of
matter.

In any event, after a start operation, the operational flow
900 of FIG. 9 may move to a first data receiving operation 902
for receiving first data that at least identifies one or more
augmentations that were remotely displayed in one or more
remotely displayed augmented views of one or more actual
scenes. For instance, and as illustration, the first data acquiring module 102\* of FIG. 7A or 7B (e.g., the first data acquiring module 102' of FIG. 7A or the first data acquiring module
102" of FIG. 7B) receiving or acquiring first data 510 that at
least identifies one or more augmentations (e.g., augmentations 64a, 64b, 64c, 64cc, 64d, 64e, 64f, 64g, and/or 64h of
FIGS. 6B, 6D, 6E, 6F, 6G, 6I, 6K, and/or 6M) that were
remotely displayed (e.g., as remotely displayed by one or
more remote AR devices 50\*) in one or more remotely displayed augmented views (e.g., augmented views 60b, 60d,
60e, 60f, 60g, 60i, 60k, and/or 60m of FIGS. 6B, 6D, 6E, 6F,
6G, 6I, 6K, and/or 6M) of one or more actual scenes. In some
implementations, the first data 510 may include sufficient
data for recreating or reproducing the one or more augmentations. Alternatively, the first data 510 may only include data
that only identifies the one or more augmentations. In some
cases, the reception of the first data 510 may be implemented
by prompting one or more remote AR device 50\* to provide
such data.

Operational flow 900 may also include a second data
receiving operation 904 for receiving second data indicating
one or more user reactions of one or more users in response to
the remote display of the one or more remotely displayed
augmented views. For instance, the second data acquiring
module 102\* (e.g., the second data acquiring module 102' of
FIG. 7A or the second data acquiring module 102" of FIG.
7B) of the computing system 70\* receiving or acquiring
second data 520 indicating one or more user reactions (e.g.,
physiological reactions including eye focus and/or dwell
time) of one or more users 52\*, the one or more user reactions
being in response to the one or more users 52\* viewing the
remote display of the one or more remotely displayed augmented views (e.g., augmented views 60b, 60d, 60e, 60f, 60g,
60i, 60k, and/or 60m of FIGS. 6B, 6D, 6E, 6F, 6G, 6I, 6K,
and/or 6M). In some cases, the second data receiving operation 904 may acquire the second data by prompting one or
more remote AR devices 50\* to provide the second data 520.
Note that in some implementations, the first data receiving
operation 902 and the second data receiving operation 904
may be executed simultaneously or in parallel via a merged
operation (e.g., an operation that acquires the first data and the
second data at the same time).

As further illustrated in FIG. 9, operational flow 900 may
also include a correlating operation 906 for correlating the
one or more user reactions with the one or more augmentations that were remotely displayed through the one or more
remotely displayed augmented views. For instance, the user
reaction/augmentation associating module 106\* (e.g., the
user reaction/augmentation associating module 106' of FIG.
7A or the user reaction/augmentation associating module
106" of FIG. 7B) correlating the one or more user reactions
(e.g., physiological reactions such as eye reactions and/or
facial expressions) with the one or more augmentations (e.g.,
augmentations 64a, 64b, 64c, 64cc, 64d, 64e, 64f, 64g, and/or
64h of FIGS. 6B, 6D, 6E, 6F, 6G, 6I, 6K, and/or 6M) that were
remotely displayed through the one or more remotely displayed augmented views (e.g., augmented views 60b, 60d,
60e, 60f, 60g, 60i, 60k, and/or 60m of FIGS. 6B, 6D, 6E, 6F,
6G, 6I, 6K, and/or 6M). In various implementations, the
correlating of the one or more user reactions of the one or
more user 52\* with the one or more augmentations that were
remotely displayed may actually involve associating or linking of the one or more user reactions with the one or more
augmentations (e.g., augmentations 64a, 64b, 64c, 64cc, 64d,
64e, 64f, 64g, and/or 64h of FIGS. 6B, 6D, 6E, 6F, 6G, 6I, 6K,
and/or 6M) that were displayed to the one or more users 52\*.
Note that in some implementations the various correlating
operations to be described herein may involve associating or
linking of two variables. That is, the associating or linking of,
for example, one or more augmentations that were remotely
displayed to one or more users 52\* with one or more user reactions (e.g., eye or facial reactions) that were detected proximate to (e.g., sensed during and/or immediately following) the display of the one or more augmentations.

Figure 10A:
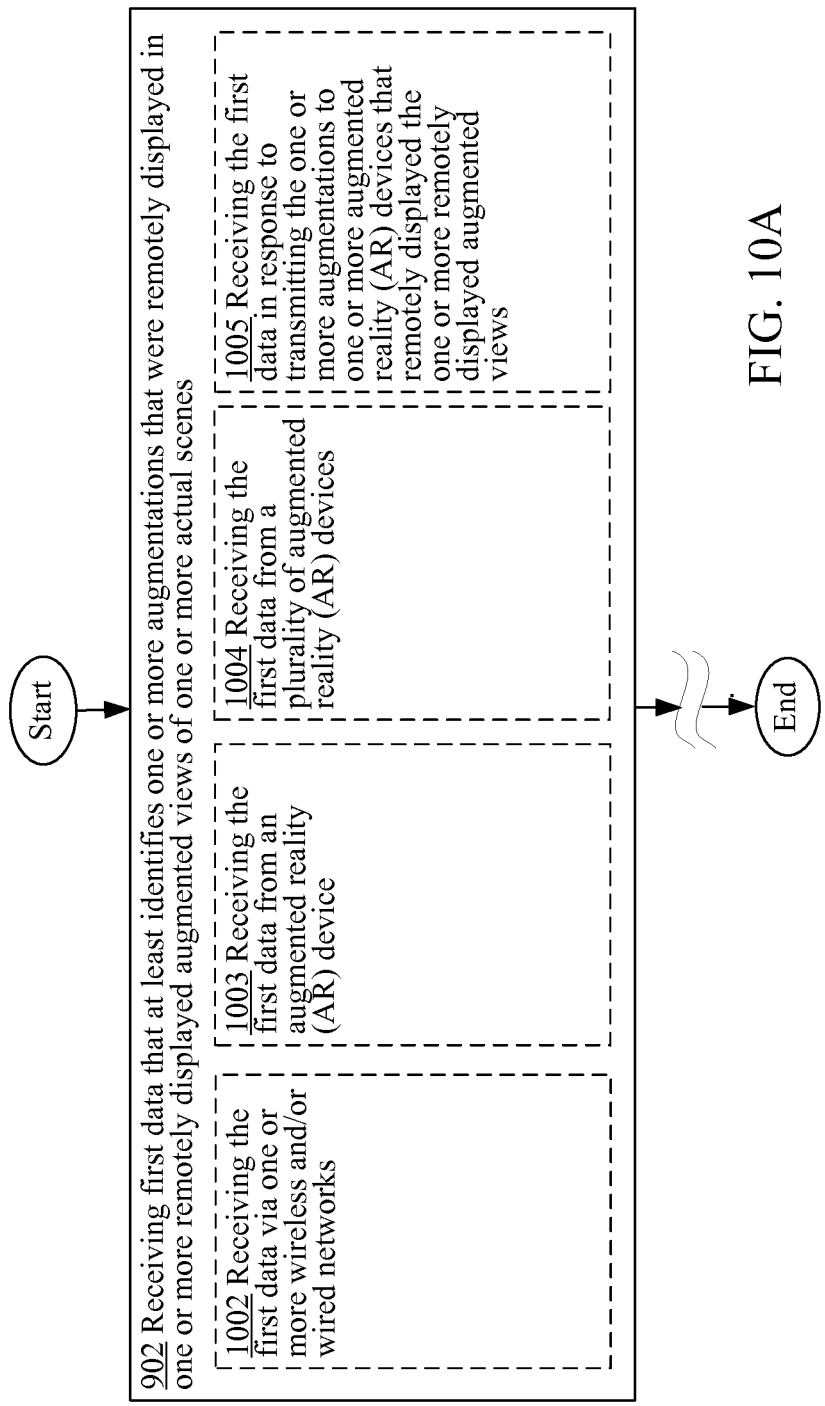
FIG. 10A is a high-level logic flowchart of a process depicting alternate implementations of the first data receiving operation 902 of FIG. 9.
Figure 10B:
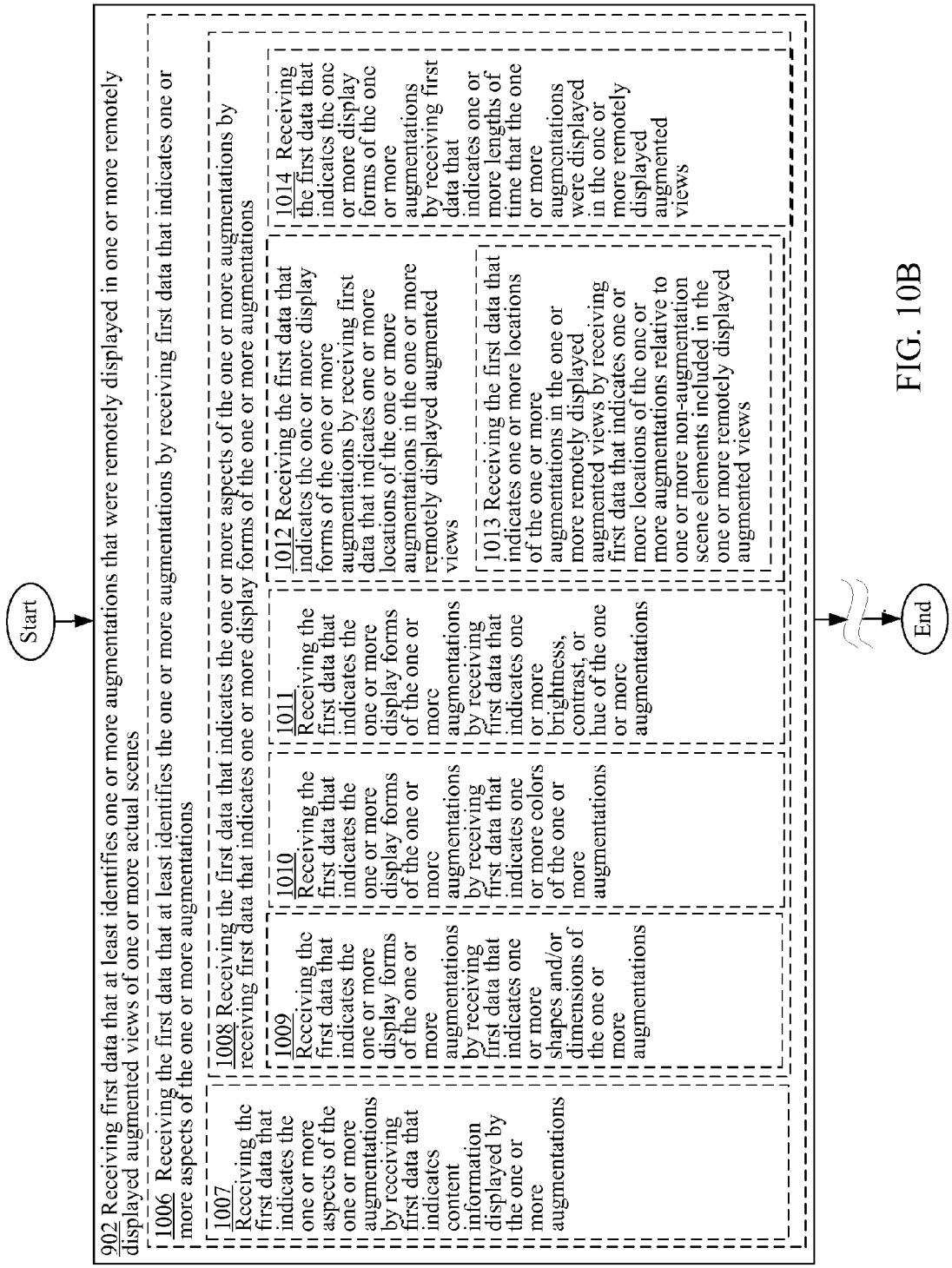
FIG. 10B is a high-level logic flowchart of a process depicting alternate implementations of the first data receiving operation 902 of FIG. 9.

As will be described below, the first data receiving operation 902, the second data receiving operation 904 and the correlating operation 906 may be executed in a variety of different ways in various alternative implementations. FIGS. 10A, 10B, and, 10C for example, illustrates at least some of the alternative ways that the first data receiving operation 902 of FIG. 9 may be executed in various alternative implementations. In some cases, for example, the first data receiving operation 902 may include an operation 1002 for receiving the first data via one or more wireless and/or wired networks as illustrated in FIG. 10A. For instance, the first data acquiring module 102* of the computing system 70* (e.g., the computing system 70' of FIG. 7A or the computing system 70" of FIG. 7B) receiving the first data 510 via one or more wireless and/or wired networks 550 (e.g., a cellular telephone or data network, a wireless local area network (WLAN), a wireless wide area network or WAN, a public switched telephone network (PTSN), a personal area network (PAN), a metropolitan area network (MAN), and/or other types of networks).

As further illustrated in FIG. 10A, in the same or alternative implementations, the first data receiving operation 902 may additionally or alternatively include an operation 1003 for receiving the first data from an augmented reality (AR) device. For instance, the first data acquiring module 102* of the computing system 70* of FIG. 7A or 7B receiving the first data 510 from an augmented reality (AR) device 50*.

In alternative implementations, the first data receiving operation 902 may alternatively involve or include an operation 1004 for receiving the first data from a plurality of augmented reality (AR) devices. For instance, the first data acquiring module 102* of the computing system 70* of FIG. 7A or 7B receiving the first data from a plurality of augmented reality (AR) devices 50*.

In some cases, the first data receiving operation 902 of FIG. 9 may additionally or alternatively include an operation 1005 for receiving the first data in response to transmitting the one or more augmentations to one or more augmented reality (AR) devices that remotely displayed the one or more remotely displayed augmented views. For instance, the first data acquiring module 102* of the computing system 70* of FIG. 7A or 7B receiving the first data 510 in response to transmitting by the augmentation relaying module 108*(see FIG. 7A or 7B) of the one or more augmentations (e.g., augmentations 64a, 64b, 64c, 64cc, 64d, 64e, 64f, 64g, and/or 64h of FIGS. 6B, 6D, 6E, 6F, 6G, 6I, 6K, and/or 6M) to one or more augmented reality (AR) devices 50* that remotely displayed the one or more remotely displayed augmented views (e.g., augmented views 60b, 60d, 60e, 60f, 60g, 60i, 60k, and/or 60m of FIGS. 6B, 6D, 6E, 6F, 6G, 6I, 6K, and/or 6M).

Referring now to FIG. 10B, in various implementations, the first data receiving operation 902 of FIG. 9 may include an operation 1006 for receiving the first data that at least identifies the one or more augmentations by receiving first data that indicates one or more aspects of the one or more augmentations. For instance, the first data acquiring module 102* of the computing system 70* of FIG. 7A or 7B receiving the first data that at least identifies the one or more augmentations by receiving or acquiring first data 510 that indicates one or more aspects of the one or more augmentations.

As further illustrated in FIG. 10B, operation 1006 may include one or more additional operations including, in some cases, an operation 1007 for receiving the first data that indicates the one or more aspects of the one or more augmentations by receiving first data that indicates content information displayed by the one or more augmentations as further depicted in FIG. 10B. For instance, the first data acquiring module 102* of the computing system 70* of FIG. 7A or 7B receiving the first data that indicates the one or more aspects of the one or more augmentations by receiving first data 510 that indicates content information (e.g., textual information included in an informational augmentation) displayed by the one or more augmentations (e.g., augmentations 64a, 64b, 64c, 64d, 64e, 64f, 64g, and/or 64h of FIGS. 6B, 6D, 6E, 6F, 6G, 6I, 6K, and/or 6M).

In the same or alternative implementations, operation 1006 may additionally or alternatively include or involve an operation 1008 for receiving the first data that indicates the one or more aspects of the one or more augmentations by receiving first data that indicates one or more display forms of the one or more augmentations. For instance, the first data acquiring module 102* of the computing system 70* of FIG. 7A or 7B receiving (e.g., acquiring) the first data that indicates the one or more aspects of the one or more augmentations by receiving first data 510 that indicates one or more display forms (e.g., display formats) of the one or more augmentations.

As further illustrated in FIG. 10B, in various implementations operation 1008 may involve one or more additional operations including in some cases an operation 1009 for receiving the first data that indicates the one or more display forms of the one or more augmentations by receiving first data that indicates one or more shapes and/or dimensions of the one or more augmentations. For instance, the first data acquiring module 102* of the computing system 70* of FIG. 7A or 7B receiving the first data that indicates the one or more display forms of the one or more augmentations by receiving or acquiring first data 510 that indicates one or more shapes and/or dimensions of the one or more augmentations.

In the same or alternative implementations, operation 1008 may additionally or alternatively include an operation 1010 for receiving the first data that indicates the one or more display forms of the one or more augmentations by receiving first data that indicates one or more colors of the one or more augmentations. For instance, the first data acquiring module 102* of the computing system 70* of FIG. 7A or 7B receiving the first data that indicates the one or more display forms of the one or more augmentations by receiving or acquiring first data 510 that indicates one or more colors of the one or more augmentations.

In the same or alternative implementations, operation 1008 may additionally or alternatively include an operation 1011 for receiving the first data that indicates the one or more display forms of the one or more augmentations by receiving first data that indicates one or more brightness, contrast, or hue of the one or more augmentations. For instance, the first data acquiring module 102* of the computing system 70* of FIG. 7A or 7B receiving the first data that indicates the one or more display forms of the one or more augmentations by receiving or acquiring first data 510 that indicates one or more brightness, contrast, or hue of the one or more augmentations.

In the same or alternative implementations, operation 1008 may additionally or alternatively include an operation 1012 for receiving the first data that indicates the one or more display forms of the one or more augmentations by receiving first data that indicates one or more locations of the one or more augmentations in the one or more remotely displayed augmented views. For instance, the first data acquiring module 102* of the computing system 70* of FIG. 7A or 7B receiving the first data that indicates the one or more display forms of the one or more augmentations by receiving or acquiring first data 510 that indicates one or more locations of the one or more augmentations (e.g., augmentation 64a, 64b, 64c, 64d, 64e, 64f, 64g, and/or 64h of FIGS. 6B, 6D, 6E, 6F, 6G, 6I, 6K, and/or 6M) in the one or more remotely displayed augmented views (e.g., augmented view 60b, 60d, 60e, 60f, 60g, 60i, 60k, and/or 60m of FIGS. 6B, 6D, 6E, 6F, 6G, 6I, 6K, and/or 6M).

In some implementation, operation 1012 may further include an operation 1013 for receiving the first data that indicates one or more locations of the one or more augmentations in the one or more remotely displayed augmented views by receiving first data that indicates one or more locations of the one or more augmentations relative to one or more non-augmentation scene elements included in the one or more remotely displayed augmented views. For instance, the first data acquiring module 102* of the computing system 70* of FIG. 7A or 7B receiving the first data that indicates one or more locations of the one or more augmentations in the one or more remotely displayed augmented views by receiving or acquiring first data 510 that indicates one or more locations of the one or more augmentations (e.g., augmentation 64a of FIG. 6B) relative to one or more non-augmentation scene elements (e.g., sand and beach in the augmented view 60b of FIG. 6B) included in the one or more remotely displayed augmented views (e.g., augmented view 60b of FIG. 6B).

In the same or alternative implementations, the operation 1008 may additionally or alternatively include an operation 1014 for receiving the first data that indicates the one or more display forms of the one or more augmentations by receiving first data that indicates one or more lengths of time that the one or more augmentations were displayed in the one or more remotely displayed augmented views. For instance, the first data acquiring module 102* of the computing system 70* of FIG. 7A or 7B receiving the first data that indicates the one or more display forms of the one or more augmentations by receiving or acquiring first data 510 that indicates one or more lengths of time that the one or more augmentations (e.g., augmentation 64a of FIG. 6B) were displayed in the one or more remotely displayed augmented views (e.g., augmented view 60b of FIG. 6B).

Figure 10C:
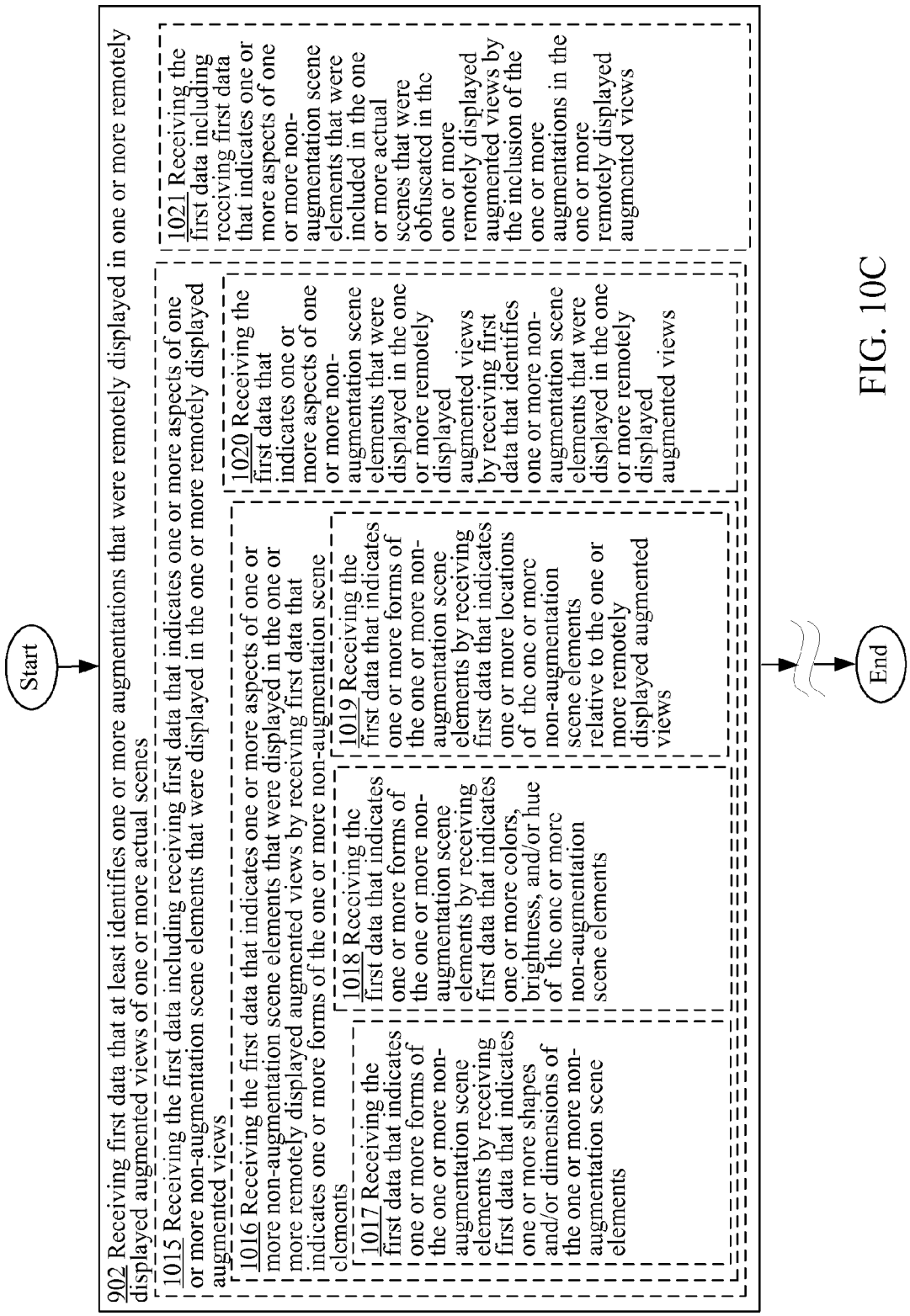
FIG. 10C is a high-level logic flowchart of a process depicting alternate implementations of the first data receiving operation 902 of FIG. 9.

Referring now to FIG. 10C, in various implementations, the first data receiving operation 902 of FIG. 9 may additionally or alternatively include or involve an operation 1015 for receiving the first data including receiving first data that indicates one or more aspects of one or more non-augmentation scene elements that were displayed in the one or more remotely displayed augmented views. For instance, the first data acquiring module 102* of the computing system 70* of FIG. 7A or 7B receiving the first data including receiving first data 510 that indicates one or more aspects of one or more non-augmentation scene elements (e.g., the color or whiteness of the beach shown in the augmented view 60b of FIG. 6B or a textual or iconic or symbolic store sign in the shopping mall scene shown in the augmented view 60i of FIG. 6I) that were displayed in the one or more remotely displayed augmented views (e.g., the augmented view 60b of FIG. 6B or the augmented view 60i of FIG. 6I).

As further illustrated in FIG. 10C, operation 1015 may include one or more additional operations in various alternative implementations including in some cases an operation 1016 for receiving the first data that indicates one or more aspects of one or more non-augmentation scene elements that were displayed in the one or more remotely displayed augmented views by receiving first data that indicates one or more forms of the one or more non-augmentation scene elements. For instance, the first data acquiring module 102* of the computing system 70* of FIG. 7A or 7B receiving the first data that indicates one or more aspects of one or more non-augmentation scene elements that were displayed in the one or more remotely displayed augmented views by receiving or acquiring first data 510 that indicates one or more forms characteristics including size, color, brightness, features, and so forth) of the one or more non-augmentation scene elements.

In some cases, operation 1016 may additionally include one or more additional operations including, for example, an operation 1017 for receiving the first data that indicates one or more forms of the one or more non-augmentation scene elements by receiving first data that indicates one or more shapes and/or dimensions of the one or more non-augmentation scene elements. For instance, the first data acquiring module 102* of the computing system 70* of FIG. 7A or 7B receiving the first data that indicates one or more forms of the one or more non-augmentation scene elements by receiving or acquiring first data 510 that indicates one or more shapes and/or dimensions of the one or more non-augmentation scene elements (e.g., a store or a street sign or an automobile).

In the same or alternative implementations, operation 1016 may additionally or alternatively include an operation 1018 for receiving the first data that indicates one or more forms of the one or more non-augmentation scene elements by receiving first data that indicates one or more colors, brightness, and/or hue of the one or more non-augmentation scene elements. For instance, the first data acquiring module 102* of the computing system 70* of FIG. 7A or 7B receiving the first data that indicates one or more forms of the one or more non-augmentation scene elements by receiving or acquiring first data 510 that indicates one or more colors, brightness, and/or hue of the one or more non-augmentation scene elements (e.g., a geographical feature).

In the same or different implementations, operation 1016 may additionally or alternatively include an operation 1019 for receiving the first data that indicates one or more forms of the one or more non-augmentation scene elements by receiving first data that indicates one or more locations of the one or more non-augmentation scene elements relative to the one or more remotely displayed augmented views. For instance, the first data acquiring module 102* of the computing system 70* of FIG. 7A or 7B receiving the first data that indicates one or more forms of the one or more non-augmentation scene elements by receiving or acquiring first data 510 that indicates one or more locations of the one or more non-augmentation scene elements relative to the one or more remotely displayed augmented views (e.g., an automobile or a store sign).

In some cases, operation 1015 for receiving the first data including receiving first data that indicates one or more aspects of one or more non-augmentation scene elements that were displayed in the one or more remotely displayed augmented views may additionally or alternatively include an operation 1020 for receiving the first data that indicates one or more aspects of one or more non-augmentation scene elements that were displayed in the one or more remotely displayed augmented views by receiving first data that identifies one or more non-augmentation scene elements that were displayed in the one or more remotely displayed augmented views. For instance, the first data acquiring module 102* of the computing system 70* of FIG. 7A or 7B receiving the first data that indicates one or more aspects of one or more non-augmentation scene elements that were displayed in the one or more remotely displayed augmented views by receiving or acquiring first data 510 that identifies one or more non-augmentation scene elements (e.g., parked car or flowers) that were displayed in the one or more remotely displayed augmented views.

In various implementations, the first data receiving operation 902 of FIG. 9 for receiving first data that at least identifies one or more augmentations that were remotely displayed in one or more remotely displayed augmented views of one or more actual scenes may include an operation 1021 for receiving the first data including receiving first data that indicates one or more aspects of one or more non-augmentation scene elements that were included in the one or more actual scenes that were obfuscated in the one or more remotely displayed augmented views by the inclusion of the one or more augmentations in the one or more remotely displayed augmented views as further illustrated in FIG. 10C. For instance, the first data acquiring module 102* of the computing system 70* of FIG. 7A or 7B receiving the first data including receiving or acquiring first data 510 that indicates one or more aspects of one or more non-augmentation scene elements that were included in the one or more actual scenes (e.g., a store front in the actual view 60h of FIG. 6H) that were obfuscated (e.g., hidden) in the one or more remotely displayed augmented views (e.g., augmented view 60i of FIG. 6I) by the inclusion of the one or more augmentations (e.g., augmentation 64f of FIG. 6I) in the one or more remotely displayed augmented views (e.g., augmented view 60i).

Referring back to the second data receiving operation 904 of FIG. 9, the second data receiving operation 904 similar to the first data receiving operation 902 of FIG. 9 may be executed in a number of different ways in various alternative embodiments as illustrated in FIGS. 11A, 11B, 11C, 11D, and 11E. In some implementations, for example, the second data receiving operation 904 may include an operation 1122 for receiving the second data by receiving the second data via one or more wireless and/or wired networks. For instance, the second data acquiring module 104* of the computing system 70* of FIG. 7A or 7B receiving the second data by receiving or acquiring the second data 520 via one or more wireless and/or wired networks 550 (e.g., a cellular telephone or data network, a wireless local area network (WLAN), a wireless wide area network or WAN, a public switched telephone network (PTSN), a personal area network (PAN), a metropolitan area network (MAN), and/or other types of networks).

In the same or different implementations, the second data receiving operation 904 may additionally or alternatively include an operation 1123 for receiving the second data by receiving the second data from an augmented reality (AR) device. For instance, the second data acquiring module 104* of the computing system 70* of FIG. 7A or 7B receiving the second data by receiving or acquiring the second data 520 from an augmented reality (AR) device 50*.

Alternatively, the second data receiving operation 904 may alternatively include or involve an operation 1124 for receiving the second data by receiving the second data from a plurality of augmented reality (AR) devices. For instance, the second data acquiring module 104* of the computing system 70* of FIG. 7A or 7B receiving the second data by receiving or acquiring the second data 520 from a plurality of augmented reality (AR) devices 50*.

In the same or different implementations, the second data receiving operation 904 may additionally or alternatively include an operation 1125 for receiving the second data by receiving together the second data and the first data at the same time or consecutively. For instance, the first data acquiring module 102* and the second data acquiring module 104* of the computing system 70* of FIG. 7A or 7B receiving the second data by receiving together the second data 520 and the first data 510 at the same time or consecutively.

Figure 11A:
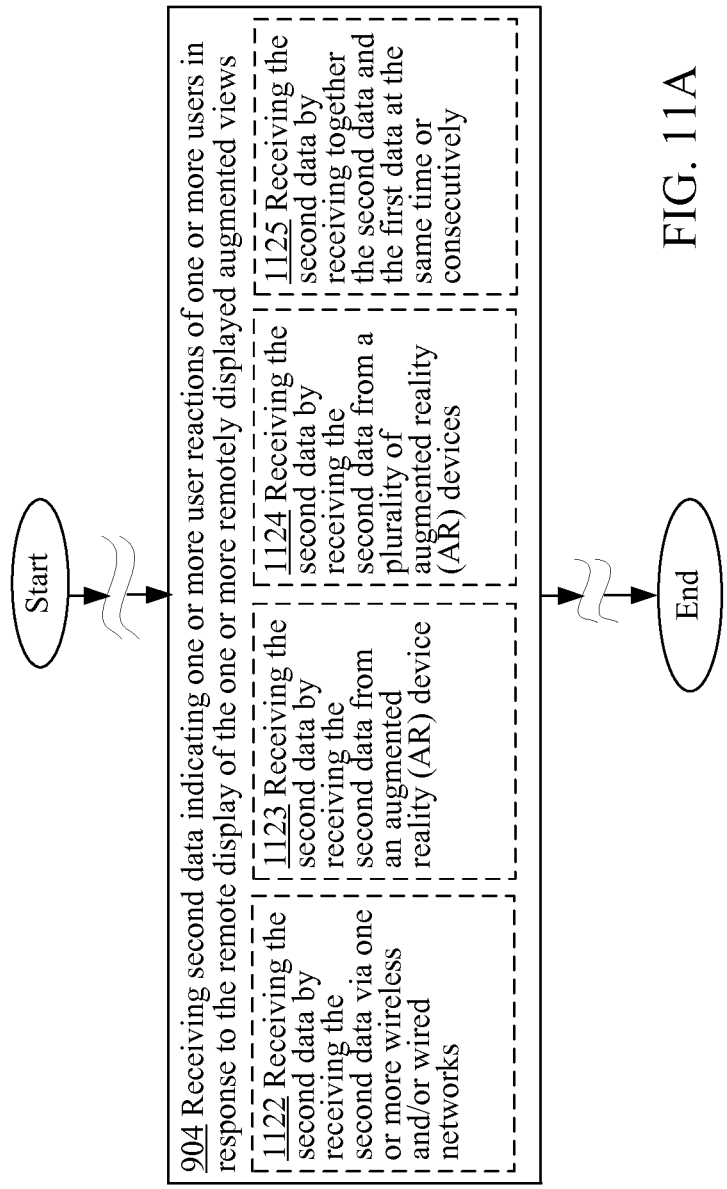
FIG. 11A is a high-level logic flowchart of a process depicting alternate implementations of the second data receiving operation 904 of FIG. 9.
Figure 11B:
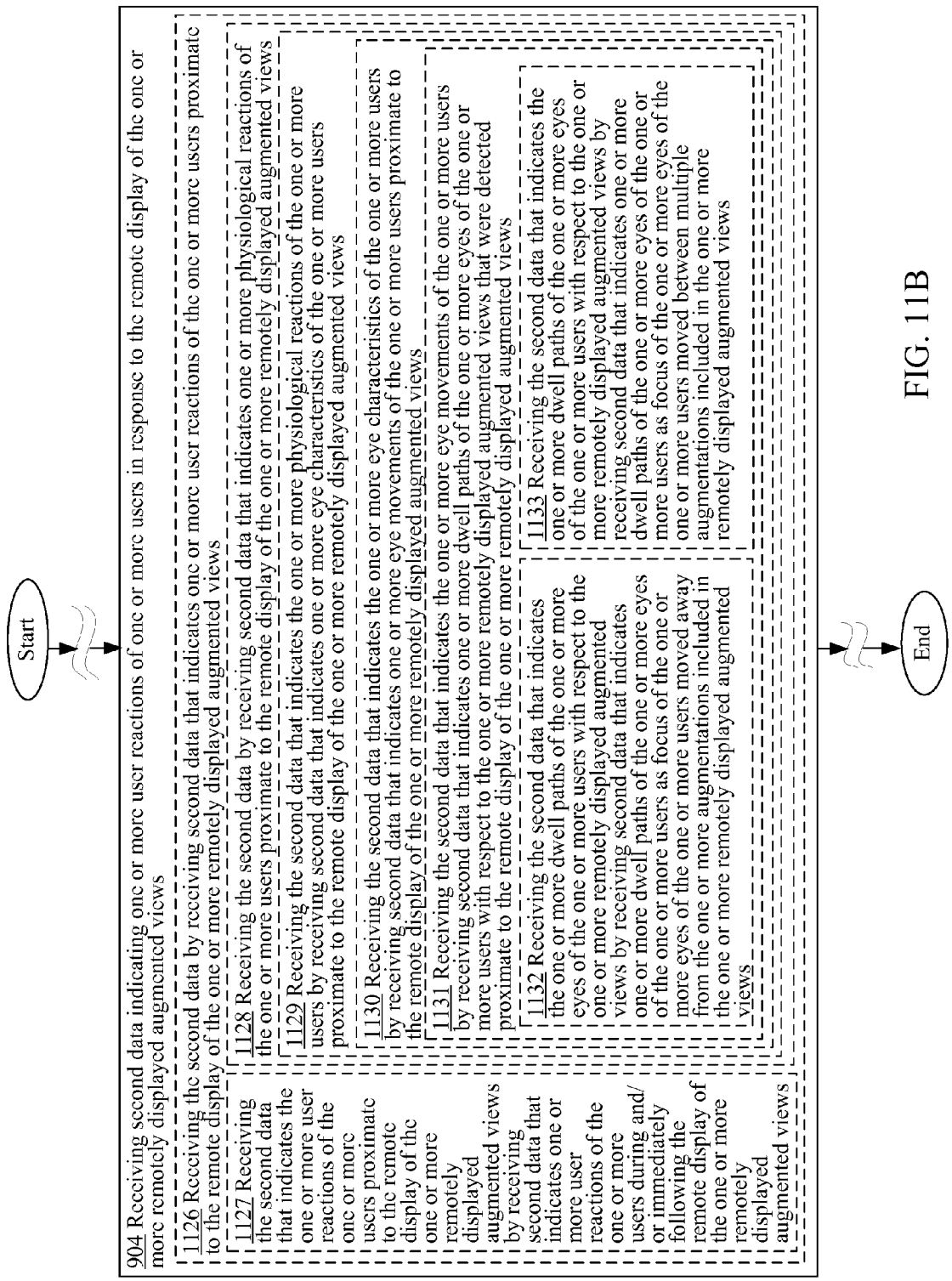
FIG. 11B is a high-level logic flowchart of a process depicting alternate implementations of the second data receiving operation 904 of FIG. 9.
Figure 11C:
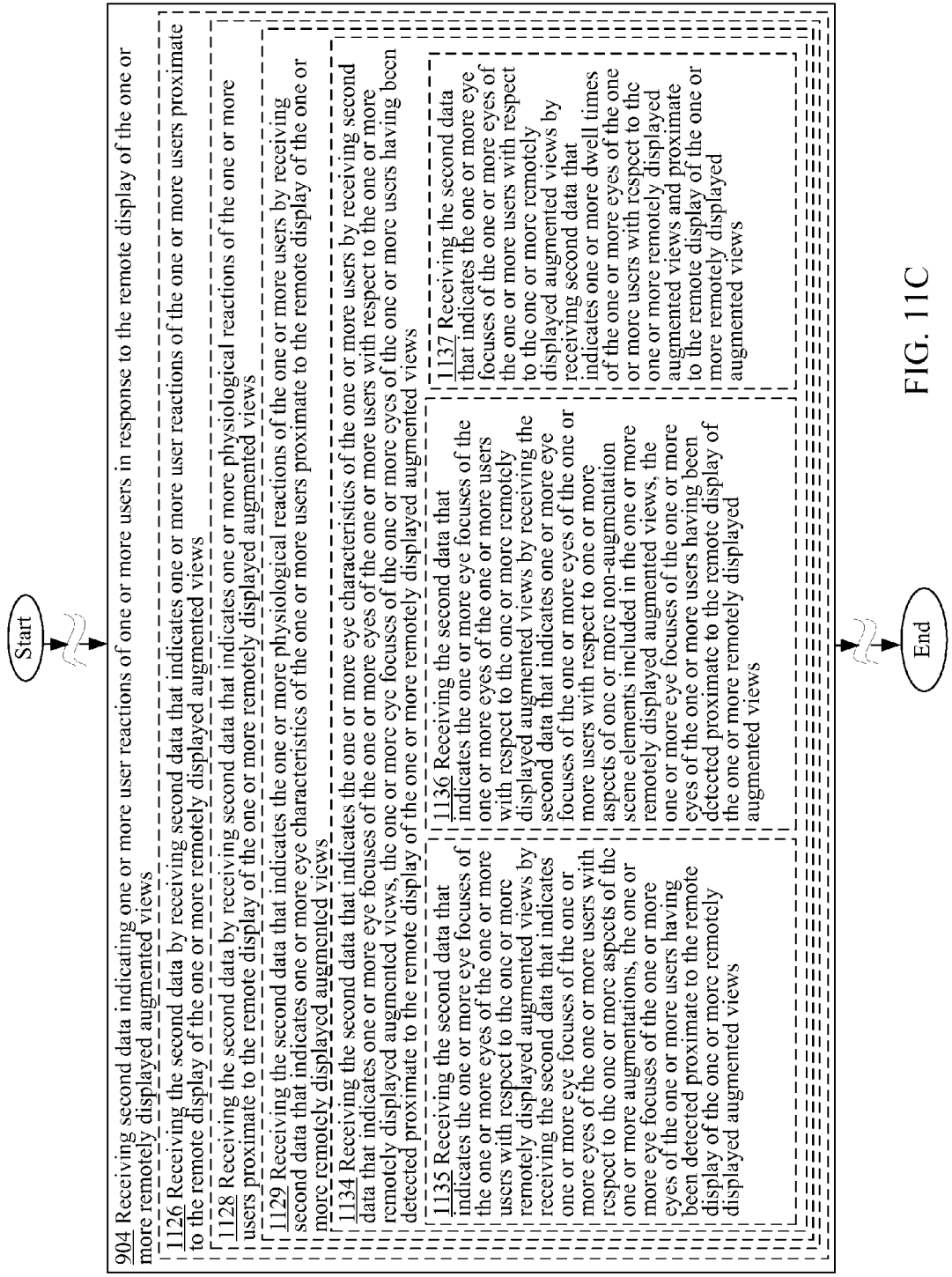
FIG. 11C is a high-level logic flowchart of a process depicting alternate implementations of the second data receiving operation 904 of FIG. 9.

Turning now to FIG. 11B, in various implementations, the second data receiving operation 904 may additionally or alternatively include or involve an operation 1126 for receiving the second data by receiving second data that indicates one or more user reactions of the one or more users proximate to the remote display of the one or more remotely displayed augmented views. For instance, the second data acquiring module 104* of the computing system 70* of FIG. 7A or 7B receiving the second data by receiving or acquiring second data 520 that indicates one or more user reactions (e.g., user facial or eye reactions) of the one or more users 52* proximate (e.g., during and/or immediately following) to the remote display of the one or more remotely displayed augmented views. In some cases, the acquisition of the second data 520 may be as result of transmitting one or more requests (e.g., solicitations) for the second data 520 to one or more AR devices 50* in response to, for example, receiving the first data 510, which may indicate the remote display of the one or more augmentations (e.g., augmentation 64a, 64b, 64c, 64cc, 64d, 64e, 64f, 64g, and/or 64h of FIGS. 6B, 6D, 6E, 6F, 6G, 6I, 6K, and/or 6M) and/or one or more augmented views (e.g., augmented views 60b, 60d, 60e, 60f, 60g, 60i, 60k, and/or 60m of FIGS. 6B, 6D, 6E, 6F, 6G, 6I, 6K, and/or 6M) to the one or more users 52*.

As further illustrated in FIG. 11B, operation 1126 may include one or more additional operations in various alternative implementations including, in some cases, an operation 1127 for receiving the second data that indicates the one or more user reactions of the one or more users proximate to the remote display of the one or more remotely displayed augmented views by receiving second data that indicates one or more user reactions of the one or more users during and/or immediately following the remote display of the one or more remotely displayed augmented views. For instance, the second data acquiring module 104* of the computing system 70* of FIG. 7A or 7B receiving the second data that indicates the one or more user reactions of the one or more users proximate to the remote display of the one or more remotely displayed augmented views by receiving or acquiring second data 520 that indicates one or more user reactions of the one or more users 52* during and/or immediately following the remote display of the one or more remotely displayed augmented views (e.g., augmented views 60b, 60d, 60e, 60f, 60g, 60i, 60k, and/or 60m of FIGS. 6B, 6D, 6E, 6F, 6G, 6I, 6K, and/or 6M).

In the same or alternative implementations, operation 1126 may include an operation 1128 for receiving the second data by receiving second data that indicates one or more physiological reactions of the one or more users proximate to the remote display of the one or more remotely displayed augmented views. For instance, the second data acquiring module 104* of the computing system 70* of FIG. 7A or 7B receiving the second data by receiving or acquiring second data 520 that indicates one or more physiological reactions (e.g., facial reactions or ocular reactions) of the one or more users 52* proximate to the remote display of the one or more remotely displayed augmented views (e.g., augmented views 60b, 60d, 60e, 60f, 60g, 60i, 60k, and/or 60m of FIGS. 6B, 6D, 6E, 6F, 6G, 6I, 6K, and/or 6M).

In some cases, operation 1128 may further include an operation 1129 for receiving the second data that indicates the one or more physiological reactions of the one or more users by receiving second data that indicates one or more eye characteristics of the one or more users proximate to the remote display of the one or more remotely displayed augmented views. For instance, the second data acquiring module 104* of the computing system 70* of FIG. 7A or 7B receiving the second data that indicates the one or more physiological reactions of the one or more users by receiving or acquiring second data 520 that indicates one or more eye characteristics (e.g., focus point and/or pupil characteristics) of the one or more users proximate to the remote display of the one or more remotely displayed augmented views (e.g., augmented views 60b, 60d, 60e, 60f, 60g, 60i, 60k, and/or 60m of FIGS. 6B, 6D, 6E, 6F, 6G, 6I, 6K, and/or 6M).

In some cases, operation 1129 may, in turn, include an operation 1130 for receiving the second data that indicates the one or more eye characteristics of the one or more users by receiving second data that indicates one or more eye movements of the one or more users proximate to the remote display of the one or more remotely displayed augmented views. For instance, the second data acquiring module 104* of the computing system 70* of FIG. 7A or 7B receiving the second data that indicates the one or more eye characteristics of the one or more users by receiving or acquiring second data 520 that indicates one or more eye movements of the one or more users 52* proximate to (e.g., immediately before, during, and/or immediately after) the remote display of the one or more remotely displayed augmented views (e.g., augmented views 60b, 60d, 60e, 60f, 60g, 60i, 60k, and/or 60m of FIGS. 6B, 6D, 6E, 6F, 6G, 6I, 6K, and/or 6M).

In some implementations, operation 1130 may further include an operation 1131 for receiving the second data that indicates the one or more eye movements of the one or more users by receiving second data that indicates one or more dwell paths of the one or more eyes of the one or more users with respect to the one or more remotely displayed augmented views that were detected proximate to the remote display of the one or more remotely displayed augmented views. For instance, the second data acquiring module 104* of the computing system 70* of FIG. 7A or 7B receiving the second data that indicates the one or more eye movements of the one or more users by receiving or acquiring second data 520 that indicates one or more dwell paths (e.g., dwell path 66a of FIG. 6C) of the one or more eyes of the one or more users 52* with respect to the one or more remotely displayed augmented views (e.g., augmented view 60c of FIG. 6C) that were detected proximate to (e.g., during and/or immediately following) the remote display of the one or more remotely displayed augmented views (e.g., augmented view 60c of FIG. 6C).

In some cases, operation 1131 may further include an operation 1132 for receiving the second data that indicates the one or more dwell paths of the one or more eyes of the one or more users with respect to the one or more remotely displayed augmented views by receiving second data that indicates one or more dwell paths of the one or more eyes of the one or more users as focus of the one or more eyes of the one or more users moved away from the one or more augmentations included in the one or more remotely displayed augmented views. For instance, the second data acquiring module 104* of the computing system 70* of FIG. 7A or 7B receiving the second data that indicates the one or more dwell paths of the one or more eyes of the one or more users with respect to the one or more remotely displayed augmented views by receiving or acquiring second data 520 that indicates one or more dwell paths (e.g., dwell path 66a of FIG. 6C) of the one or more eyes of the one or more users 52* as focus of the one or more eyes of the one or more users 52* moved away from the one or more augmentations (e.g., moving away from the sundial augmentation 64a of FIG. 6C) included in the one or more remotely displayed augmented views (e.g., augmented view 60c of FIG. 6C).

In the same or different implementations, operation 1131, may additionally or alternatively include an operation 1133 for receiving the second data that indicates the one or more dwell paths of the one or more eyes of the one or more users with respect to the one or more remotely displayed augmented views by receiving second data that indicates one or more dwell paths of the one or more eyes of the one or more users as focus of the one or more eyes of the one or more users moved between multiple augmentations included in the one or more remotely displayed augmented views. For instance, the second data acquiring module 104* of the computing system 70* of FIG. 7A or 7B receiving the second data that indicates the one or more dwell paths of the one or more eyes of the one or more users with respect to the one or more remotely displayed augmented views by receiving or acquiring second data 520 that indicates one or more dwell paths (e.g., dwell path 66c of FIG. 6G) of the one or more eyes of the one or more users 52* as focus of the one or more eyes of the one or more users 52* moved between multiple augmentations (e.g., augmentations 64c and 64e of FIG. 6G) included in the one or more remotely displayed augmented views (e.g., augmented view 60g).

In various implementations, operation 1129 for receiving the second data that indicates the one or more physiological reactions of the one or more users by receiving second data that indicates one or more eye characteristics of the one or more users proximate to the remote display of the one or more remotely displayed augmented views may further include an operation 1134 for receiving the second data that indicates the one or more eye characteristics of the one or more users by receiving second data that indicates one or more eye focuses of the one or more eyes of the one or more users with respect to the one or more remotely displayed augmented views, the one or more eye focuses of the one or more eyes of the one or more users having been detected proximate to the remote display of the one or more remotely displayed augmented views. For instance, the second data acquiring module 104* of the computing system 70* of FIG. 7A or 7B receiving the second data that indicates the one or more eye characteristics of the one or more users by receiving or acquiring second data 520 that indicates one or more eye focuses of the one or more eyes of the one or more users 52* with respect to the one or more remotely displayed augmented views (e.g., augmented view 60c, 60e, or 60f of FIG. 6C, 6E, or 6F), the one or more eye focuses (e.g., eye focus 65a, 65b, or 65c of FIG. 6C, 6E, or 6F) of the one or more eyes of the one or more users 52* having been detected proximate to (e.g., during and/or immediately following) the remote display of the one or more remotely displayed augmented views.

In some implementations, operation 1134 may further include or involve an operation 1135 for receiving the second data that indicates the one or more eye focuses of the one or more eyes of the one or more users with respect to the one or more remotely displayed augmented views by receiving the second data that indicates one or more eye focuses of the one or more eyes of the one or more users with respect to the one or more aspects of the one or more augmentations, the one or more eye focuses of the one or more eyes of the one or more users having been detected proximate to the remote display of the one or more remotely displayed augmented views. For instance, the second data acquiring module 104* of the computing system 70* of FIG. 7A or 7B receiving the second data that indicates the one or more eye focuses of the one or more eyes of the one or more users with respect to the one or more remotely displayed augmented views by receiving or acquiring the second data 520 that indicates one or more eye focuses of the one or more eyes of the one or more users 52* with respect to the one or more aspects of the one or more augmentations (e.g., border of augmentation 64cc of FIG. 6F), the one or more eye focuses (e.g., eye focus 65c of FIG. 6F)

of the one or more eyes of the one or more users 52\* having been detected proximate to (e.g., during and/or immediately following) the remote display of the one or more remotely displayed augmented views (e.g., augmented view 60*f* of FIG. 6F).

In the same or alternative implementations, operation 1134 may include an operation 1136 for receiving the second data that indicates the one or more eye focuses of the one or more eyes of the one or more users with respect to the one or more remotely displayed augmented views by receiving the second data that indicates one or more eye focuses of the one or more eyes of the one or more users with respect to one or more aspects of one or more non-augmentation scene elements included in the one or more remotely displayed augmented views, the one or more eye focuses of the one or more eyes of the one or more users having been detected proximate to the remote display of the one or more remotely displayed augmented views. For instance, the second data acquiring module 104\* of the computing system 70\* of FIG. 7A or 7B receiving the second data that indicates the one or more eye focuses of the one or more eyes of the one or more users with respect to the one or more remotely displayed augmented views by receiving or acquiring the second data 520 that indicates one or more eye focuses of the one or more eyes of the one or more users 52\* with respect to one or more aspects of one or more non-augmentation scene elements (e.g., the white sand shown in the augmented view 60*c* of FIG. 6C) included in the one or more remotely displayed augmented views (e.g., augmented view 60*c* of FIG. 6C), the one or more eye focuses of the one or more eyes of the one or more users 52\* having been detected proximate to (e.g., during and/or immediately following) the remote display of the one or more remotely displayed augmented views (e.g., augmented view 60*c* of FIG. 6C).

In the same or alternative implementations, operation 1134 may include or involve an operation 1137 for receiving the second data that indicates the one or more eye focuses of the one or more eyes of the one or more users with respect to the one or more remotely displayed augmented views by receiving second data that indicates one or more dwell times of the one or more eyes of the one or more users with respect to the one or more remotely displayed augmented views and proximate to the remote display of the one or more remotely displayed augmented views. For instance, the second data acquiring module 104\* of the computing system 70\* of FIG. 7A or 7B receiving the second data that indicates the one or more eye focuses of the one or more eyes of the one or more users with respect to the one or more remotely displayed augmented views by receiving or acquiring second data 520 that indicates one or more dwell times (e.g., the amounts of time or periods of time that users stare at or visually focus on one or more visual objects) of the one or more eyes of the one or more users 52\* with respect to the one or more remotely displayed augmented views and proximate to the remote display of the one or more remotely displayed augmented views (e.g., augmented views 60*b*, 60*d*, 60*e*, 60*f*, 60*g*, 60*i*, 60*k*, and/or 60*m* of FIGS. 6B, 6D, 6E, 6F, 6G, 6I, 6K, and/or 6M).

Figure 11D:
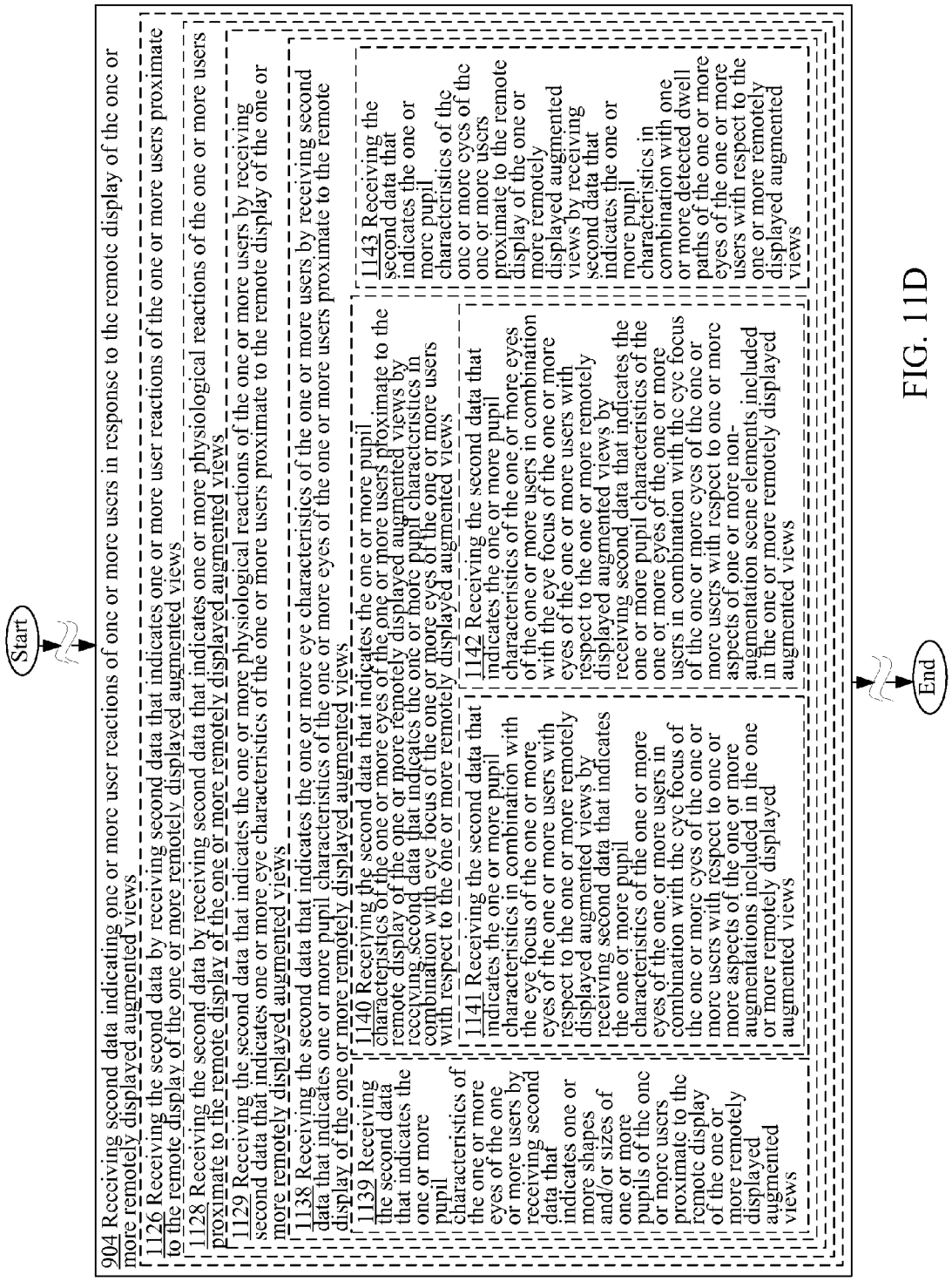
FIG. 11D is a high-level logic flowchart of a process depicting alternate implementations of the second data receiving operation 904 of FIG. 9.

Turning now to FIG. 11D, the operation 1129 for receiving the second data that indicates the one or more physiological reactions of the one or more users by receiving second data that indicates one or more eye characteristics of the one or more users proximate to the remote display of the one or more remotely displayed augmented views may additionally or alternatively include an operation 1138 for receiving the second data that indicates the one or more eye characteristics of the one or more users by receiving second data that indicates one or more pupil characteristics of the one or more eyes of the one or more users proximate to the remote display of the one or more remotely displayed augmented views. For instance, the second data acquiring module 104\* of the computing system 70\* of FIG. 7A or 7B receiving the second data that indicates the one or more eye characteristics of the one or more users by receiving or acquiring second data 520 that indicates one or more pupil characteristics of the one or more eyes of the one or more users 52\* proximate to (e.g., during and/or immediately following) the remote display of the one or more remotely displayed augmented views (e.g., augmented views 60*b*, 60*d*, 60*e*, 60*f*, 60*g*, 60*i*, 60*k*, and/or 60*m* of FIGS. 6B, 6D, 6E, 6F, 6G, 6I, 6K, and/or 6M).

As further illustrated in FIG. 11D, operation 1138 may further include one or more additional operations in various alternative implementations. For example, in some implementations, operation 1138 may include an operation 1139 for receiving the second data that indicates the one or more pupil characteristics of the one or more eyes of the one or more users by receiving second data that indicates one or more shapes and/or sizes of one or more pupils of the one or more users proximate to the remote display of the one or more remotely displayed augmented views. For instance, the second data acquiring module 104\* of the computing system 70\* of FIG. 7A or 7B receiving the second data that indicates the one or more pupil characteristics of the one or more eyes of the one or more users by receiving or acquiring second data 520 that indicates one or more shapes and/or sizes of one or more pupils of the one or more users 52\* proximate to (e.g., during and/or immediately following) the remote display of the one or more remotely displayed augmented views (e.g., augmented views 60*b*, 60*d*, 60*e*, 60*f*, 60*g*, 60*i*, 60*k*, and/or 60*m* of FIGS. 6B, 6D, 6E, 6F, 6G, 6I, 6K, and/or 6M).

In the same or alternative implementations, operation 1138 may additionally or alternatively include an operation 1140 for receiving the second data that indicates the one or more pupil characteristics of the one or more eyes of the one or more users proximate to the remote display of the one or more remotely displayed augmented views by receiving second data that indicates the one or more pupil characteristics in combination with eye focus of the one or more eyes of the one or more users with respect to the one or more remotely displayed augmented views. For instance, the second data acquiring module 104\* of the computing system 70\* of FIG. 7A or 7B receiving the second data that indicates the one or more pupil characteristics of the one or more eyes of the one or more users proximate to the remote display of the one or more remotely displayed augmented views by receiving or acquiring second data 520 that indicates the one or more pupil characteristics in combination with eye focus of the one or more eyes of the one or more users with respect to the one or more remotely displayed augmented views. Note that in various implementations, the eye focus (or focus of the eyes) of a user 52\* may be indicated or identified by identifying or indicating the focus point or points in the augmented or non-augmented view that the user is viewing.

In some cases, operation 1140 may further include an operation 1141 for receiving the second data that indicates the one or more pupil characteristics in combination with the eye focus of the one or more eyes of the one or more users with respect to the one or more remotely displayed augmented views by receiving second data that indicates the one or more pupil characteristics of the one or more eyes of the one or more users in combination with the eye focus of the one or more eyes of the one or more users with respect to one or more aspects of the one or more augmentations included in the one or more remotely displayed augmented views. For instance, the second data acquiring module 104\* of the computing system 70* of FIG. 7A or 7B receiving the second data that indicates the one or more pupil characteristics in combination with the eye focus of the one or more eyes of the one or more users with respect to the one or more remotely displayed augmented views by receiving or acquiring second data 520 that indicates the one or more pupil characteristics of the one or more eyes of the one or more users 52* in combination with the eye focus of the one or more eyes of the one or more users 52* with respect to one or more aspects of the one or more augmentations (e.g., augmentations 64a, 64b, 64c, 64d, 64e, 64f, 64g, and/or 64h of FIGS. 6B, 6D, 6E, 6F, 6G, 6I, 6K, and/or 6M) included in the one or more remotely displayed augmented views (e.g., augmented views 60b, 60d, 60e, 60f, 60g, 60i, 60k, and/or 60m of FIGS. 6B, 6D, 6E, 6F, 6G, 6I, 6K, and/or 6M).

In the same or alternative implementations, operation 1140 may additionally or alternatively include an operation 1142 for receiving the second data that indicates the one or more pupil characteristics of the one or more eyes of the one or more users in combination with the eye focus of the one or more eyes of the one or more users with respect to the one or more remotely displayed augmented views by receiving second data that indicates the one or more pupil characteristics of the one or more eyes of the one or more users in combination with the eye focus of the one or more eyes of the one or more users with respect to one or more aspects of one or more non-augmentation scene elements included in the one or more remotely displayed augmented views. For instance, the second data acquiring module 104* of the computing system 70* of FIG. 7A or 7B receiving the second data that indicates the one or more pupil characteristics of the one or more eyes of the one or more users in combination with the eye focus of the one or more eyes of the one or more users with respect to the one or more remotely displayed augmented views by receiving or acquiring second data 520 that indicates the one or more pupil characteristics of the one or more eyes of the one or more users 52* in combination with the eye focus of the one or more eyes of the one or more users 52* with respect to one or more aspects of one or more non-augmentation scene elements (e.g., a store front, a sign, a building, a geographical feature, and so forth) included in the one or more remotely displayed augmented views (e.g., augmented views 60b, 60d, 60e, 60f, 60g, 60i, 60k, and/or 60m of FIGS. 6B, 6D, 6E, 6F, 6G, 6I, 6K, and/or 6M).

In some implementations, operation 1138 for receiving the second data that indicates the one or more eye characteristics of the one or more users by receiving second data that indicates one or more pupil characteristics of the one or more eyes of the one or more users proximate to the remote display of the one or more remotely displayed augmented views may additionally or alternatively include an operation 1143 for receiving the second data that indicates the one or more pupil characteristics of the one or more eyes of the one or more users proximate to the remote display of the one or more remotely displayed augmented views by receiving second data that indicates the one or more pupil characteristics in combination with one or more detected dwell paths of the one or more eyes of the one or more users with respect to the one or more remotely displayed augmented views. For instance, the second data acquiring module 104* of the computing system 70* of FIG. 7A or 7B receiving the second data that indicates the one or more pupil characteristics of the one or more eyes of the one or more users proximate to the remote display of the one or more remotely displayed augmented views by receiving or acquiring second data 520 that indicates the one or more pupil characteristics in combination with one or more detected dwell paths of the one or more eyes of the one or more users 52* with respect to the one or more remotely displayed augmented views. In other words, acquiring second data 520 that indicates one or more dwell paths of the one or more users 52* as well as the one or more pupil characteristics of the one or more users 52* while the one or more eye focus of the one or more users 52* are tracking along the one or more dwell paths. This may indicate, for example, the one or more user's interest in one or more visual items found along the one or more dwell paths.

Figure 11E:
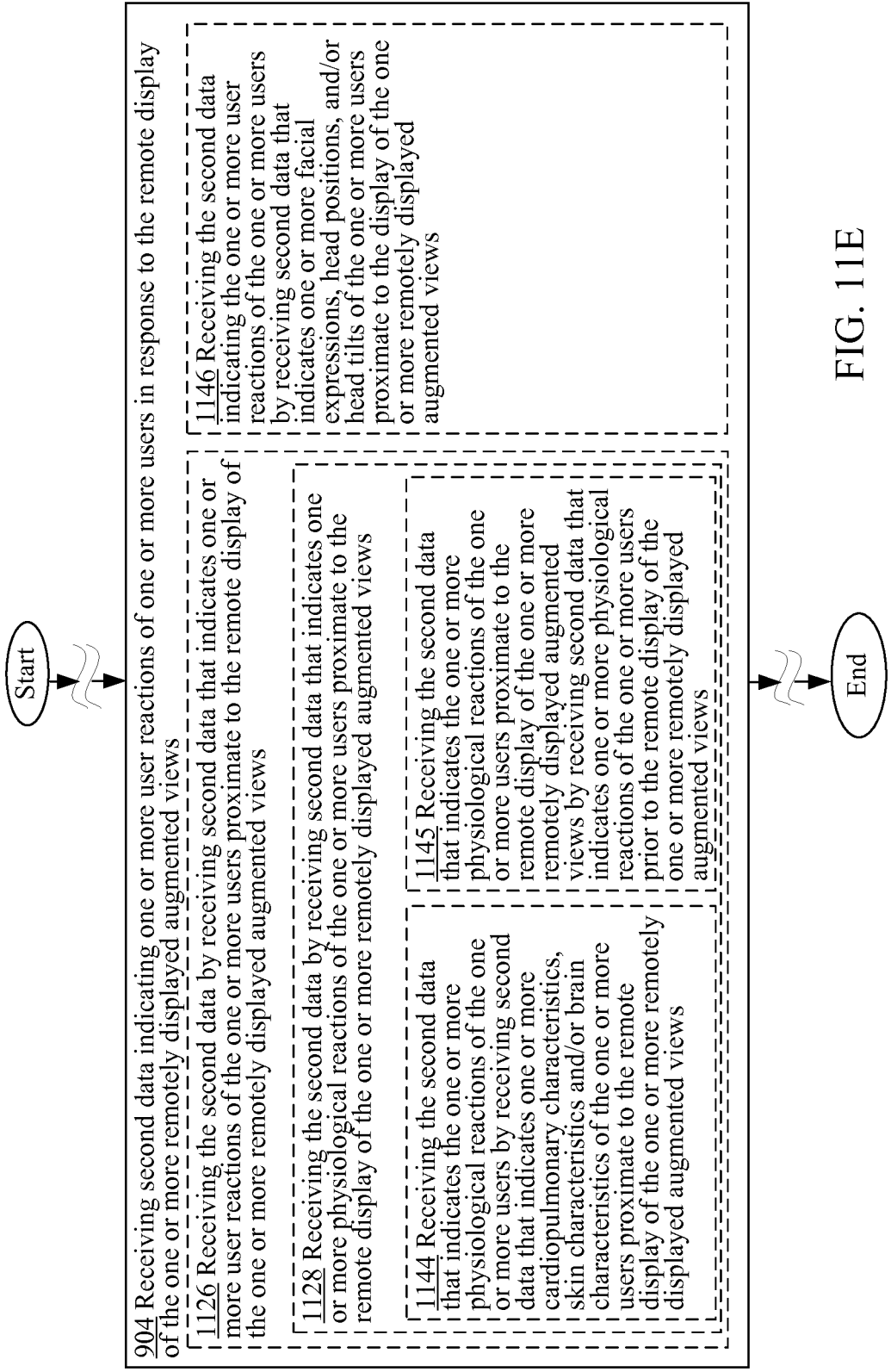
FIG. 11E is a high-level logic flowchart of a process depicting alternate implementations of the second data receiving operation 904 of FIG. 9.

Referring now to FIG. 11E, in some cases, operation 1128 for receiving the second data by receiving second data that indicates one or more physiological reactions of the one or more users proximate to the remote display of the one or more remotely displayed augmented views may actually include or involve an operation 1144 for receiving the second data that indicates the one or more physiological reactions of the one or more users by receiving second data that indicates one or more cardiopulmonary characteristics, skin characteristics and/or brain characteristics of the one or more users proximate to the remote display of the one or more remotely displayed augmented views. For instance, the second data acquiring module 104* of the computing system 70* of FIG. 7A or 7B receiving the second data that indicates the one or more physiological reactions of the one or more users by receiving or acquiring second data 520 that indicates one or more cardiopulmonary characteristics, skin characteristics and/or brain characteristics (e.g., note that many of today's mobile computing device may be outfitted with various sensors to sense various user physiological characteristics) of the one or more users 52* proximate to the remote display of the one or more remotely displayed augmented views.

In the same or alternative implementations, operation 1128 may additionally or alternatively include an operation 1145 for receiving the second data that indicates the one or more physiological reactions of the one or more users proximate to the remote display of the one or more remotely displayed augmented views by receiving second data that indicates one or more physiological reactions of the one or more users prior to the remote display of the one or more remotely displayed augmented views. For instance, the second data acquiring module 104* of the computing system 70* of FIG. 7A or 7B receiving the second data that indicates the one or more physiological reactions of the one or more users proximate to the remote display of the one or more remotely displayed augmented views by receiving or acquiring second data 520 that indicates one or more physiological reactions of the one or more users 52* prior to the remote display of the one or more remotely displayed augmented views. Such an operation may provide one or more baseline physiological characteristics of the one or more users 52*.

In some cases, the second data receiving operation 904 may include or involve an operation 1146 for receiving the second data indicating the one or more user reactions of the one or more users by receiving second data that indicates one or more facial expressions, head positions, and/or head tilts of the one or more users proximate to the display of the one or more remotely displayed augmented views. For instance, the second data acquiring module 104* of the computing system 70* of FIG. 7A or 7B receiving the second data indicating the one or more user reactions of the one or more users by receiving or acquiring second data 520 that indicates one or more facial expressions, head positions, and/or head tilts of the one or more users proximate to (e.g., during and/or immediately following) the display of the one or more remotely displayed augmented views.

Referring back to the correlating operation 906 of FIG. 9, the correlating operation 906 similar to the first data receiving operation 902 and the second data receiving operation 904 of FIG. 9 may be executed in a number of different ways in various alternative embodiments as illustrated in FIGS. 12A, 12B, 12C, 12D, 12E, and 12F. In some implementations, for example, the correlating operation 906 may include an operation 1247 for correlating the one or more user reactions with the one or more augmentations by determining one or more relationships between the one or more user reactions and the one or more augmentations, the one or more user reactions having occurred proximate to the remote display of the one or more remotely displayed augmented views. For instance, the user reaction/augmentation associating module 106* including the relationship identifying module 802 (see FIG. 8A) of the computing system 70* of FIG. 7A or 7B correlating the one or more user reactions with the one or more augmentations when the relationship identifying module 802 determines or identifies one or more relationships (e.g., causal relationship) between the one or more user reactions (e.g., ocular and/or other physiological reactions) and the one or more augmentations (e.g., augmentations 64a, 64b, 64c, 64d, 64e, 64f, 64g, and/or 64h of FIGS. 6B, 6D, 6E, 6F, 6G, 6I, 6K, and/or 6M), the one or more user reactions having occurred proximate to (e.g., during and/or immediately following) the remote display of the one or more remotely displayed augmented views (e.g., augmented views 60b, 60d, 60e, 60f, 60g, 60i, 60k, and/or 60m of FIGS. 6B, 6D, 6E, 6F, 6G, 6I, 6K, and/or 6M).

In some cases, operation 1247 may further involve or include an operation 1248 for determining the one or more relationships between the one or more user reactions and the one or more augmentations including determining one or more temporal relationships between the one or more user reactions and the one or more augmentations. For instance, the relationship identifying module 802 including the temporal relationship identifying module 804 (see FIG. 8A) of the computing system 70* of FIG. 7A or 7B determining the one or more relationships between the one or more user reactions and the one or more augmentations when the temporal relationship identifying module 804 determines or identifies one or more temporal relationships between the one or more user reactions and the one or more augmentations (e.g., the eyes of a user moving in a particular way following the display of the one or more augmentations).

In the same or alternative implementations, operation 1247 may additionally or alternatively include an operation 1249 for determining the one or more relationships between the one or more user reactions and the one or more augmentations including determining one or more spatial relationships between the one or more user reactions and the one or more augmentations. For instance, the relationship identifying module 802 including the spatial relationship identifying module 806 (see FIG. 8A) of the computing system 70* of FIG. 7A or 7B determining the one or more relationships between the one or more user reactions and the one or more augmentations when the spatial relationship identifying module 806 determines or identifies one or more spatial relationships between the one or more user reactions (e.g., user dwell paths and/or focus point or points) and the one or more augmentations (e.g., augmentations 64a, 64b, 64c, 64cc, 64d, 64e, 64f, 64g, and/or 64h of FIGS. 6B, 6D, 6E, 6F, 6G, 6I, 6K, and/or 6M).

Figure 12A:
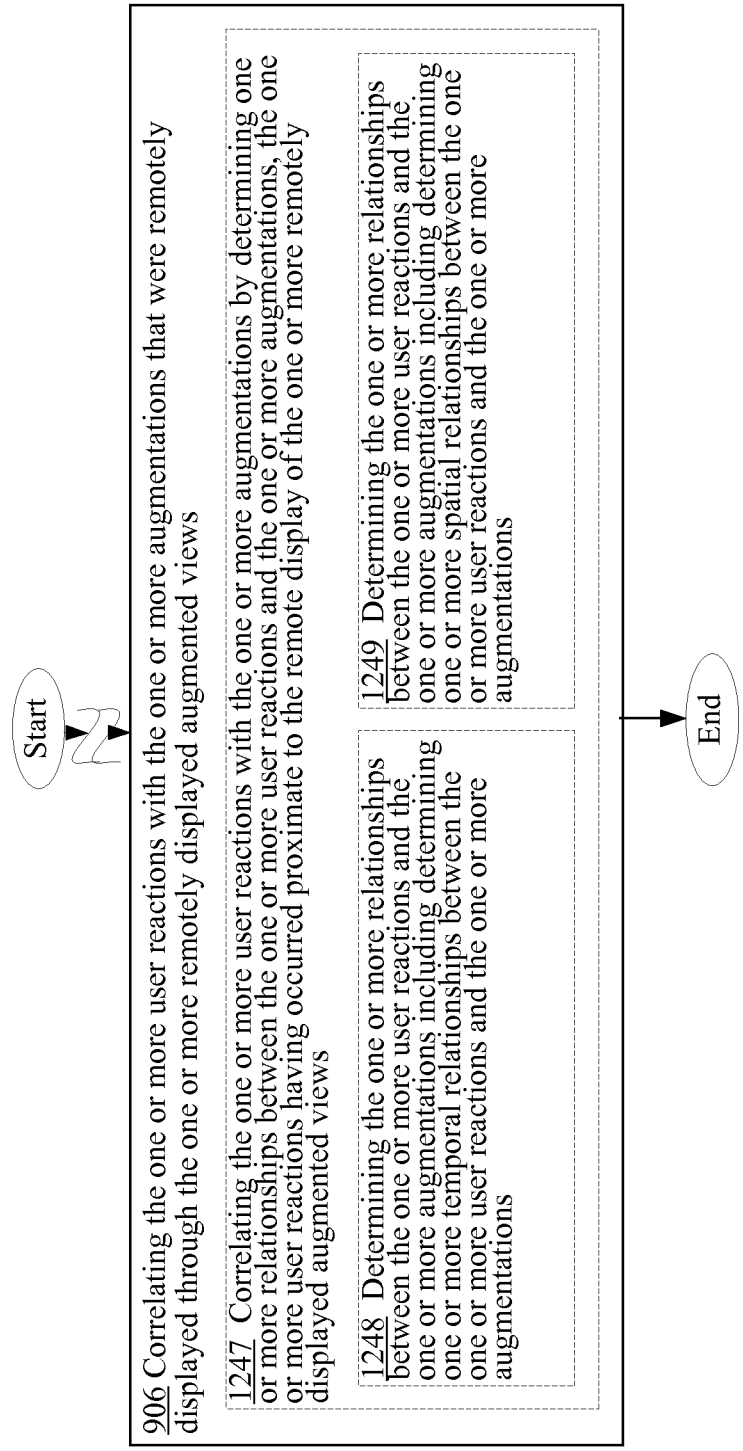
FIG. 12A is a high-level logic flowchart of a process depicting alternate implementations of the correlating operation 906 of FIG. 9.
Figure 12B:
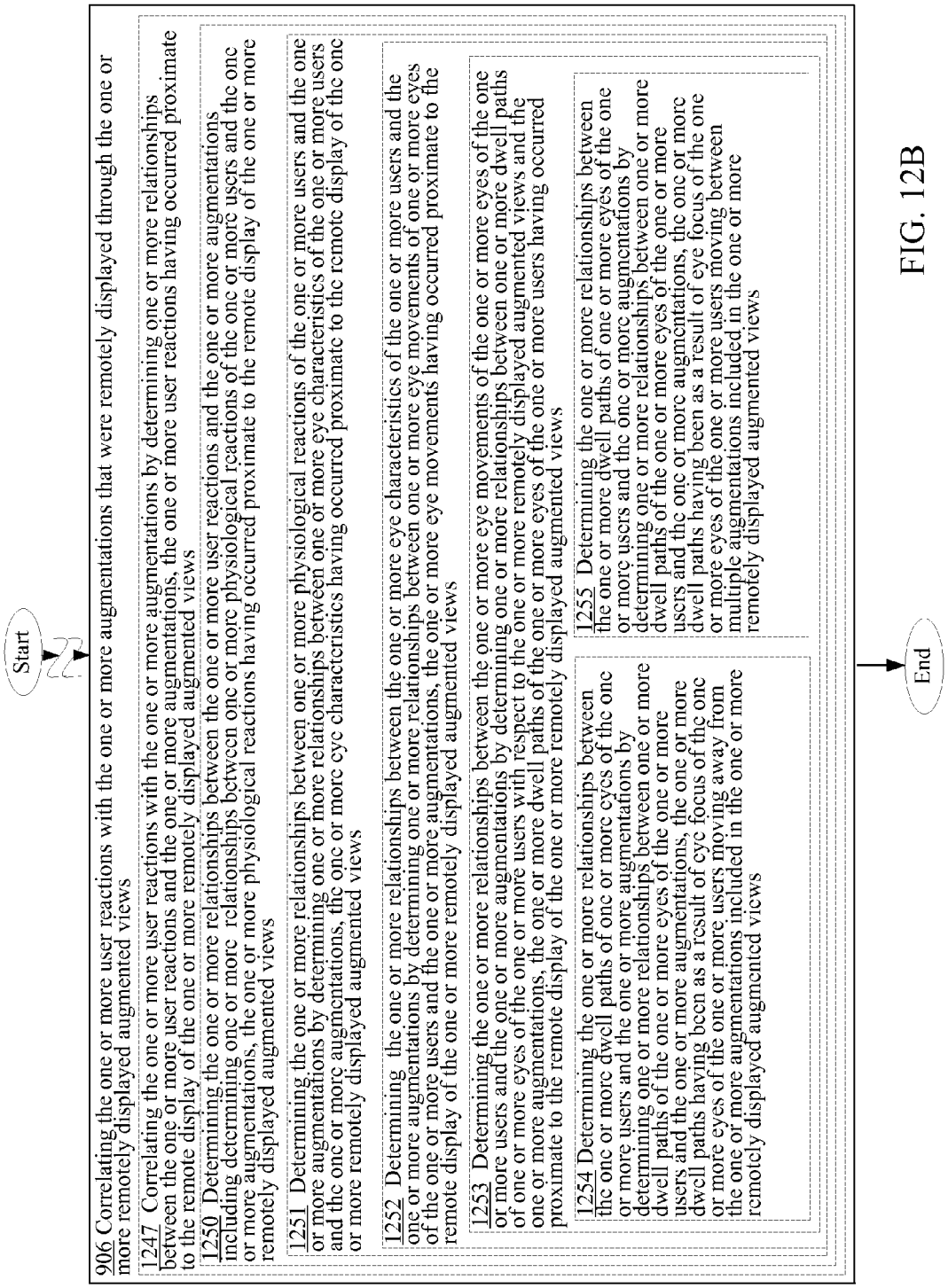
FIG. 12B is a high-level logic flowchart of a process depicting alternate implementations of the correlating operation 906 of FIG. 9.

Referring now to FIG. 12B, in some implementations, operation 1247 may include an operation 1250 for determining the one or more relationships between the one or more user reactions and the one or more augmentations including determining one or more relationships between one or more physiological reactions of the one or more users and the one or more augmentations, the one or more physiological reactions having occurred proximate to the remote display of the one or more remotely displayed augmented views. For instance, the relationship identifying module 802 including the physiological reaction/augmentation relationship identifying module 808 (see FIG. 8A) of the computing system 70* of FIG. 7A or 7B determining the one or more relationships between the one or more user reactions and the one or more augmentations when the physiological reaction/augmentation relationship identifying module 808 determines or identifies one or more relationships between one or more physiological reactions of the one or more users 52 and the one or more augmentations, the one or more physiological reactions having occurred proximate to (e.g., during and/or immediately following) the remote display of the one or more remotely displayed augmented views (e.g., augmented views 60b, 60d, 60e, 60f, 60g, 60i, 60k, and/or 60m of FIGS. 6B, 6D, 6E, 6F, 6G, 6I, 6K, and/or 6M).

As further illustrated in FIG. 12B, in some cases operation 1250 may, in turn, include an operation 1251 for determining the one or more relationships between one or more physiological reactions of the one or more users and the one or more augmentations by determining one or more relationships between one or more eye characteristics of the one or more users and the one or more augmentations, the one or more eye characteristics having occurred proximate to the remote display of the one or more remotely displayed augmented views. For instance, the physiological reaction/augmentation relationship identifying module 808 including the eye characteristic/augmentation relationship identifying module 810 (see FIG. 8A) of the computing system 70* of FIG. 7A or 7B determining the one or more relationships between one or more physiological reactions of the one or more users and the one or more augmentations when the eye characteristic/augmentation relationship identifying module 810 determines or identifies one or more relationships between one or more eye characteristics of the one or more users 52* and the one or more augmentations (e.g., augmentations 64a, 64b, 64c, 64cc, 64d, 64e, 64f, 64g, and/or 64h of FIGS. 6B, 6D, 6E, 6F, 6G, 6I, 6K, and/or 6M), the one or more eye characteristics having occurred proximate to (e.g., during and/or immediately following) the remote display of the one or more remotely displayed augmented views (e.g., augmented views 60b, 60d, 60e, 60f, 60g, 60i, 60k, and/or 60m of FIGS. 6B, 6D, 6E, 6F, 6G, 6I, 6K, and/or 6M).

In some implementations, operation 1251 may further include an operation 1252 for determining the one or more relationships between the one or more eye characteristics of the one or more users and the one or more augmentations by determining one or more relationships between one or more eye movements of one or more eyes of the one or more users and the one or more augmentations, the one or more eye movements having occurred proximate to the remote display of the one or more remotely displayed augmented views. For instance, the eye characteristic/augmentation relationship identifying module 810 including the eye movement/augmentation relationship identifying module 812 (see FIG. 8A) of the computing system 70* of FIG. 7A or 7B determining the one or more relationships between the one or more eye characteristics of the one or more users and the one or more augmentations when the eye movement/augmentation relationship identifying module 812 determines or identifies one or more relationships between one or more eye movements of one or more eyes of the one or more users 52* and the one or more augmentations (e.g., augmentations 64a, 64b, 64c, 64cc, 64d, 64e, 64f, 64g, and/or 64h of FIGS. 6B, 6D, 6E, 6F, 6G, 6I, 6K, and/or 6M), the one or more eye movements having occurred proximate to (e.g., during and/or immediately following) the remote display of the one or more remotely displayed augmented views (e.g., augmented views 60b, 60d, 60e, 60f, 60g, 60i, 60k, and/or 60m of FIGS. 6B, 6D, 6E, 6F, 6G, 6I, 6K, and/or 6M).

As further illustrated in FIG. 12B, operation 1252 may, in some implementations, further include an operation 1253 for determining the one or more relationships between the one or more eye movements of the one or more eyes of the one or more users and the one or more augmentations by determining one or more relationships between one or more dwell paths of one or more eyes of the one or more users with respect to the one or more remotely displayed augmented views and the one or more augmentations, the one or more dwell paths of the one or more eyes of the one or more users having occurred proximate to the remote display of the one or more remotely displayed augmented views. For instance, the eye movement/augmentation relationship identifying module 812 including the dwell path/augmentation relationship identifying module 814 (see FIG. 8A) of the computing system 70* of FIG. 7A or 7B determining the one or more relationships between the one or more eye movements of the one or more eyes of the one or more users and the one or more augmentations when the dwell path/augmentation relationship identifying module 814 determines or identifies one or more relationships between one or more dwell paths (e.g., dwell path 66b of FIG. 6E) of one or more eyes of the one or more users 52* with respect to the one or more remotely displayed augmented views (e.g., augmented view 60e of FIG. 6E) and the one or more augmentations (e.g., augmentation 64c of FIG. 6E), the one or more dwell paths of the one or more eyes of the one or more users 52* having occurred proximate to (e.g., during and/or immediately following) the remote display of the one or more remotely displayed augmented views (e.g., augmented view 60e of FIG. 6E).

As further illustrated in FIG. 12B, operation 1253 may further include one or more additional operations in various alternative implementations including, in some cases, an operation 1254 for determining the one or more relationships between the one or more dwell paths of one or more eyes of the one or more users and the one or more augmentations by determining one or more relationships between one or more dwell paths of the one or more eyes of the one or more users and the one or more augmentations, the one or more dwell paths having been as a result of eye focus of the one or more eyes of the one or more users moving away from the one or more augmentations included in the one or more remotely displayed augmented views. For instance, the dwell path/augmentation relationship identifying module 814 of the computing system 70* of FIG. 7A or 7B determining the one or more relationships between the one or more dwell paths of one or more eyes of the one or more users and the one or more augmentations by determining or identifying one or more relationships between one or more dwell paths (e.g., dwell path 66b of FIG. 6E) of the one or more eyes of the one or more users 52* and the one or more augmentations, the one or more dwell paths e.g., dwell path 66b) having been as a result of eye focus of the one or more eyes of the one or more users moving away from the one or more augmentations (e.g., augmentation 64c of FIG. 6E) included in the one or more remotely displayed augmented views (e.g., augmented view 60e of FIG. 6E). Note that in the example augmented view 60e illustrated in FIG. 6E, the dwell path 66b tracks the focus of the one or more eyes of a user 50* relative to the augmented view 60e and moving upwards towards the sky in the augmented view 60e after viewing the informational augmentation 64c, which indicates 90 percent chance of rain.

In the same or alternative implementations, operation 1253 may additionally or alternatively include an operation 1255 for determining the one or more relationships between the one or more dwell paths of one or more eyes of the one or more users and the one or more augmentations by determining one or more relationships between one or more dwell paths of the one or more eyes of the one or more users and the one or more augmentations, the one or more dwell paths having been as a result of eye focus of the one or more eyes of the one or more users moving between multiple augmentations included in the one or more remotely displayed augmented views. For instance, the dwell path/augmentation relationship identifying module 814 of the computing system 70* of FIG. 7A or 7B determining the one or more relationships between the one or more dwell paths of one or more eyes of the one or more users and the one or more augmentations by determining or identifying one or more relationships between one or more dwell paths (e.g., dwell path 66c of FIG. 6G) of the one or more eyes of the one or more users 52* and the one or more augmentations (e.g., augmentations 64c and 64e of FIG. 6G), the one or more dwell paths (e.g., dwell path 66c) having been as a result of eye focus of the one or more eyes of the one or more users 52* moving between multiple augmentations e.g., augmentations 64c and 64e) included in the one or more remotely displayed augmented views (e.g., augmented view 60g of FIG. 6G).

Figure 12C:
FIG. 12C is a high-level logic flowchart of a process depicting alternate implementations of the correlating operation 906 of FIG. 9.

Turning now to FIG. 12C, in some cases, operation 1251 for determining the one or more relationships between one or more physiological reactions of the one or more users and the one or more augmentations by determining one or more relationships between one or more eye characteristics of the one or more users and the one or more augmentations, the one or more eye characteristics having occurred proximate to the remote display of the one or more remotely displayed augmented views may actually include or involve an operation 1256 for determining the one or more relationships between the one or more eye characteristics of the one or more users and the one or more augmentations by determining one or more relationships between eye focus of the one or more eyes of the one or more users with respect to the one or more remotely displayed augmented views and the one or more augmentations, the eye focus of the one or more eyes of the one or more users having occurred proximate to the remote display of the one or more remotely displayed augmented views. For instance, the eye characteristic/augmentation relationship identifying module 810 including the eye focus/augmentation relationship identifying module 816 (see FIG. 8A) of the computing system 70* of FIG. 7A or 7B determining the one or more relationships between the one or more eye characteristics of the one or more users and the one or more augmentations when the eye focus/augmentation relationship identifying module 816 determines or identifies one or more relationships between eye focus of the one or more eyes of the one or more users 52* with respect to the one or more remotely displayed augmented views (e.g., augmented views 60b, 60d, 60e, 60f, 60g, 60i, 60k, and/or 60m of FIGS. 6B, 6D, 6E, 6F, 6G, 6I, 6K, and/or 6M) and the one or more augmentations (e.g., augmentations 64a, 64b, 64c, 64cc, 64d, 64e, 64f, 64g, and/or 64h of FIGS. 6B, 6D, 6E, 6F, 6G, 6I, 6K, and/or 6M), the eye focus of the one or more eyes of the one or more users 52* having occurred proximate to (e.g., during and/or immediately following) the remote display of the one or more remotely displayed augmented views (e.g., augmented views 60b, 60d, 60e, 60f, 60g, 60i, 60k, and/or 60m).

As further illustrated in FIG. 12C, in various implementations operation 1256 may include one or more additional operations including, in some cases, an operation 1257 for determining the one or more relationships between the one or more eye focus of the one or more eyes of the one or more users with respect to the one or more remotely displayed augmented views and the one or more augmentations by determining one or more relationships between eye focus of the one or more eyes of the one or more users and the one or more augmentations, the eye focus of the one or more eyes of the one or more users being with respect to one or more aspects of the one or more augmentations included in the one or more remotely displayed augmented views, and the eye focus of the one or more eyes of the one or more users having occurred proximate to the remote display of the one or more remotely displayed augmented views. For instance, the eye focus/augmentation relationship identifying module 816 of the computing system 70* of FIG. 7A or 7B determining the one or more relationships between the one or more eye focus of the one or more eyes of the one or more users with respect to the one or more remotely displayed augmented views and the one or more augmentations by determining or identifying one or more relationships between eye focus of the one or more eyes of the one or more users 52* and the one or more augmentations, the eye focus (e.g., eye focus 65c of FIG. 6F) of the one or more eyes of the one or more users 52* being with respect to one or more aspects (e.g., augmentation aspect 67a of FIG. 6F, which is the border or outline of augmentation 64cc of FIG. 6F) of the one or more augmentations (e.g. augmentation 64cc) included in the one or more remotely displayed augmented views (e.g., augmented view 60f of FIG. 6F), and the eye focus of the one or more eyes of the one or more users 52* having occurred proximate to (e.g., during and/or immediately following) the remote display of the one or more remotely displayed augmented views (e.g., augmented view 60f).

In the same or alternative implementations, operation 1256 may additionally or alternatively include an operation 1258 for determining the one or more relationships between the one or more eye focus of the one or more eyes of the one or more users with respect to the one or more remotely displayed augmented views and the one or more augmentations by determining one or more relationships between eye focus of the one or more eyes of the one or more users and the one or more augmentations, the eye focus of the one or more eyes of the one or more users being with respect to one or more aspects of one or more non-augmentation scene elements included in the one or more remotely displayed augmented views, and the eye focus of the one or more eyes of the one or more users having occurred proximate to the remote display of the one or more remotely displayed augmented views. For instance, the eye focus/augmentation relationship identifying module 816 of the computing system 70* of FIG. 7A or 7B determining the one or more relationships between the one or more eye focus of the one or more eyes of the one or more users with respect to the one or more remotely displayed augmented views and the one or more augmentations by determining or identifying one or more relationships between eye focus of the one or more eyes of the one or more users 52* and the one or more augmentations (e.g., augmentation 64c), the eye focus of the one or more eyes of the one or more users 52* being with respect to one or more aspects (e.g., color, brightness, position, features, etc.) of one or more non-augmentation scene elements (e.g., white sand beach and the ocean water as shown in augmented view 60f of FIG. 6F) included in the one or more remotely displayed augmented views (e.g. augmented view 60f), and the eye focus of the one or more eyes of the one or more users 52* having occurred proximate to (e.g., during and/or immediately following) the remote display of the one or more remotely displayed augmented views (e.g., augmented view 60f).

In the same or alternative implementations, operation 1256 may additionally or alternatively include an operation 1259 for determining the one or more relationships between the one or more eye focus of the one or more eyes of the one or more users with respect to the one or more remotely displayed augmented views and the one or more augmentations by determining one or more relationships between dwell time of the one or more eyes of the one or more users and the one or more augmentations, the dwell time of the one or more eyes of the one or more users being with respect to the one or more remotely displayed augmented views, and the dwell time having occurred proximate to the remote display of the one or more remotely displayed augmented views. For instance, the eye focus/augmentation relationship identifying module 816 including the dwell time relationship identifying module 818 (see FIG. 8A) of the computing system 70* of FIG. 7A or 7B determining the one or more relationships between the one or more eye focus of the one or more eyes of the one or more users with respect to the one or more remotely displayed augmented views and the one or more augmentations when the dwell time relationship identifying module 818 determines or identifies one or more relationships between dwell time of the one or more eyes of the one or more users 52* and the one or more augmentations (e.g., augmentations 64a, 64b, 64c, 64cc, 64d, 64e, 64f, 64g, and/or 64h of FIGS. 6B, 6D, 6E, 6F, 6G, 6I, 6K, and/or 6M), the dwell time of the one or more eyes of the one or more users 52* being with respect to the one or more remotely displayed augmented views (e.g., augmented views 60b, 60d, 60e, 60f, 60g, 60i, 60k, and/or 60m of FIGS. 6B, 6D, 6E, 6F, 6G, 6I, 6K, and/or 6M), and the dwell time having occurred proximate to (e.g., during and/or immediately following) the remote display of the one or more remotely displayed augmented views (e.g., augmented views 60b, 60d, 60e, 60f, 60g, 60i, 60k).

Figure 12D:
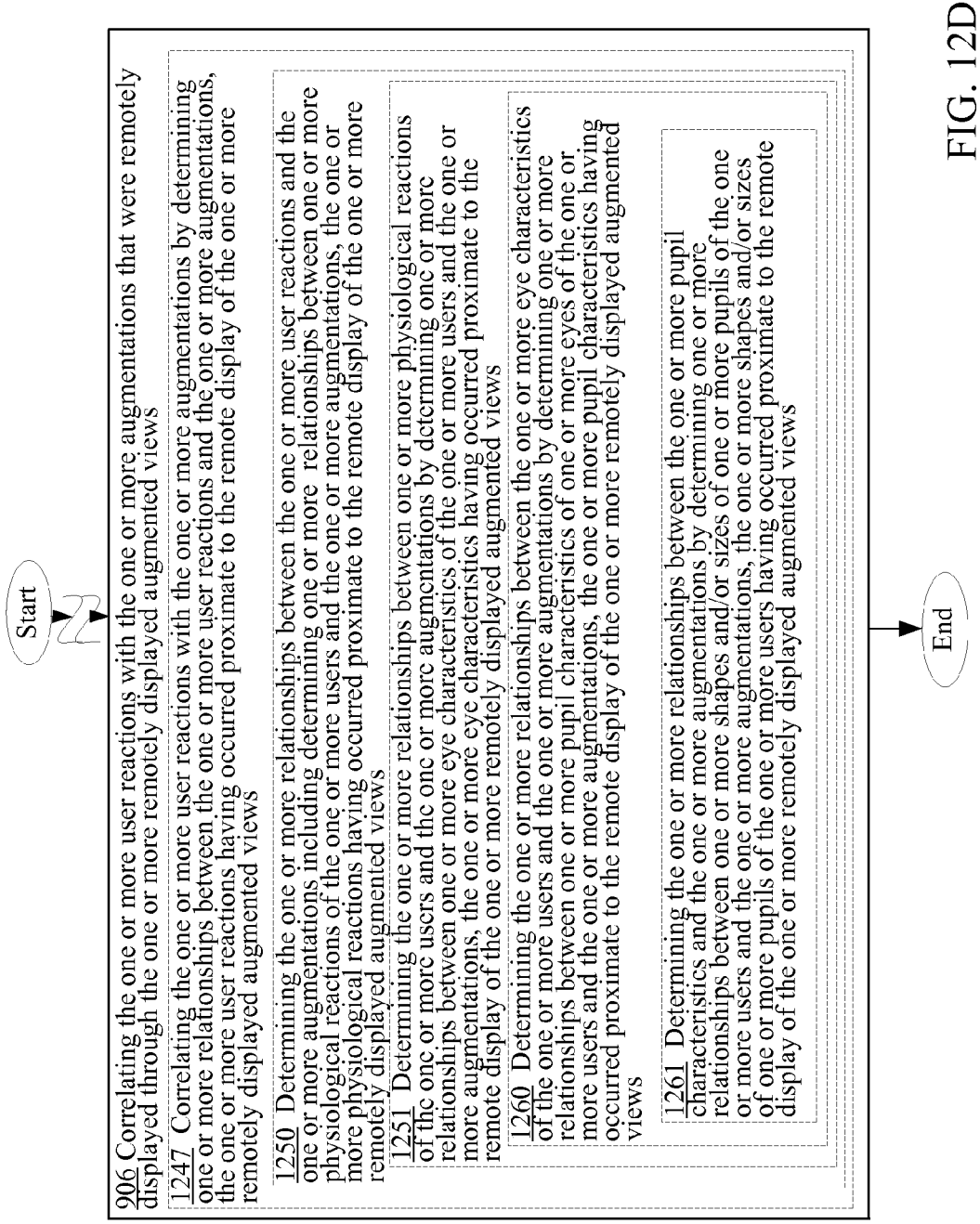
FIG. 12D is a high-level logic flowchart of a process depicting alternate implementations of the correlating operation 906 of FIG. 9.

Referring now to FIG. 12D, in some implementations, operation 1251 for determining the one or more relationships between one or more physiological reactions of the one or more users and the one or more augmentations by determining one or more relationships between one or more eye characteristics of the one or more users and the one or more augmentations, the one or more eye characteristics having occurred proximate to the remote display of the one or more remotely displayed augmented views may include an operation 1260 for determining the one or more relationships between the one or more eye characteristics of the one or more users and the one or more augmentations by determining one or more relationships between one or more pupil characteristics of one or more eyes of the one or more users and the one or more augmentations, the one or more pupil characteristics having occurred proximate to the remote display of the one or more remotely displayed augmented views. For instance, the eye characteristic/augmentation relationship identifying module 810 including the eye pupil/augmentation relationship identifying module 820 (see FIG. 8A) of the computing system 70* of FIG. 7A or 7B determining the one or more relationships between the one or more eye characteristics of the one or more users and the one or more augmentations when the eye pupil/augmentation relationship identifying module 820 determines or identifies one or more relationships between one or more pupil characteristics of one or more eyes of the one or more users 52* and the one or more augmentations (e.g., augmentations 64a, 64b, 64c, 64cc, 64d, 64e, 64f, 64g, and/or 64h of FIGS. 6B, 6D, 6E, 6F, 6G, 6I, 6K, and/or 6M), the one or more pupil characteristics having occurred proximate to (e.g., during and/or immediately following) the remote display of the one or more remotely displayed augmented views (e.g., augmented views 60*b*, 60*d*, 60*e*, 60*f*, 60*g*, 60*i*, 60*k*, and/or 60*m* of FIGS. 6B, 6D, 6E, 6F, 6G, 6I, 6K, and/or 6M).

In some implementations, operation 1260 may further include or involve an operation 1261 for determining the one or more relationships between the one or more pupil characteristics and the one or more augmentations by determining one or more relationships between one or more shapes and/or sizes of one or more pupils of the one or more users and the one or more augmentations, the one or more shapes and/or sizes of one or more pupils of the one or more users having occurred proximate to the remote display of the one or more remotely displayed augmented views. For instance, the eye pupil/augmentation relationship identifying module 820 of the computing system 70\* of FIG. 7A or 7B determining the one or more relationships between the one or more pupil characteristics and the one or more augmentations by determining or identifying one or more relationships between one or more shapes and/or sizes of one or more pupils of the one or more users 52\* and the one or more augmentations (e.g., augmentations 64*a*, 64*b*, 64*c*, 64*cc*, 64*d*, 64*e*, 64*f*, 64*g*, and/or 64*h* of FIGS. 6B, 6D, 6E, 6F, 6G, 6I, 6K, and/or 6M), the one or more shapes and/or sizes of one or more pupils of the one or more users having occurred proximate to (e.g., during and/or immediately following) the remote display of the one or more remotely displayed augmented views (e.g., augmented views 60*b*, 60*d*, 60*e*, 60*f*, 60*g*, 60*i*, 60*k*, and/or 60*m* of FIGS. 6B, 6D, 6E, 6F, 6G, 6I, 6K, and/or 6M).

Figure 12E:
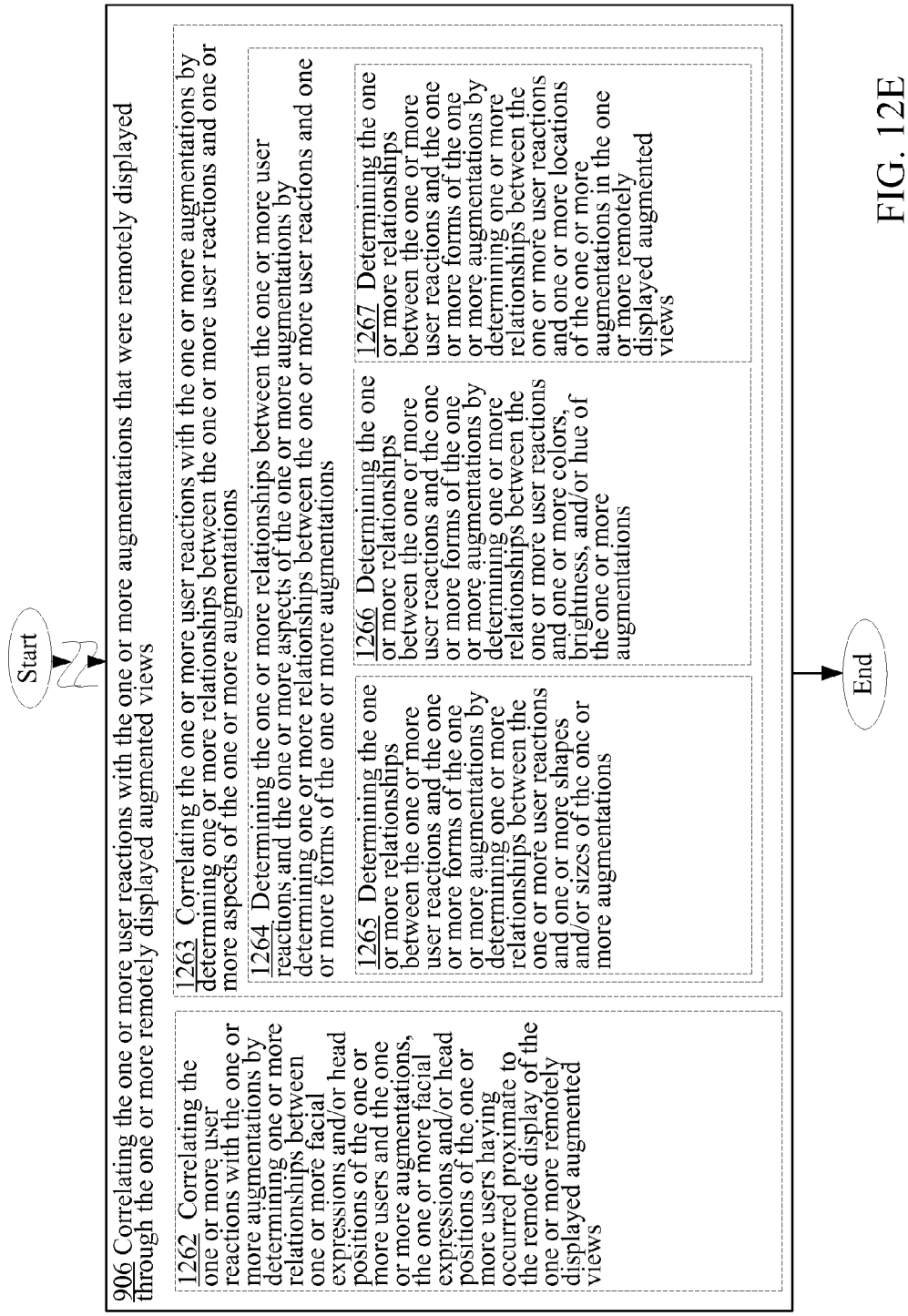
FIG. 12E is a high-level logic flowchart of a process depicting alternate implementations of the correlating operation 906 of FIG. 9.

Turning now to FIG. 12E, in various implementations, the correlating operation 906 of FIG. 9 may include or involve an operation 1262 for correlating the one or more user reactions with the one or more augmentations by determining one or more relationships between one or more facial expressions and/or head positions of the one or more users and the one or more augmentations, the one or more facial expressions and/or head positions of the one or more users having occurred proximate to the remote display of the one or more remotely displayed augmented views. For instance, the user reaction/augmentation associating module 106\* including the relationship identifying module 802 of the computing system 70\* of FIG. 7A or 7B correlating the one or more user reactions with the one or more augmentations when the relationship identifying module 802 determines or identifies one or more relationships between one or more facial expressions and/or head positions of the one or more users 52\* and the one or more augmentations (e.g., augmentations 64*a*, 64*b*, 64*c*, 64*d*, 64*e*, 64*f*, 64*g*, and/or 64*h* of FIGS. 6B, 6D, 6E, 6F, 6G, 6I, 6K, and/or 6M), the one or more facial expressions and/or head positions of the one or more users having occurred proximate to (e.g., during and/or immediately following) the remote display of the one or more remotely displayed augmented views (e.g., augmented views 60*b*, 60*d*, 60*e*, 60*f*, 60*g*, 60*i*, 60*k*, and/or 60*m* of FIGS. 6B, 6D, 6E, 6F, 6G, 6I, 6K, and/or 6M).

In the same or alternative implementations, the correlating operation 906 of FIG. 9 may alternatively or additionally include an operation 1263 for correlating the one or more user reactions with the one or more augmentations by determining one or more relationships between the one or more user reactions and one or more aspects of the one or more augmentations as further illustrated in FIG. 12E. For instance, the user reaction/augmentation associating module 106\* including the user reaction/augmentation aspect relationship ascertaining module 822 (see FIG. 8A) of the computing system 70\* of FIG. 7A or 7B correlating the one or more user reactions with the one or more augmentations when the user reaction/augmentation aspect relationship ascertaining module 822 determines or ascertains one or more relationships between the one or more user reactions and one or more aspects of the one or more augmentations (e.g., augmentations 64*a*, 64*b*, 64*c*, 64*cc*, 64*d*, 64*e*, 64*f*, 64*g*, and/or 64*h* of FIGS. 6B, 6D, 6E, 6F, 6G, 6I, 6K, and/or 6M).

As further illustrated in FIG. 12E, in various implementations operation 1263 may include one or more additional operations including, in some cases, an operation 1264 for determining the one or more relationships between the one or more user reactions and the one or more aspects of the one or more augmentations by determining one or more relationships between the one or more user reactions and one or more forms of the one or more augmentations. For instance, the user reaction/augmentation aspect relationship ascertaining module 822 including the user reaction/augmentation form relationship ascertaining module 824 (see FIG. 8A) of the computing system 70\* of FIG. 7A or 7B determining the one or more relationships between the one or more user reactions and the one or more aspects of the one or more augmentations when the user reaction/augmentation form relationship ascertaining module 824 determines or ascertains one or more relationships between the one or more user reactions (e.g., physiological reactions or facial reactions) and one or more forms of the one or more augmentations.

In some implementations, operation 1264 may further include an operation 1265 for determining the one or more relationships between the one or more user reactions and the one or more forms of the one or more augmentations by determining one or more relationships between the one or more user reactions and one or more shapes and/or sizes of the one or more augmentations. For instance the user reaction/augmentation form relationship ascertaining module 824 of the computing system 70\* of FIG. 7A or 7B determining the one or more relationships between the one or more user reactions and the one or more forms of the one or more augmentations by determining or ascertaining one or more relationships between the one or more user reactions (e.g., eye movement and/or pupil reactions) and one or more shapes and/or sizes of the one or more augmentations (e.g., augmentations 64*a*, 64*b*, 64*c*, 64*d*, 64*e*, 64*f*, 64*g*, and/or 64*h* of FIGS. 6B, 6D, 6E, 6F, 6G, 6I, 6K, and/or 6M).

In the same or alternative implementations, operation 1264 may additionally or alternatively include an operation 1266 for determining the one or more relationships between the one or more user reactions and the one or more forms of the one or more augmentations by determining one or more relationships between the one or more user reactions and one or more colors, brightness, and/or hue of the one or more augmentations. For instance the user reaction/augmentation form relationship ascertaining module 824 of the computing system 70\* of FIG. 7A or 7B determining the one or more relationships between the one or more user reactions and the one or more forms of the one or more augmentations by determining or ascertaining one or more relationships between the one or more user reactions (e.g., dwell paths and/or dwell times) and one or more colors, brightness, and/or hue of the one or more augmentations (e.g., augmentations 64*a*, 64*b*, 64*c*, 64*d*, 64*e*, 64*f*, 64*g*, and/or 64*h* of FIGS. 6B, 6D, 6E, 6F, 6G, 6I, 6K, and/or 6M).

In the same or alternative implementations, operation 1264 may additionally or alternatively include an operation 1267 for determining the one or more relationships between the one or more user reactions and the one or more forms of the one or more augmentations by determining one or more relationships between the one or more user reactions and one or more locations of the one or more augmentations in the one or more remotely displayed augmented views. For instance the user reaction/augmentation form relationship ascertaining module 824 including the user reaction/augmentation location relationship ascertaining module 826 (see FIG. 8A) of the computing system 70* of FIG. 7A or 7B determining the one or more relationships between the one or more user reactions and the one or more forms of the one or more augmentations when the user reaction/augmentation location relationship ascertaining module 826 determines or ascertains one or more relationships between the one or more user reactions (e.g., dwell paths and/or pupil reactions) and one or more locations of the one or more augmentations (e.g., augmentations 64*a*, 64*b*, 64*c*, 64*d*, 64*e*, 64*f*, 64*g*, and/or 64*h* of FIGS. 6B, 6D, 6E, 6F, 6G, 6I, 6K, and/or 6M) in the one or more remotely displayed augmented views (e.g., augmented views 60*b*, 60*d*, 60*e*, 60*f*, 60*g*, 60*i*, 60*k*, and/or 60*m* of FIGS. 6B, 6D, 6E, 6F, 6G, 6I, 6K, and/or 6M).

Figure 12F:
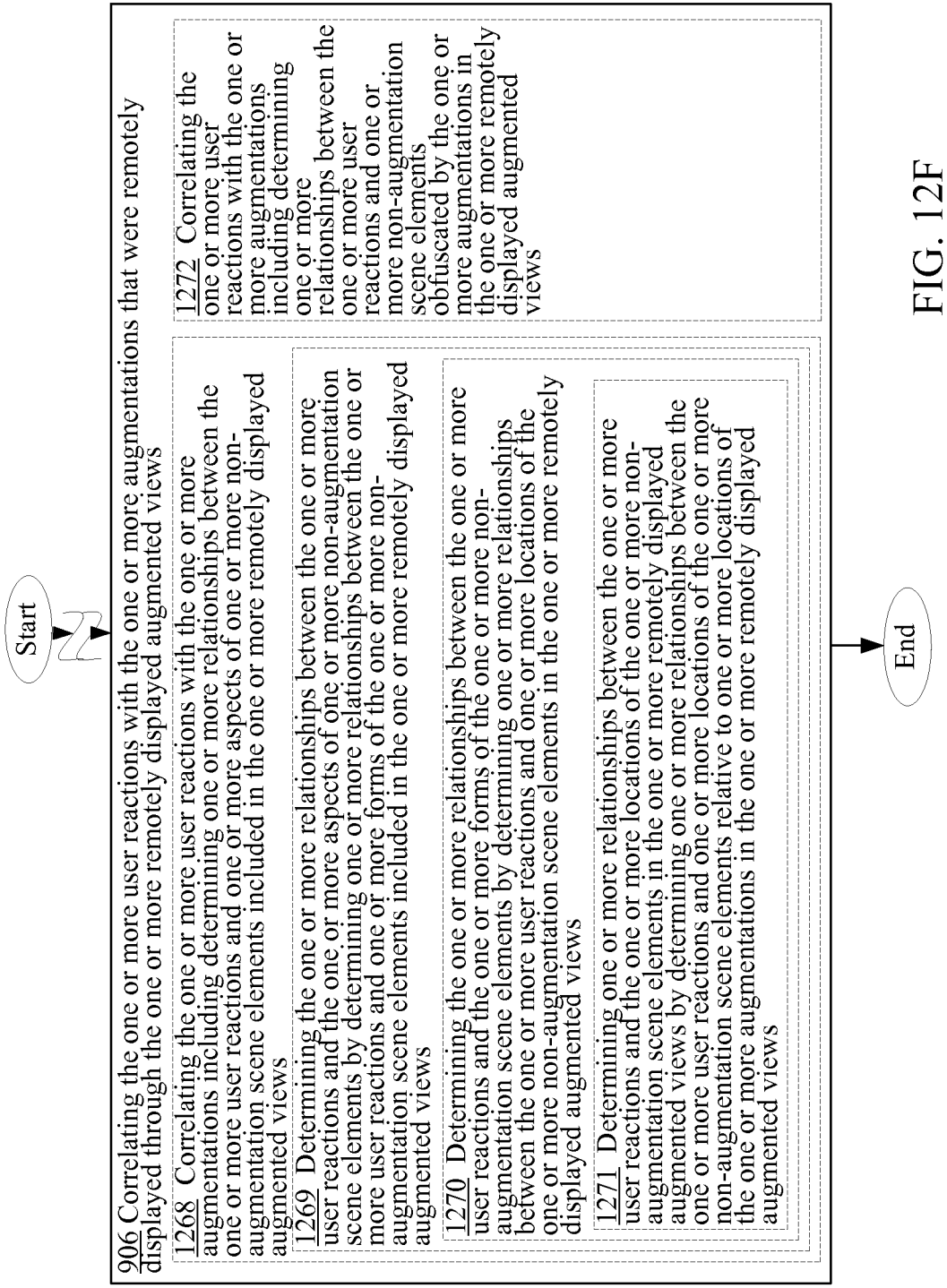
FIG. 12F is a high-level logic flowchart of a process depicting alternate implementations of the correlating operation 906 of FIG. 9.

Referring now to FIG. 12F, in various implementations the correlating operation 906 of FIG. 9 may include an operation 1268 for correlating the one or more user reactions with the one or more augmentations including determining one or more relationships between the one or more user reactions and one or more aspects of one or more non-augmentation scene elements included in the one or more remotely displayed augmented views. For instance, the user reaction/augmentation associating module 106* including the user reaction/non-augmentation scene element aspect relationship ascertaining module 828 (see FIG. 8A) of the computing system 70* of FIG. 7A or 7B correlating the one or more user reactions with the one or more augmentations when the user reaction/non-augmentation scene element aspect relationship ascertaining module 828 determines or ascertains one or more relationships between the one or more user reactions and one or more aspects of one or more non-augmentation scene elements (e.g., geographical or natural feature, buildings, street or store signs, and so forth) included in the one or more remotely displayed augmented views (e.g., augmented views 60*b*, 60*d*, 60*e*, 60*f*, 60*g*, 60*i*, 60*k*, and/or 60*m* of FIGS. 6B, 6D, 6E, 6F, 6G, 6I, 6K, and/or 6M).

In some cases, operation 1268 may further include an operation 1269 for determining the one or more relationships between the one or more user reactions and the one or more aspects of one or more non-augmentation scene elements by determining one or more relationships between the one or more user reactions and one or more forms of the one or more non-augmentation scene elements included in the one or more remotely displayed augmented views. For instance, the user reaction/non-augmentation scene element aspect relationship ascertaining module 828 including the user reaction/non-augmentation scene element form relationship ascertaining module 830 (see FIG. 8A) of the computing system 70* of FIG. 7A or 7B determining the one or more relationships between the one or more user reactions and the one or more aspects of one or more non-augmentation scene elements when the user reaction/non-augmentation scene element form relationship ascertaining module 830 determines or ascertains one or more relationships between the one or more user reactions and one or more forms (e.g., visual formats) of the one or more non-augmentation scene elements included in the one or more remotely displayed augmented views (e.g., augmented views 60*b*, 60*d*, 60*e*, 60*f*, 60*g*, 60*i*, 60*k*, and/or 60*m* of FIGS. 6B, 6D, 6E, 6F, 6G, 6I, 6K, and/or 6M).

In some cases, operation 1269 may, in turn, include an operation 1270 for determining the one or more relationships between the one or more user reactions and the one or more forms of the one or more non-augmentation scene elements by determining one or more relationships between the one or more user reactions and one or more locations of the one or more non-augmentation scene elements in the one or more remotely displayed augmented views. For instance, the user reaction/non-augmentation scene element form relationship ascertaining module 830 including the user reaction/non-augmentation scene element location relationship ascertaining module 832 (see FIG. 8A) of the computing system 70* of FIG. 7A or 7B determining the one or more relationships between the one or more user reactions and the one or more forms of the one or more non-augmentation scene elements when the user reaction/non-augmentation scene element location relationship ascertaining module 832 determines or ascertains one or more relationships between the one or more user reactions (e.g., dwell path 66*b* of FIG. 6E) and one or more locations of the one or more non-augmentation scene elements (e.g., blue sky in the augmented view 60*e* of FIG. 6E that is located at top portion of the augmented view 60*e*) in the one or more remotely displayed augmented views (e.g., augmented views 60*b*, 60*d*, 60*e*, 60*f*, 60*g*, 60*i*, 60*k*, and/or 60*m* of FIGS. 6B, 6D, 6E, 6F, 6G, 6I, 6K, and/or 6M).

As further illustrated in FIG. 12F, operation 1270 in some cases may further include an operation 1271 for determining one or more relationships between the one or more user reactions and the one or more locations of the one or more non-augmentation scene elements in the one or more remotely displayed augmented views by determining one or more relationships between the one or more user reactions and one or more locations of the one or more non-augmentation scene elements relative to one or more locations of the one or more augmentations in the one or more remotely displayed augmented views. For instance, the user reaction/non-augmentation scene element location relationship ascertaining module 832 of the computing system 70* of FIG. 7A or 7B determining one or more relationships between the one or more user reactions and the one or more locations of the one or more non-augmentation scene elements in the one or more remotely displayed augmented views by determining or ascertaining one or more relationships between the one or more user reactions and one or more locations of the one or more non-augmentation scene elements (e.g., geographical or natural features) relative to one or more locations of the one or more augmentations (e.g., augmentations 64*a*, 64*b*, 64*c*, 64*d*, 64*e*, 64*f*, 64*g*, and/or 64*h* of FIGS. 6B, 6D, 6E, 6F, 6G, 6I, 6K, and/or 6M) in the one or more remotely displayed augmented views (e.g., augmented views 60*b*, 60*d*, 60*e*, 60*f*, 60*g*, 60*i*, 60*k*, and/or 60*m* of FIGS. 6B, 6D, 6E, 6F, 6G, 6I, 6K, and/or 6M).

In some implementations, the correlating operation 906 of FIG. 9 may include an operation 1272 for correlating the one or more user reactions with the one or more augmentations including determining one or more relationships between the one or more user reactions and one or more non-augmentation scene elements obfuscated by the one or more augmentations in the one or more remotely displayed augmented views as further illustrated in FIG. 12F. For instance, the user reaction/augmentation associating module 106* including the user reaction/non-augmentation scene element relationship ascertaining module 834 (see FIG. 8A) of the computing system 70* of FIG. 7A or 7B correlating the one or more user reactions with the one or more augmentations when the user reaction/non-augmentation scene element relationship ascertaining module 834 determines or ascertains one or more relationships between the one or more user reactions and one or more non-augmentation scene elements obfuscated (e.g., hidden) by the one or more augmentations (e.g., augmentations 64*a*, 64*b*, 64*c*, 64*cc*, 64*d*, 64*e*, 64*f*, 64*g*, and/or 64*h* of FIGS. 6B, 6D, 6E, 6F, 6G, 6I, 6K, and/or 6M) in the one or more remotely displayed augmented views (e.g., augmented views 60*b*, 60*d*, 60*e*, 60*f*, 60*g*, 60*i*, 60*k*, and/or 60*m* of FIGS. 6B, 6D, 6E, 6F, 6G, 6I, 6K, and/or 6M).

Figure 13:
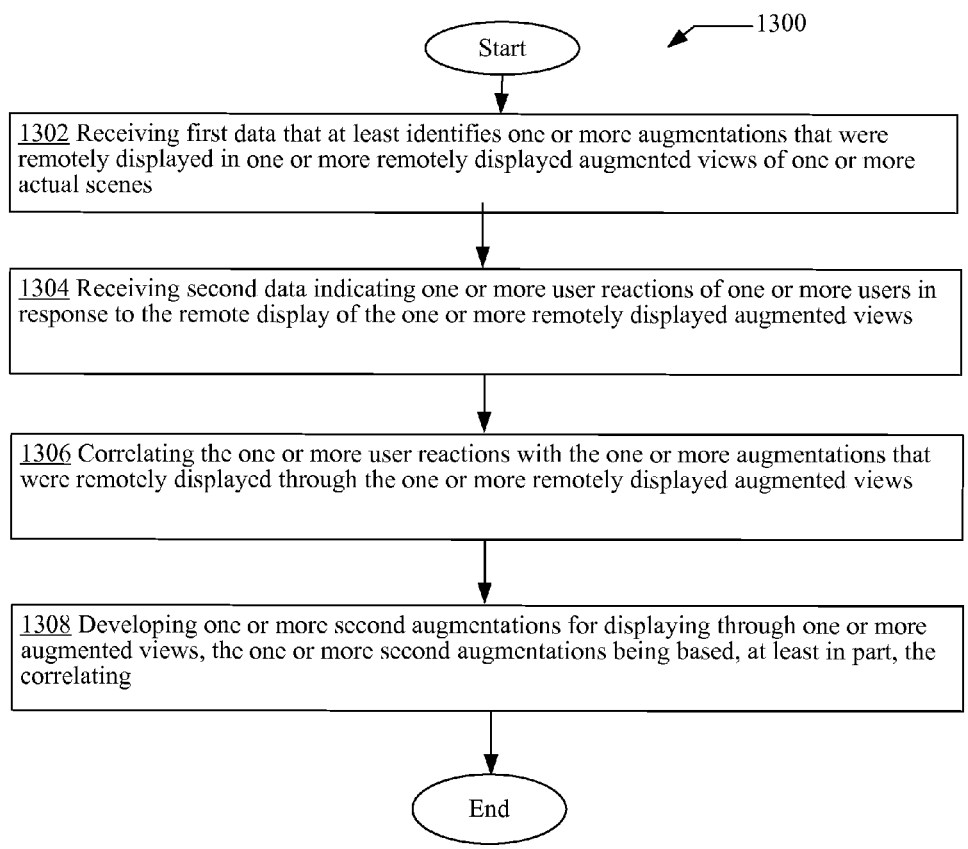
FIG. 13 is another high-level logic flowchart of a process, e.g., operational flow 1300, according to some embodiments.

Turning now to FIG. 13 illustrating another operational flow 1300. Operational flow 1300 includes certain operations that mirror the operations included in operational flow 900 of FIG. 9. These operations include a first data receiving operation 1302, a second data receiving operation 1304, and a correlating operation 1306 that corresponds to and mirror the first data receiving operation 902, the second data receiving operation 904, and the correlating operation 906, respectively, of FIG. 9.

In addition, operational flow 1300 further includes an augmentation developing operation 1308 for developing one or more second augmentations for displaying through one or more augmented views, the one or more second augmentations being based, at least in part, the correlating. For instance, augmentation providing module 107* (e.g., the augmentation providing module 107' of FIG. 7A or the augmentation providing module 107" of FIG. 7B) of the computing system 70* developing (e.g., generating, providing, or selecting) one or more second augmentations (e.g., augmentations 170 as illustrated in FIGS. 5C, 7A, and 7B) for displaying through one or more augmented views, the one or more second augmentations being based, at least in part, the correlating of the one or more user reactions with the one or more augmentations that were remotely displayed. In some cases, the developed one or more second augmentations 170 may be saved into a memory 114 and/or be relayed to one or more AR devices 50*.

Figure 14:
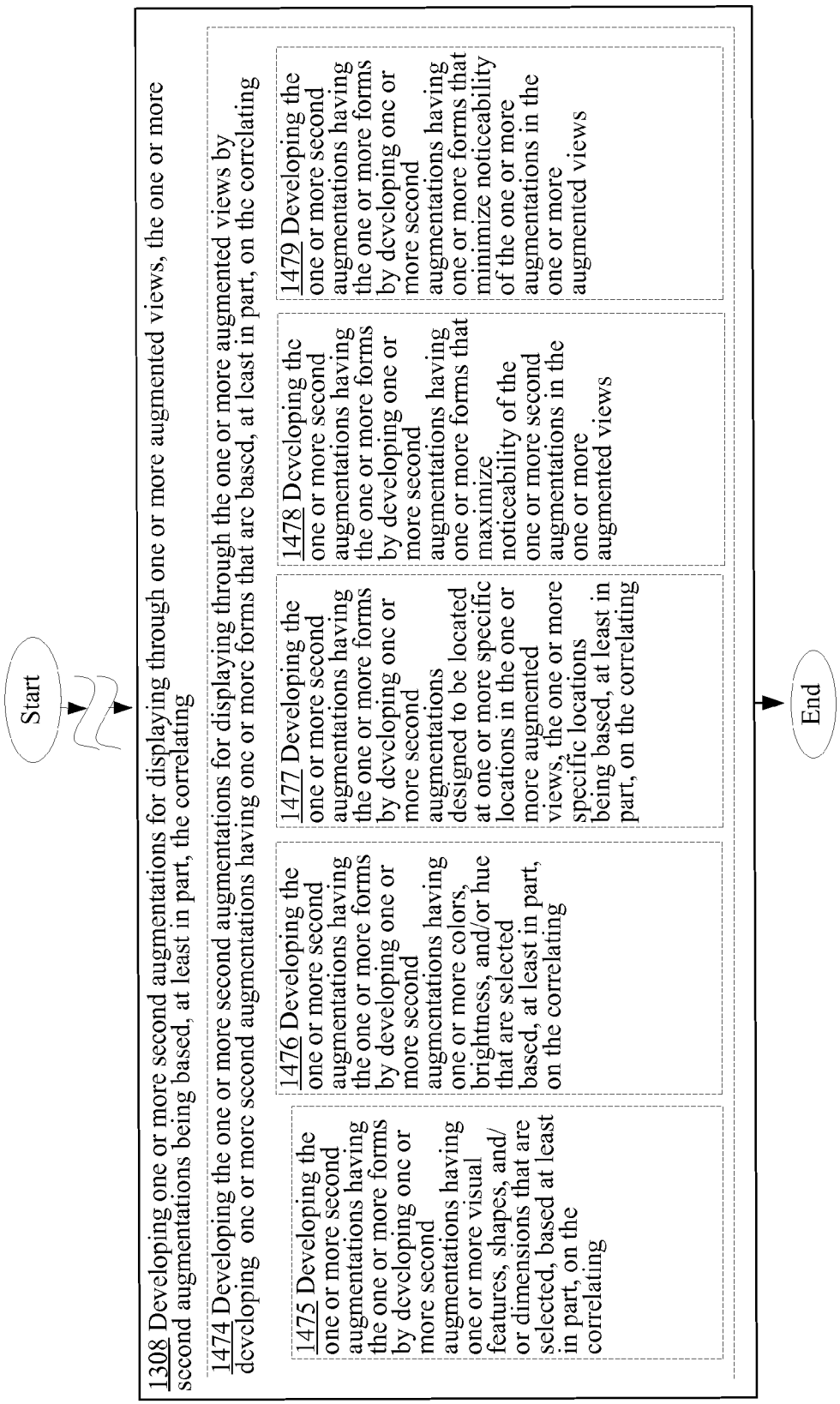
FIG. 14 is a high-level logic flowchart of a process depicting alternate implementations of the augmentation developing operation 1308 of FIG. 13.

Referring now to FIG. 14, which illustrates alternative ways that the augmentation developing operation 1308 of FIG. 13 may be implemented. For example, in some implementations, the augmentation developing operation 1308 may include an operation 1474 for developing the one or more second augmentations for displaying through the one or more augmented views by developing one or more second augmentations having one or more forms that are based, at least in part, on the correlating. For instance, the augmentation providing module 107* of the computing system 70* of FIG. 7A or 7B developing (e.g., generating) the one or more second augmentations for displaying through the one or more augmented views by developing or providing one or more second augmentations (e.g., the augmentations 170 that may be saved into memory 114 as illustrated in FIGS. 7A and 7B or may be transmitted to one or more AR devices 50* as illustrated in FIG. 5C) having one or more forms that are based, at least in part, on the correlating of the one or more user reactions with the one or more augmentations that were remotely displayed.

As further illustrated in FIG. 14, operation 1474 may include one or more additional operations in various alternative implementations. For example, in some implementations, operation 1474 may include an operation 1475 for developing the one or more second augmentations having the one or more forms by developing one or more second augmentations having one or more visual features, shapes, and/or dimensions that are selected, based at least in part, on the correlating. For instance, the augmentation providing module 107* of the computing system 70* of FIG. 7A or 7B developing the one or more second augmentations having the one or more forms by developing or providing one or more second augmentations (e.g., the one or more augmentations 170 illustrated in FIGS. 5C, 7A, and/or 7B) having one or more visual features, shapes, and/or dimensions that are selected, based at least in part, on the correlating of the one or more user reactions with the one or more augmentations that were remotely displayed.

In the same or alternative implementations, operation 1474 may alternatively or additionally include an operation 1476 for developing the one or more second augmentations having the one or more forms by developing one or more second augmentations having one or more colors, brightness, and/or hue that are selected based, at least in part, on the correlating. For instance, the augmentation providing module 107* of the computing system 70* of FIG. 7A or 7B developing the one or more second augmentations having the one or more forms by developing or providing one or more second augmentations (e.g., the one or more augmentations 170 illustrated in FIGS. 5C, 7A, and/or 7B) having one or more colors, brightness, and/or hue that are selected based, at least in part, on the correlating of the one or more user reactions with the one or more augmentations that were remotely displayed.

In the same or alternative implementations, operation 1474 may alternatively or additionally include an operation 1477 for developing the one or more second augmentations having the one or more forms by developing one or more second augmentations designed to be located at one or more specific locations in the one or more augmented views, the one or more specific locations being based, at least in part, on the correlating. For instance, the augmentation providing module 107* of the computing system 70* of FIG. 7A or 7B developing the one or more second augmentations having the one or more forms by developing or providing one or more second augmentations (e.g., the one or more augmentations 170 illustrated in FIGS. 5C, 7A, and/or 7B) designed to be located at one or more specific locations in the one or more augmented views, the one or more specific locations being based, at least in part, on the correlating of the one or more user reactions with the one or more augmentations that were remotely displayed.

In the same or alternative implementations, operation 1474 may alternatively or additionally include an operation 1478 for developing the one or more second augmentations having the one or more forms by developing one or more second augmentations having one or more forms that maximize noticeability of the one or more second augmentations in the one or more augmented views. For instance, the augmentation providing module 107* of the computing system 70* of FIG. 7A or 7B developing the one or more second augmentations having the one or more forms by developing or providing one or more second augmentations (e.g., the one or more augmentations 170 illustrated in FIGS. 5C, 7A, and/or 7B) having one or more forms that maximize noticeability (e.g., visibility) of the one or more second augmentations in the one or more augmented views.

In the same or alternative implementations, operation 1474 may alternatively or additionally include an operation 1479 for developing the one or more second augmentations having the one or more forms by developing one or more second augmentations having one or more forms that minimize noticeability of the one or more augmentations in the one or more augmented views. For instance, the augmentation providing module 107* of the computing system 70* of FIG. 7A or 7B developing the one or more second augmentations having the one or more forms by developing or providing one or more second augmentations (e.g., the one or more augmentations 170 illustrated in FIGS. 5C, 7A, and/or 7B) having one or more forms that minimize minimizes noticeability (e.g., visibility) of the one or more augmentations in the one or more augmented views.

Figure 15:
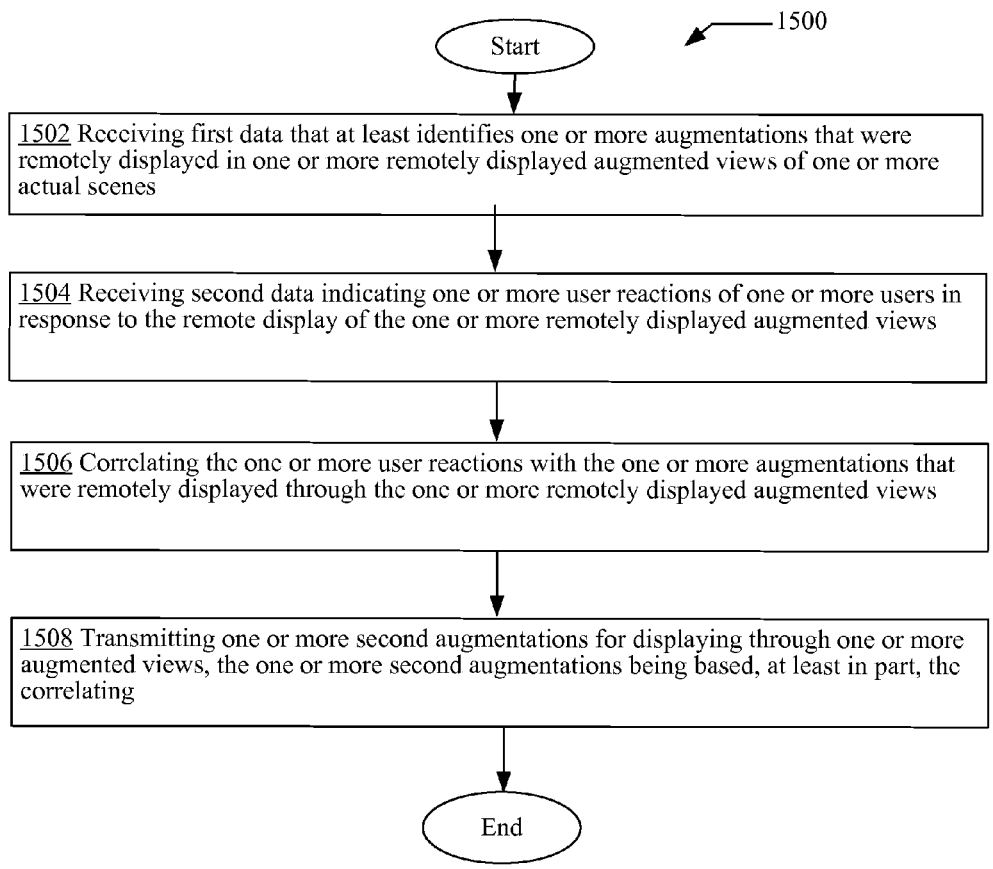
FIG. 15 is another high-level logic flowchart of a process, e.g., operational flow 1500, according to some embodiments.

Turning now to FIG. 15 illustrating another operational flow 1500. Operational flow 1500 includes certain operations that mirror the operations included in operational flow 900 of FIG. 9. These operations include a first data receiving operation 1502, a second data receiving operation 1504, and a correlating operation 1506 that corresponds to and mirror the first data receiving operation 902, the second data receiving operation 904, and the correlating operation 906, respectively, of FIG. 9.

In addition, operational flow 1500 further includes an augmentation transmitting operation 1508 for transmitting one or more second augmentations for displaying through one or more augmented views, the one or more second augmentations being based, at least in part, the correlating. For instance, the augmentation relaying module 108* (e.g., the augmentation relaying module 108' of FIG. 7A or the augmentation relaying module 108" of FIG. 7B) of the computing system 70* transmitting or relaying (via one or more wireless and/or wired networks 550) one or more second augmentations (e.g., the one or more augmentations 170 of FIG. 5C) for displaying through one or more augmented views (e.g., for displaying through one or more AR devices 50*), the one or more second augmentations to be transmitted or relayed being based, at least in part, the correlating or associating of the one or more user reactions with the one or more augmentations that were remotely displayed.

Figure 16A:
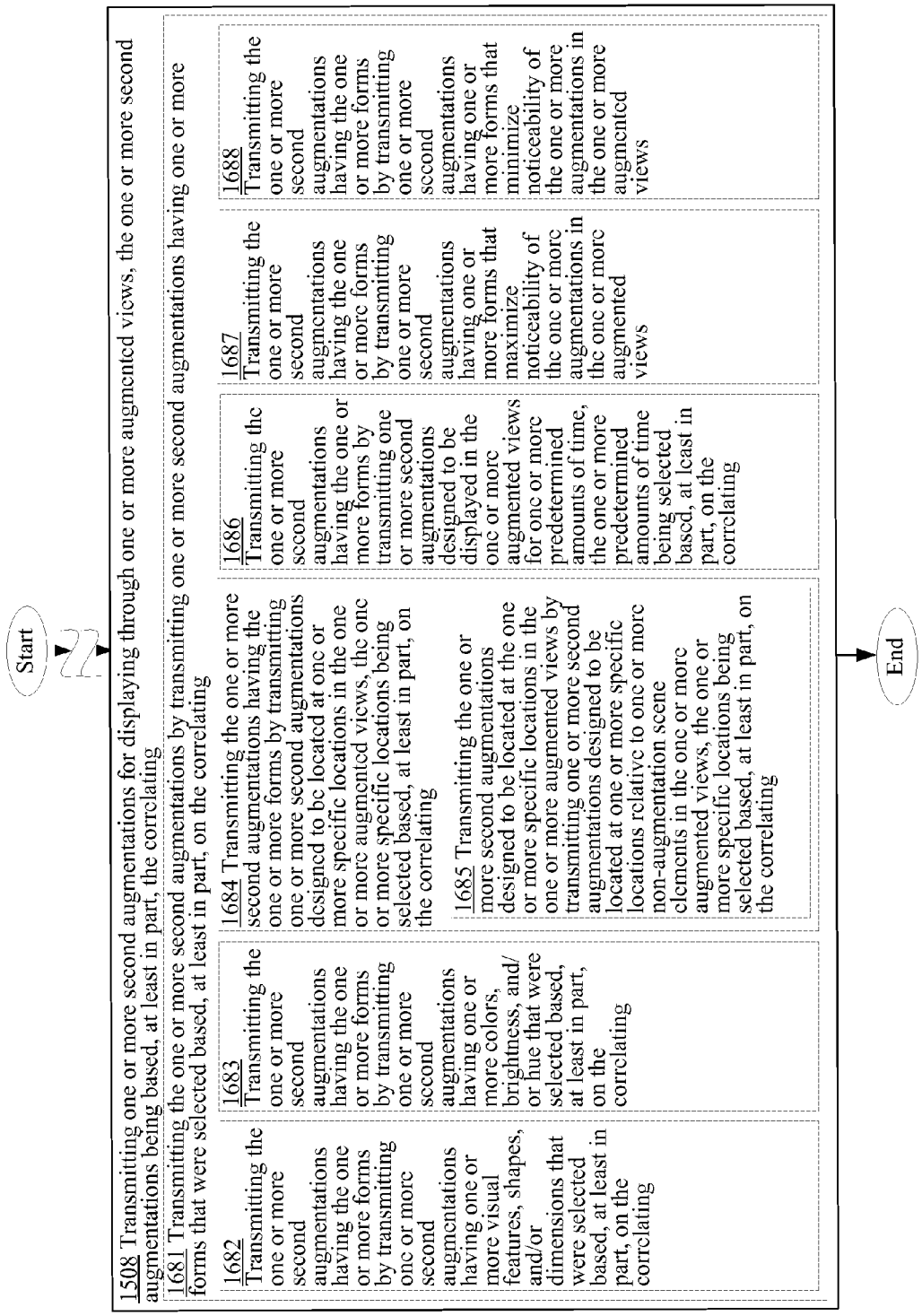
FIG. 16A is a high-level logic flowchart of a process depicting alternate implementations of the augmentation transmitting operation 1508 of FIG. 15.
Figure 16B:
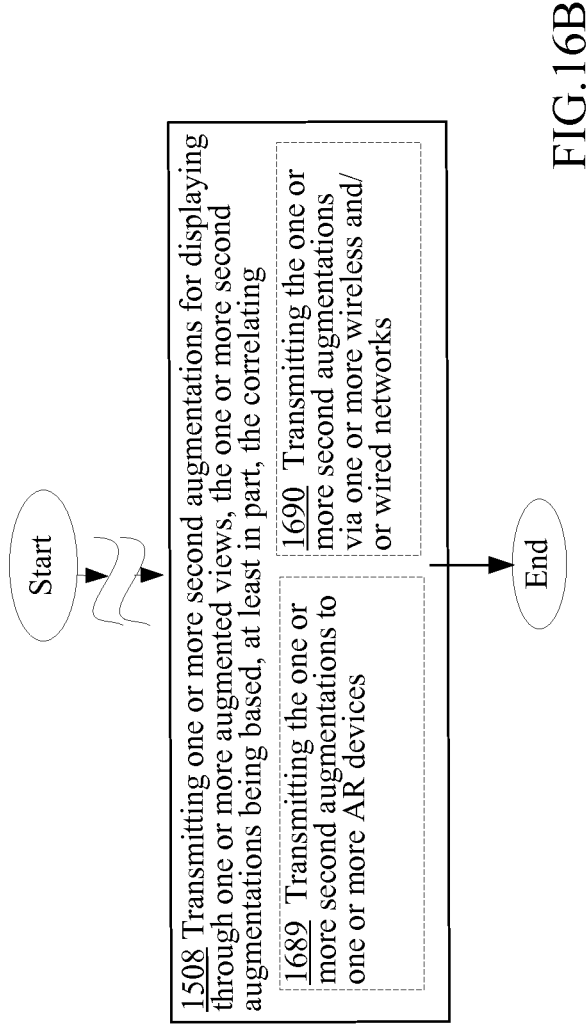
FIG. 16B is a high-level logic flowchart of a process depicting alternate implementations of the augmentation transmitting operation 1508 of FIG. 15.

Referring now to FIGS. 16A and 16B illustrating various ways that the augmentation relaying operation 1508 may be executed in various alternative implementations. For example, in some implementations, the augmentation relaying operation 1508 may include or involve an operation 1681 for transmitting the one or more second augmentations by transmitting one or more second augmentations having one or more forms that were selected based, at least in part, on the correlating as illustrated in FIG. 16A. For instance, the augmentation relaying module 108* including the augmentation form selecting module 840 (see FIG. 8B) of the computing system 70* of FIG. 7A or 7B transmitting the one or more second augmentations by transmitting or relaying one or more second augmentations (e.g., the one or more augmentations 170 of FIG. 5C) having one or more forms that were selected by the augmentation form selecting module 840 based, at least in part, on the correlating or associating of the one or more user reactions with the one or more augmentations that were remotely displayed.

As further illustrated in FIG. 16A, operation 1681 may further include one or more additional operations in various alternative implementations. For example, in some implementations, operation 1681 may further include an operation 1682 for transmitting the one or more second augmentations having the one or more forms by transmitting one or more second augmentations having one or more visual features, shapes, and/or dimensions that were selected based, at least in part, on the correlating. For instance, the augmentation relaying module 108* including the augmentation form selecting module 840 of the computing system 70* of FIG. 7A or 7B transmitting the one or more second augmentations having the one or more forms by transmitting or relaying one or more second augmentations (e.g., the one or more augmentations 170 of FIG. 5C) having one or more visual features, shapes, and/or dimensions that were selected by the augmentation form selecting module 840 based, at least in part, on the correlating or associating of the one or more user reactions with the one or more augmentations that were remotely displayed.

In the same or alternative implementations, operation 1681 may additional or alternatively include or involve an operation 1683 for transmitting the one or more second augmentations having the one or more forms by transmitting one or more second augmentations having one or more colors, brightness, and/or hue that were selected based, at least in part, on the correlating. For instance, the augmentation relaying module 108* including the augmentation form selecting module 840 of the computing system 70* of FIG. 7A or 7B transmitting the one or more second augmentations having the one or more forms by transmitting or relaying one or more second augmentations (e.g., the one or more augmentations 170 of FIG. 5C) having one or more colors, brightness, and/or hue that were selected by the augmentation form selecting module 840 based, at least in part, on the correlating or associating of the one or more user reactions with the one or more augmentations that were remotely displayed.

In the same or alternative implementations, operation 1681 may additional or alternatively include or involve an operation 1684 for transmitting the one or more second augmentations having the one or more forms by transmitting one or more second augmentations designed to be located at one or more specific locations in the one or more augmented views, the one or more specific locations being selected based, at least in part, on the correlating. For instance, the augmentation relaying module 108* including the augmentation form selecting module 840 of the computing system 70* of FIG. 7A or 7B transmitting the one or more second augmentations having the one or more forms by transmitting or relaying one or more second augmentations (e.g., the one or more augmentations 170 of FIG. 5C) designed to be located at one or more specific locations in the one or more augmented views, the one or more specific locations being selected by the augmentation form selecting module 840 based, at least in part, on the correlating or associating of the one or more user reactions with the one or more augmentations that were remotely displayed.

In some implementations, operation 1684 may further include or involve an operation 1685 for transmitting the one or more second augmentations designed to be located at the one or more specific locations in the one or more augmented views by transmitting one or more second augmentations designed to be located at one or more specific locations relative to one or more non-augmentation scene elements in the one or more augmented views, the one or more specific locations being selected based, at least in part, on the correlating. For instance, the augmentation relaying module 108* including the augmentation form selecting module 840 of the computing system 70* of FIG. 7A or 7B transmitting the one or more second augmentations designed to be located at the one or more specific locations in the one or more augmented views by transmitting or relaying one or more second augmentations (e.g., the one or more augmentations 170 of FIG. 5C) designed to be located at one or more specific locations relative to one or more non-augmentation scene elements in the one or more augmented views, the one or more specific locations being selected by the augmentation form selecting module 840 based, at least in part, on the correlating or associating of the one or more user reactions with the one or more augmentations that were remotely displayed.

In the same or alternative implementations, operation 1681 may additional or alternatively include or involve an operation 1686 for transmitting the one or more second augmentations having the one or more forms by transmitting one or more second augmentations designed to be displayed in the one or more augmented views for one or more predetermined amounts of time, the one or more predetermined amounts of time being selected based, at least in part, on the correlating. For instance, the augmentation relaying module 108* including the augmentation form selecting module 840 of the computing system 70* of FIG. 7A or 7B transmitting the one or more second augmentations having the one or more forms by transmitting or relaying one or more second augmentations (e.g., the one or more augmentations 170 of FIG. 5C) designed to be displayed in the one or more augmented views for one or more predetermined amounts of time, the one or more predetermined amounts of time being selected by the augmentation form selecting module 840 based, at least in part, on the correlating or associating of the one or more user reactions with the one or more augmentations that were remotely displayed.

In the same or alternative implementations, operation 1681 may additional or alternatively include or involve an operation 1687 for transmitting the one or more second augmentations having the one or more forms by transmitting one or more second augmentations having one or more forms that maximize noticeability of the one or more augmentations in the one or more augmented views. For instance, the augmentation relaying module 108* including the augmentation form selecting module 840 of the computing system 70* of FIG. 7A or 7B transmitting the one or more second augmentations having the one or more forms by transmitting or relaying one or more second augmentations (e.g., the one or more augmentations 170 of FIG. 5C) having one or more forms that was selected by the augmentation form selecting module 840 to maximize noticeability of the one or more augmentations in the one or more augmented views. That is, based on the results of the correlating operation 1506, a determination may be made as to what form of the augmentation or augmentations may maximize noticeability (e.g., visibility).

In the same or alternative implementations, operation 1681 may additional or alternatively include or involve an operation 1688 for transmitting the one or more second augmentations having the one or more forms by transmitting one or more second augmentations having one or more forms that minimize noticeability of the one or more augmentations in the one or more augmented views. For instance, the augmentation relaying module 108* including the augmentation form selecting module 840 of the computing system 70* of FIG. 7A or 7B transmitting the one or more second augmentations having the one or more forms by transmitting or relaying one or more second augmentations (e.g., the one or more augmentations 170 of FIG. 5C) having one or more forms that was selected by the augmentation form selecting module 840 to minimize noticeability of the one or more augmentations in the one or more augmented views.

Referring now to FIG. 16B, in some implementations, the augmentation transmitting operation 1508 may additionally or alternatively include an operation 1689 for transmitting the one or more second augmentations to one or more AR devices. For instance, the augmentation relaying module 108* of the computing system 70* of FIG. 7A or 7B transmitting or relaying the one or more second augmentations (e.g., the one or more augmentations 170 of FIG. 5C) to one or more AR devices 50*(see FIG. 5C).

In the same or alternative implementations, the augmentation transmitting operation 1508 may additionally or alternatively include an operation 1690 for transmitting the one or more second augmentations via one or more wireless and/or wired networks. For instance, the augmentation relaying module 108* of the computing system 70* of FIG. 7A or 7B transmitting or relaying the one or more second augmentations e.g., the one or more augmentations 170 of FIG. 5C) via one or more wireless and/or wired networks 550.

In a general sense, those skilled in the art will recognize that the various aspects described herein which can be implemented, individually and/or collectively, by a wide range of hardware, software, firmware, and/or any combination thereof can be viewed as being composed of various types of "electrical circuitry." Consequently, as used herein "electrical circuitry" includes, but is not limited to, electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of memory (e.g., random access, flash, read only, etc.)), and/or electrical circuitry forming a communications device (e.g., a modem, communications switch, optical-electrical equipment, etc.). Those having skill in the art will recognize that the subject matter described herein may be implemented in an analog or digital fashion or some combination thereof.

It has been argued that because high-level programming languages use strong abstraction (e.g., that they may resemble or share symbols with natural languages), they are therefore a "purely mental construct." (e.g., that "software"—a computer program or computer programming—is somehow an ineffable mental construct, because at a high level of abstraction, it can be conceived and understood in the human mind). This argument has been used to characterize technical description in the form of functions/operations as somehow "abstract ideas." In fact, in technological arts (e.g., the information and communication technologies) this is not true.

The fact that high-level programming languages use strong abstraction to facilitate human understanding should not be taken as an indication that what is expressed is an abstract idea. In fact, those skilled in the art understand that just the opposite is true. If a high-level programming language is the tool used to implement a technical disclosure in the form of functions/operations, those skilled in the art will recognize that, far from being abstract, imprecise, "fuzzy," or "mental" in any significant semantic sense, such a tool is instead a near incomprehensibly precise sequential specification of specific computational machines—the parts of which are built up by activating/selecting such parts from typically more general computational machines over time (e.g., clocked time). This fact is sometimes obscured by the superficial similarities between high-level programming languages and natural languages. These superficial similarities also may cause a glossing over of the fact that high-level programming language implementations ultimately perform valuable work by creating/controlling many different computational machines.

The many different computational machines that a high-level programming language specifies are almost unimaginably complex. At base, the hardware used in the computational machines typically consists of some type of ordered matter (e.g., traditional electronic devices (e.g., transistors), deoxyribonucleic acid (DNA), quantum devices, mechanical switches, optics, fluidics, pneumatics, optical devices (e.g., optical interference devices), molecules, etc.) that are arranged to form logic gates. Logic gates are typically physical devices that may be electrically, mechanically, chemically, or otherwise driven to change physical state in order to create a physical reality of Boolean logic.

Logic gates may be arranged to form logic circuits, which are typically physical devices that may be electrically, mechanically, chemically, or otherwise driven to create a physical reality of certain logical functions. Types of logic circuits include such devices as multiplexers, registers, arithmetic logic units (ALUs), computer memory, etc., each type of which may be combined to form yet other types of physical devices, such as a central processing unit (CPU)—the best known of which is the microprocessor. A modern microprocessor will often contain more than one hundred million logic gates in its many logic circuits (and often more than a billion transistors). See, e.g., Wikipedia, Logic gates, http://en.wikipedia.org/wiki/Logic_gates (as of Jun. 5, 2012, 21:03 GMT).

The logic circuits forming the microprocessor are arranged to provide a microarchitecture that will carry out the instructions defined by that microprocessor's defined Instruction Set Architecture. The Instruction Set Architecture is the part of the microprocessor architecture related to programming, including the native data types, instructions, registers, addressing modes, memory architecture, interrupt and exception handling, and external Input/Output. See, e.g., Wikipedia, Computer architecture, http://en.wikipedia.org/wiki/Computer_architecture (as of Jun. 5, 2012, 21:03 GMT).

The Instruction Set Architecture includes a specification of the machine language that can be used by programmers to use/control the microprocessor. Since the machine language instructions are such that they may be executed directly by the microprocessor, typically they consist of strings of binary digits, or bits. For example, a typical machine language instruction might be many bits long (e.g., 32, 64, or 128 bit strings are currently common). A typical machine language instruction might take the form "11110000101011110000111100111111" (a 32 bit instruction).

It is significant here that, although the machine language instructions are written as sequences of binary digits, in actuality those binary digits specify physical reality. For example, if certain semiconductors are used to make the operations of Boolean logic a physical reality, the apparently mathematical bits "1" and "0" in a machine language instruction actually constitute a shorthand that specifies the application of specific voltages to specific wires. For example, in some semiconductor technologies, the binary number "1" (e.g., logical "1") in a machine language instruction specifies around +5 volts applied to a specific "wire" (e.g., metallic traces on a printed circuit board) and the binary number "0" (e.g., logical "0") in a machine language instruction specifies around −5 volts applied to a specific "wire." In addition to specifying voltages of the machines' configuration, such machine language instructions also select out and activate specific groupings of logic gates from the millions of logic gates of the more general machine. Thus, far from abstract mathematical expressions, machine language instruction programs, even though written as a string of zeros and ones, specify many, many constructed physical machines or physical machine states.

Machine language is typically incomprehensible by most humans (e.g., the above example was just ONE instruction, and some personal computers execute more than two billion instructions every second). See, e.g., Wikipedia, Instructions per second, http://en.wikipedia.org/wiki/Instructions_per_second (as of Jun. 5, 2012, 21:04 GMT). Thus, programs written in machine language—which may be tens of millions of machine language instructions long—are incomprehensible. In view of this, early assembly languages were developed that used mnemonic codes to refer to machine language instructions, rather than using the machine language instructions' numeric values directly (e.g., for performing a multiplication operation, programmers coded the abbreviation "mult," which represents the binary number "011000" in MIPS machine code). While assembly languages were initially a great aid to humans controlling the microprocessors to perform work, in time the complexity of the work that needed to be done by the humans outstripped the ability of humans to control the microprocessors using merely assembly languages.

At this point, it was noted that the same tasks needed to be done over and over, and the machine language necessary to do those repetitive tasks was the same. In view of this, compilers were created. A compiler is a device that takes a statement that is more comprehensible to a human than either machine or assembly language, such as "add 2+2 and output the result," and translates that human understandable statement into a complicated, tedious, and immense machine language code (e.g., millions of 32, 64, or 128 bit length strings). Compilers thus translate high-level programming language into machine language.

This compiled machine language, as described above, is then used as the technical specification which sequentially constructs and causes the interoperation of many different computational machines such that humanly useful, tangible, and concrete work is done. For example, as indicated above, such machine language—the compiled version of the higher-level language—functions as a technical specification which selects out hardware logic gates, specifies voltage levels, voltage transition timings, etc., such that the humanly useful work is accomplished by the hardware.

Thus, a functional/operational technical description, when viewed by one of skill in the art, is far from an abstract idea. Rather, such a functional/operational technical description, when understood through the tools available in the art such as those just described, is instead understood to be a humanly understandable representation of a hardware specification, the complexity and specificity of which far exceeds the comprehension of most any one human. With this in mind, those skilled in the art will understand that any such operational/functional technical descriptions—in view of the disclosures herein and the knowledge of those skilled in the art—may be understood as operations made into physical reality by (a) one or more interchained physical machines, (b) interchained logic gates configured to create one or more physical machine(s) representative of sequential/combinatorial logic(s), (c) interchained ordered matter making up logic gates (e.g., interchained electronic devices (e.g., transistors), DNA, quantum devices, mechanical switches, optics, fluidics, pneumatics, molecules, etc.) that create physical reality representative of logic(s), or (d) virtually any combination of the foregoing. Indeed, any physical object which has a stable, measurable, and changeable state may be used to construct a machine based on the above technical description. Charles Babbage, for example, constructed the first computer out of wood and powered by cranking a handle.

Thus, far from being understood as an abstract idea, those skilled in the art will recognize a functional/operational technical description as a humanly-understandable representation of one or more almost unimaginably complex and time sequenced hardware instantiations. The fact that functional/operational technical descriptions might lend themselves readily to high-level computing languages (or high-level block diagrams for that matter) that share some words, structures, phrases, etc. with natural language simply cannot be taken as an indication that such functional/operational technical descriptions are abstract ideas, or mere expressions of abstract ideas. In fact, as outlined herein, in the technological arts this is simply not true. When viewed through the tools available to those of skill in the art, such functional/operational technical descriptions are seen as specifying hardware configurations of almost unimaginable complexity.

As outlined above, the reason for the use of functional/operational technical descriptions is at least twofold. First, the use of functional/operational technical descriptions allows near-infinitely complex machines and machine operations arising from interchained hardware elements to be described in a manner that the human mind can process (e.g., by mimicking natural language and logical narrative flow). Second, the use of functional/operational technical descriptions assists the person of skill in the art in understanding the described subject matter by providing a description that is more or less independent of any specific vendor's piece(s) of hardware.

The use of functional/operational technical descriptions assists the person of skill in the art in understanding the described subject matter since, as is evident from the above discussion, one could easily, although not quickly, transcribe the technical descriptions set forth in this document as trillions of ones and zeroes, billions of single lines of assembly-level machine code, millions of logic gates, thousands of gate arrays, or any number of intermediate levels of abstractions. However, if any such low-level technical descriptions were to replace the present technical description, a person of skill in the art could encounter undue difficulty in implementing the disclosure, because such a low-level technical description would likely add complexity without a corresponding benefit (e.g., by describing the subject matter utilizing the conventions of one or more vendor-specific pieces of hardware). Thus, the use of functional/operational technical descriptions assists those of skill in the art by separating the technical descriptions from the conventions of any vendor-specific piece of hardware.

In view of the foregoing, the logical operations/functions set forth in the present technical description are representative of static or sequenced specifications of various ordered-matter elements, in order that such specifications may be comprehensible to the human mind and adaptable to create many various hardware configurations. The logical operations/functions disclosed herein should be treated as such, and should not be disparagingly characterized as abstract ideas merely because the specifications they represent are presented in a manner that one of skill in the art can readily understand and apply in a manner independent of a specific vendor's hardware implementation.

Those having skill in the art will recognize that the state of the art has progressed to the point where there is little distinction left between hardware, software, and/or firmware implementations of aspects of systems; the use of hardware, software, and/or firmware is generally (but not always, in that in certain contexts the choice between hardware and software can become significant) a design choice representing cost vs. efficiency tradeoffs. Those having skill in the art will appreciate that there are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware in one or more machines, compositions of matter, and articles of manufacture, limited to patentable subject matter under 35 USC 101. Hence, there are several possible vehicles by which the processes and/or devices and/or other technologies described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations will typically employ optically-oriented hardware, software, and or firmware.

In some implementations described herein, logic and similar implementations may include software or other control structures. Electronic circuitry, for example, may have one or more paths of electrical current constructed and arranged to implement various functions as described herein. In some implementations, one or more media may be configured to bear a device-detectable implementation when such media hold or transmit device detectable instructions operable to perform as described herein. In some variants, for example, implementations may include an update or modification of existing software or firmware, or of gate arrays or programmable hardware, such as by performing a reception of or a transmission of one or more instructions in relation to one or more operations described herein. Alternatively or additionally, in some variants, an implementation may include special-purpose hardware, software, firmware components, and/or general-purpose components executing or otherwise invoking special-purpose components. Specifications or other implementations may be transmitted by one or more instances of tangible transmission media as described herein, optionally by packet transmission or otherwise by passing through distributed media at various times.

Alternatively or additionally, implementations may include executing a special-purpose instruction sequence or invoking circuitry for enabling, triggering, coordinating, requesting, or otherwise causing one or more occurrences of virtually any functional operations described herein. In some variants, operational or other logical descriptions herein may be expressed as source code and compiled or otherwise invoked as an executable instruction sequence. In some contexts, for example, implementations may be provided, in whole or in part, by source code, such as C++, or other code sequences. In other implementations, source or other code implementation, using commercially available and/or techniques in the art, may be compiled/implemented/translated/converted into a high-level descriptor language (e.g., initially implementing described technologies in C or C++ programming language and thereafter converting the programming language implementation into a logic-synthesizable language implementation, a hardware description language implementation, a hardware design simulation implementation, and/or other such similar mode(s) of expression). For example, some or all of a logical expression (e.g., computer programming language implementation) may be manifested as a Verilog-type hardware description (e.g., via Hardware Description Language (HDL) and/or Very High Speed Integrated Circuit Hardware Descriptor Language (VHDL)) or other circuitry model which may then be used to create a physical implementation having hardware (e.g., an Application Specific Integrated Circuit). Those skilled in the art will recognize how to obtain, configure, and optimize suitable transmission or computational elements, material supplies, actuators, or other structures in light of these teachings.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.).

It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations).

Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that typically a disjunctive word and/or phrase presenting two or more alternative terms, whether in the description, claims, or drawings, should be understood to contemplate the possibilities of including one of the terms, either of the terms, or both terms unless context dictates otherwise. For example, the phrase "A or B" will be typically understood to include the possibilities of "A" or "B" or "A and B."

With respect to the appended claims, those skilled in the art will appreciate that recited operations therein may generally be performed in any order. Also, although various operational flows are presented in a sequence(s), it should be understood that the various operations may be performed in other orders than those which are illustrated, or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

This application may make reference to one or more trademarks, e.g., a word, letter, symbol, or device adopted by one manufacturer or merchant and used to identify and/or distinguish his or her product from those of others. Trademark names used herein are set forth in such language that makes clear their identity, that distinguishes them from common descriptive nouns, that have fixed and definite meanings, or, in many if not all cases, are accompanied by other specific identification using terms not covered by trademark. In addition, trademark names used herein have meanings that are well-known and defined in the literature, or do not refer to products or compounds for which knowledge of one or more trade secrets is required in order to divine their meaning. All trademarks referenced in this application are the property of their respective owners, and the appearance of one or more trademarks in this application does not diminish or otherwise adversely affect the validity of the one or more trademarks. All trademarks, registered or unregistered, that appear in this application are assumed to include a proper trademark symbol, e.g., the circle R or bracketed capitalization (e.g., [trademark name]), even when such trademark symbol does not explicitly appear next to the trademark. To the extent a trademark is used in a descriptive manner to refer to a product or process, that trademark should be interpreted to represent the corresponding product or process as of the date of the filing of this patent application.

Those skilled in the art will appreciate that the foregoing specific exemplary processes and/or devices and/or technologies are representative of more general processes and/or devices and/or technologies taught elsewhere herein, such as in the claims filed herewith and/or elsewhere in the present application.

What is claimed is:

1. A computationally-implemented method implemented via one or more computer processors, comprising:

receiving first data that at least identifies one or more augmentations that were remotely displayed in one or more remotely displayed augmented views of one or more actual scenes;

receiving second data indicating one or more user reactions of one or more users in response to the remote display of the one or more remotely displayed augmented views; and correlating the one or more user reactions with the one or more augmentations that were remotely displayed through the one or more remotely displayed augmented views, wherein said correlating the one or more user reactions with the one or more augmentations that were remotely displayed through the one or more remotely displayed augmented views includes at least:

correlating the one or more user reactions with the one or more augmentations by determining one or more relationships between the one or more user reactions and one or more aspects of the one or more augmentations, wherein said correlating the one or more user reactions with the one or more augmentations by determining one or more relationships between the one or more user reactions and one or more aspects of the one or more augmentations includes at least:

determining the one or more relationships between the one or more user reactions and the one or more aspects of the one or more augmentations by determining one or more relationships between the one or more user reactions and one or more forms of the one or more augmentations, wherein said determining the one or more relationships between the one or more user reactions and the one or more aspects of the one or more augmentations by determining one or more relationships between the one or more user reactions and one or more forms of the one or more augmentations includes at least:
determining the one or more relationships between the one or more user reactions and the one or more forms of the one or more augmentations by determining one or more relationships between the one or more user reactions and one or more colors, brightness, and/or hue of the or more augmentations.

2. A computationally-implemented system, comprising:
means for receiving first data that at least identifies one or more augmentations that were remotely displayed in one or more remotely displayed augmented views of one or more actual scenes;
means for receiving second data indicating one or more user reactions of one or more users in response to the remote display of the one or more remotely displayed augmented views; and
means for or correlating the one or more user reactions with the one or more augmentations that were remotely displayed through the one or more remotely displayed augmented views,
wherein said means for correlating the one or more user reactions with the one or more augmentations that were remotely displayed through the one or more remotely displayed augmented views includes at least:
means for correlating the one or more user reactions with the one or more augmentations by determining one or more relationships between the one or more user reactions and one or more aspects of the one or more augmentations, wherein said means for correlating the one or more user reactions with the one or more augmentations by determining one or more relationships between the one or more user reactions and one or more aspects of the one or more augmentations includes at least:
means for determining the one or more relationships between the one or more user reactions and the one or more aspects of the one or more augmentations by determining one or more relationships between the one or more user reactions and one or more forms of the one or more augmentations, wherein said means for determining the one or more relationships between the one or more user reactions and the one or more aspects of the one or more augmentations by determining one or more relationships between the one or more user reactions and one or more forms of the one or more augmentations includes at least:
means for determining the one or more relationships between the one or more user reactions and the one or more forms of the one or more augmentations by determining one or more relationships between the one or more user reactions and one or more colors, brightness, and/or hue of the or more augmentations.

3. The computationally-implemented system of claim 2, wherein said means for receiving first data that at least identifies one more augmentations that were remotely displayed in one or more remotely displayed augmented views of one or more actual scenes comprises:
means for receiving the first data including receiving first data that indicates one or more aspects of one or more non-augmentation scene elements that were included in the one or more actual scenes that were obfuscated in the one or more remotely displayed augmented views by the inclusion of the one or more augmentations in the one or more remotely displayed augmented views.

4. The computationally-implemented system of claim 2, wherein said means for receiving second data indicating one or more user reactions of one or more users in response to the remote display of the one or more remotely displayed augmented views comprises:
means for receiving the second data by receiving second data that indicates one or more user reactions of the one or more users proximate to the remote display of the one or more remotely displayed augmented views.

5. The computationally-implemented system of claim 4, wherein said means for receiving the second data by receiving second data that indicates one or more user reactions of the one or more users proximate to the remote display of the one or more remotely displayed augmented views comprises:
means for receiving the second data by receiving second data that indicates one or more physiological reactions of the one or more users proximate to the remote display of the one or more remotely displayed augmented views.

6. The computationally-implemented system of claim 5, wherein said means for receiving the second data by receiving second data that indicates one or more physiological reactions of the one or more users proximate to the remote display of the one or more remotely displayed augmented views comprises:
means for receiving the second data that indicates the one or more physiological reactions of the one or more users by receiving second data that indicates one or more eye characteristics of the one or more users proximate to the remote display of the one or more remotely displayed augmented views.

7. The computationally-implemented system of claim 6, wherein said means for receiving the second data that indicates the one or more physiological reactions of the one or more users by receiving second data that indicates one or more eye characteristics of the one or more users proximate to the remote display of the one or more remotely displayed augmented views comprises:
means for receiving the second data that indicates the one or more eye characteristics of the one or more users by receiving second data that indicates one or more pupil characteristics of one or more eyes of the one or more users proximate to the remote display of the one or more remotely displayed augmented views.

8. The computationally-system of claim 2, wherein said means for receiving second data indicating one or more user reactions of one or more users in response to the remote display of the one or more remotely displayed augmented views comprises:
means for receiving the second data indicating the one or more user reactions of the one or more users by receiving second data that indicates one or more facial expressions, head positions, and/or head tilts of the one or more users proximate to the display of the one or more remotely displayed augmented views.

9. The computationally-implemented system of claim 2, wherein said means for correlating the one or more user reactions with the one or more augmentations that were remotely displayed through the one or more remotely displayed augmented views comprises:
means for correlating the one or more user reactions with the one or more augmentations by determining one or more relationships between the one or more user reactions and the one or more augmentations, the one or more user reactions having occurred proximate to the remote display of the one or more remotely displayed augmented views.

10. The computationally-implemented system of claim 9, wherein said means for correlating the one or more user reactions with the one or more augmentations by determining one or more relationships between the one or more user reactions and the one or more augmentations, the one or more user reactions having occurred proximate to the remote display of the one or more remotely displayed augmented views comprises:
- means for determining the one or more relationships between the one or more user reactions and the one or more augmentations including determining one or more temporal relationships between the one or more user reactions and the one or more augmentations.

11. The computationally-implemented system of claim 9, wherein said means for correlating the one or more user reactions with the one or more augmentations by determining one or more relationships between the one or more user reactions and the one or more augmentations, the one or more user reactions having occurred proximate to the remote display of the one or more remotely displayed augmented views comprises:
- means for determining the one or more relationships between the one or more user reactions and the one or more augmentations including determining one or more spatial relationships between the one or more user reactions and the one or more augmentations.

12. The computationally-implemented system of claim 9, wherein said means for correlating the one or more user reactions with the one or more augmentations by determining one or more relationships between the one or more user reactions and the one or more augmentations, the one or more user reactions having occurred proximate to the remote display of the one or more remotely displayed augmented views comprises:
- means for determining the one or more relationships between the one or more user reactions and the one or more augmentations including determining one or more relationships between one or more physiological reactions of the one or more users and the one or more augmentations, the one or more physiological reactions having occurred proximate to the remote display of the one or more remotely displayed augmented views.

13. The computationally-implemented system of claim 12, wherein said means for determining the one or more relationships between the one or more user reactions and the one or more augmentations including determining one or more relationships between one or more physiological reactions of the one or more users and the one or more augmentations, the one or more physiological reactions having occurred proximate to the remote display of the one or more remotely displayed augmented views comprises:
- means for determining the one or more relationships between one or more physiological reactions of the one or more users and the one or more augmentations by determining one or more relationships between one or more eye characteristics of the one or more users and the one or more augmentations, the one or more eye characteristics having occurred proximate to the remote display of the one or more remotely displayed augmented views.

14. The computationally-implemented system of claim 13, wherein said means for determining the one or more relationships between one or more physiological reactions of the one or more users and the one or more augmentations by determining one or more relationships between one or more eye characteristics of the one or more users and the one or more augmentations, the one or more eye characteristics having occurred proximate to the remote display of the one or more remotely displayed augmented views comprises:
- means for determining the one or more relationships between the one or more eye characteristics of the one or more users and the one or more augmentations by determining one or more relationships between one or more eye movements of one or more eyes of the one or more users and the one or more augmentations, the one or more eye movements having occurred proximate to the remote display of the one or more remotely displayed augmented views.

15. The computationally-implemented system of claim 14, wherein said means for determining the one or more relationships between the one or more eye characteristics of the one or more users and the one or more augmentations by determining one or more relationships between one or more eye movements of one or more eyes of the one or more users and the one or more augmentations, the one or more eye movements having occurred proximate to the remote display of the one or more remotely displayed augmented views comprises:
- means for determining the one or more relationships between the one or more eye movements of the one or more eyes of the one or more users and the one or more augmentations by determining one or more relationships between one or more dwell paths of one or more eyes of the one or more users with respect to the one or more remotely displayed augmented views and the one or more augmentations, the one or more dwell paths of the one or more eyes of the one or more users having occurred proximate to the remote display of the one or more remotely displayed augmented views.

16. The computationally-implemented system of claim 15, wherein said means for determining the one or more relationships between the one or more eye movements of the one or more eyes of the one or more users and the one or more augmentations by determining one or more relationships between one or more dwell paths of one or more eyes of the one or more users with respect to the one or more remotely displayed augmented views and the one or more augmentations, the one or more dwell paths of the one or more eyes of the one or more users having occurred proximate to the remote display of the one or more remotely displayed augmented views comprises:
- means for determining the one or more relationships between the one or more dwell paths of one or more eyes of the one or more users and the one or more augmentations by determining one or more relationships between one or more dwell paths of the one or more eyes of the one or more users and the one or more augmentations, the one or more dwell paths having been as a result of eye focus of the one or more eyes of the one or more users moving away from the one or more augmentations included in the one or more remotely displayed augmented views.

17. The computationally-implemented system of claim 13, wherein said means for determining the one or more relationships between one or more physiological reactions of the one or more users and the one or more augmentations by determining one or more relationships between one or more eye characteristics of the one or more users and the one or more augmentations, the one or more eye characteristics having occurred proximate to the remote display of the one or more remotely displayed augmented views comprises:
- means for determining the one or more relationships between the one or more eye characteristics of the one or more users and the one or more augmentations by determining one or more relationships between eye focus of the one or more eyes of the one or more users with respect to the one or more remotely displayed augmented views and the one or more augmentations, the eye focus of the one or more eyes of the one or more users having occurred proximate to the remote display of the one or more remotely displayed augmented views.

18. The computationally-implemented system of claim 17, wherein said means for determining the one or more relationships between the one or more eye characteristics of the one or more users and the one or more augmentations by determining one or more relationships between eye focus of the one or more eyes of the one or more users with respect to the one or more remotely displayed augmented views and the one or more augmentations, the eye focus of the one or more eyes of the one or more users having occurred proximate to the remote display of the one or more remotely displayed augmented views comprises:

means for determining the one or more relationships between the one or more eye focus of the one or more eyes of the one or more users with respect to the one or more remotely displayed augmented views and the one or more augmentations by determining one or more relationships between dwell time of the one or more eyes of the one or more users and the one or more augmentations, the dwell time of the one or more eyes of the one or more users being with respect to the one or more remotely displayed augmented views, and the dwell time having occurred proximate to the remote display of the one or more remotely displayed augmented views.

19. The computationally-implemented system of claim 13, wherein said means for determining the one or more relationships between one or more physiological reactions of the one or more users and the one or more augmentations by determining one or more relationships between one or more eye characteristics of the one or more users and the one or more augmentations, the one or more eye characteristics having occurred proximate to the remote display of the one or more remotely displayed augmented views comprises:

means for determining the one or more relationships between the one or more eye characteristics of the one or more users and the one or more augmentations by determining one or more relationships between one or more pupil characteristics of one or more eyes of the one or more users and the one or more augmentations, the one or more pupil characteristics having occurred proximate to the remote display of the one or more remotely displayed augmented views.

20. The computationally-implemented system of claim 2, wherein said means for correlating the one or more user reactions with the one or more augmentations that were remotely displayed through the one or more remotely displayed augmented views comprises:

means for correlating the one or more user reactions with the one or more augmentations by determining one or more relationships between one or more facial expressions, and/or head positions of the one or more users and the one or more augmentations, the one or more facial expressions, and/or head positions of the one or more users having occurred proximate to the remote display of the one or more remotely displayed augmented views.

21. The computationally-implemented system of claim 2, wherein said means for determining the one or more relationships between the one or more user reactions and the one or more aspects of the one or more augmentations by determining one or more relationships between the one or more user reactions and one or more forms of the one or more augmentations comprises:

means for determining the one or more relationships between the one or more user reactions and the one or more forms of the one or more augmentations by determining one or more relationships between the one or more user reactions and one or more shapes and/or sizes of the one or more augmentations.

22. The computationally-implemented system of claim 2, wherein said means for determining the one or more relationships between the one or more user reactions and the one or more aspects of the one or more augmentations by determining one or more relationships between the one or more user reactions and one or more forms of the one or more augmentations comprises:

means for determining the one or more relationships between the one or more user reactions and the one or more forms of the one or more augmentations by determining one or more relationships between the one or more user reactions and one or more locations of the one or more augmentations in the one or more remotely displayed augmented views.

23. The computationally-implemented system of claim 2, wherein said means for correlating the one or more user reactions with the one or more augmentations that were remotely displayed through the one or more remotely displayed augmented views comprises:

means for correlating the one or more user reactions with the one or more augmentations including determining one or more relationships between the one or more user reactions and one or more aspects of one or more non-augmentation scene elements included in the one or more remotely displayed augmented views.

24. The computationally-implemented system of claim 23, wherein said means for correlating the one or more user reactions with the one or more augmentations including determining one or more relationships between the one or more user reactions and one or more aspects of one or more non-augmentation scene elements included in the one or more remotely displayed augmented views comprises:

means for determining the one or more relationships between the one or more user reactions and the one or more aspects of one or more non-augmentation scene elements by determining one or more relationships between the one or more user reactions and one or more forms of the one or more non-augmentation scene elements included in the one or more remotely displayed augmented views.

25. The computationally-implemented system of claim 24, wherein said means for determining the one or more relationships between the one or more user reactions and the one or more aspects of one or more non-augmentation scene elements by determining one or more relationships between the one or more user reactions and one or more forms of the one or more non-augmentation scene elements included in the one or more remotely displayed augmented views comprises:

means for determining the one or more relationships between the one or more user reactions and the one or more forms of the one or more non-augmentation scene elements by determining one or more relationships between the one or more user reactions and one or more locations of the one or more non-augmentation scene elements in the one or more remotely displayed augmented views.

26. The computationally-implemented system of claim 25, wherein said means for determining the one or more relationships between the one or more user reactions and the one or more forms of the one or more non-augmentation scene elements by determining one or more relationships between the one or more user reactions and one or more locations of the one or more non-augmentation scene elements in the one or more remotely displayed augmented views comprises:
  means for determining one or more relationships between the one or more user reactions and the one or more locations of the one or more non-augmentation scene elements in the one or more remotely displayed augmented views by determining one or more relationships between the one or more user reactions and one or more locations of the one or more non-augmentation scene elements relative to one or more locations of the one or more augmentations in the one or more remotely displayed augmented views.

27. The computationally-implemented system of claim 2, wherein said means for correlating the one or more user reactions with the one or more augmentations that were remotely displayed through the one or more remotely displayed augmented views comprises:
  means for correlating the one or more user reactions with the one or more augmentations including determining one or more relationships between the one or more user reactions and one or more non-augmentation scene elements obfuscated by the one or more augmentations in the one or more remotely displayed augmented views.

28. A computationally-implemented system, comprising:
  means for receiving first data that at least identifies one more augmentations that were remotely displayed in one or more remotely displayed augmented views of one or more actual scenes;
  means for receiving second data indicating one or more user reactions of one or more users in response to the remote display of the one or more remotely displayed augmented views;
  means for or correlating the one or more user reactions with the one or more augmentations that were remotely displayed through the one or more remotely displayed augmented views;
  means for developing one or more second augmentations for displaying through one or more augmented views, the one or more second augmentations being based, at least in part, the correlating, wherein said means for developing one or more second augmentations for displaying through one or more augmented views, the one or more second augmentations being based, at least in part, the correlating includes at least:
    means for developing the one or more second augmentations for displaying through the one or more augmented views by developing one or more second augmentations having one or more forms that are based, at least in part, on the correlating, wherein said means for developing the one or more second augmentations for displaying through the one or more augmented views by developing one or more second augmentations having one or more forms that are based, at least in part, on the correlating includes at least:
      means for developing the one or more second augmentations having the one or more forms by developing one or more second augmentations having one or more colors, brightness, and/or hue that are selected based, at least in part, on the correlating.

29. The computationally-implemented system of claim 28, wherein said means for developing the one or more second augmentations for displaying through the one or more augmented views by developing one or more second augmentations having one or more forms that are based, at least in part, on the correlating comprises:
  means for developing the one or more second augmentations having the one or more forms by developing one or more second augmentations having one or more visual features, shapes, and/or dimensions that are selected, based at least in part, on the correlating.

30. The computationally-implemented system of claim 28, wherein said means for developing the one or more second augmentations for displaying through the one or more augmented views by developing one or more second augmentations having one or more forms that are based, at least in part, on the correlating comprises:
  means for developing the one or more second augmentations having the one or more forms by developing one or more second augmentations designed to be located at one or more specific locations in the one or more augmented views, the one or more specific locations being based, at least in part, on the correlating.

31. The computationally-implemented system of claim 2, wherein said means for receiving first data that at least identifies one more augmentations that were remotely displayed in one or more remotely displayed augmented views of one or more actual scenes comprises:
  means for receiving the first data in response to transmitting the one or more augmentations to one or more augmented reality (AR) devices that remotely displayed the one or more remotely displayed augmented views.

32. The computationally-implemented system of claim 2, wherein said means for receiving first data that at least identifies one more augmentations that were remotely displayed in one or more remotely displayed augmented views of one or more actual scenes comprises:
  receiving the first data that at least identifies one more augmentations that were remotely displayed in one or more remotely displayed augmented views of one or more actual scenes, the one or more augmentations having been displayed in the one or more remotely displayed augmented views by being displayed having a specific scaled size in the one or more remotely displayed augmented views in order to provide a distal or proximate view of the one or more augmentations.

33. The computationally-implemented system of claim 2, wherein said means for receiving first data that at least identifies one more augmentations that were remotely displayed in one or more remotely displayed augmented views of one or more actual scenes comprises:
  means for receiving the first data that at least identifies one more augmentations that were remotely displayed in one or more remotely displayed augmented views of one or more actual scenes, the one or more augmentations having been remotely displayed by being projected away from one or more users viewing the one or more remotely displayed augmented views.

34. The computationally-implemented system of claim 33, wherein said means for receiving the first data that at least identifies one more augmentations that were remotely displayed in one or more remotely displayed augmented views of one or more actual scenes, the one or more augmentations having been remotely displayed by being projected away from one or more users viewing the one or more remotely displayed augmented views comprises:
  means for receiving the first data that at least identifies one more augmentations that were remotely displayed in one or more remotely displayed augmented views of one or more actual scenes, the one or more augmentations having been remotely displayed by being projected away from one or more users and onto a see-through lens.

35. The computationally-implemented system of claim 2, wherein said means for receiving first data that at least identifies one more augmentations that were remotely displayed in one or more remotely displayed augmented views of one or more actual scenes comprises:
- means for receiving the first data that at least identifies one more augmentations that were remotely displayed in one or more remotely displayed augmented views of one or more actual scenes, the one or more augmentations having been displayed by being projected into one or more eyes of one or more users viewing the one or more remotely displayed augmented views.

36. A system, comprising:
- circuitry for receiving first data that at least identifies one or more augmentations that were remotely displayed in one or more remotely displayed augmented views of one or more actual scenes;
- circuitry for receiving second data indicating one or more user reactions of one or more users in response to the remote display of the one or more remotely displayed augmented views; and
- circuitry for correlating the one or more user reactions with the one or more augmentations that were remotely displayed through the one or more remotely displayed augmented views, wherein said circuitry for correlating the one or more user reactions with the one or more augmentations that were remotely displayed through the one or more remotely displayed augmented views includes at least:
- circuitry for correlating the one or more user reactions with the one or more augmentations by determining one or more relationships between the one or more user reactions and one or more aspects of the one or more augmentations, wherein said circuitry for correlating the one or more user reactions with the one or more augmentations by determining one or more relationships between the one or more user reactions and one or more aspects of the one or more augmentations includes at least:
- circuitry for determining the one or more relationships between the one or more user reactions and the one or more aspects of the one or more augmentations by determining one or more relationships between the one or more user reactions and one or more forms of the one or more augmentations, wherein said circuitry for determining the one or more relationships between the one or more user reactions and the one or more aspects of the one or more augmentations by determining one or more relationships between the one or more user reactions and one or more forms of the one or more augmentations includes at least:
- circuitry for determining the one or more relationships between the one or more user reactions and the one or more forms of the one or more augmentations by determining one or more relationships between the one or more user reactions and one or more colors, brightness, and/or hue of the or more augmentations.

37. A system, comprising:
- circuitry for receiving first data that at least identifies one or more augmentations that were remotely displayed in one or more remotely displayed augmented views of one or more actual scenes;
- circuitry for receiving second data indicating one or more user reactions of one or more users in response to the remote display of the one or more remotely displayed augmented views; and
- circuitry for correlating the one or more user reactions with the one or more augmentations that were remotely displayed through the one or more remotely displayed augmented views, wherein said circuitry for correlating the one or more user reactions with the one or more augmentations that were remotely displayed through the one or more remotely displayed augmented views includes at least:
- circuitry for determining one or more relationships between the one or more user reactions and one or more aspects of the one or more augmentations, wherein said circuitry for determining one or more relationships between the one or more user reactions and one or more aspects of the one or more augmentations includes at least:
- circuitry for determining one or more relationships between the one or more user reactions and one or more forms of the one or more augmentations, wherein said circuitry for determining one or more relationships between the one or more user reactions and one or more forms of the one or more augmentations includes at least:
- circuitry for determining one or more relationships between the one or more user reactions and one or more colors, brightness, and/or hue of the or more augmentations.

* * * * *

UNITED STATES PATENT AND TRADEMARK OFFICE
CERTIFICATE OF CORRECTION

PATENT NO. : 9,077,647 B2  
APPLICATION NO. : 13/729278  
DATED : July 7, 2015  
INVENTOR(S) : Gene Fein et al.

Page 1 of 1

It is certified that error appears in the above-identified patent and that said Letters Patent is hereby corrected as shown below:

Claims:

Column 64, Lines 47-48, Claim 33:

"means for receiving the first data that at least identifies one more augmentations"

should be: -- means for receiving the first data that at least identifies one or more augmentations --

Signed and Sealed this  
Twenty-first Day of June, 2016

Michelle K. Lee  
*Director of the United States Patent and Trademark Office*